US012782924B2

(12) United States Patent
Stock et al.

(10) Patent No.: US 12,782,924 B2
(45) Date of Patent: Nov. 3, 2026

(54) APPARATUS AND METHOD OF ENGRAVING MACHINE READABLE INFORMATION ON A METALLIC WORKPIECE DURING MANUFACTURING AND TRACKING SYSTEMS RELATED THERETO

(71) Applicant: Ball Corporation, Westminster, CO (US)

(72) Inventors: Julian Stock, Denver, CO (US); Maxwell Peevey, Boulder, CO (US); John Efner, Broomfield, CO (US); Adam P.S. Stowitts, Arvada, CO (US); Kaitlyn Bock, Westminster, CO (US); Brandon Rinehart, Erie, CO (US); John Ross, Broomfield, CO (US); Alin Scorosanu, Westminster, CO (US)

(73) Assignee: Ball Corporation, Westminster, CO (US)

( * ) Notice: Subject to any disclaimer, the term of this patent is extended or adjusted under 35 U.S.C. 154(b) by 722 days.

(21) Appl. No.: 17/893,976

(22) Filed: Aug. 23, 2022

(65) Prior Publication Data

US 2022/0404818 A1 Dec. 22, 2022

Related U.S. Application Data

(63) Continuation-in-part of application No. 17/681,549, filed on Feb. 25, 2022.

(Continued)

(51) Int. Cl.
*G05B 19/418* (2006.01)

(52) U.S. Cl.
CPC . *G05B 19/41865* (2013.01); *G05B 19/41815* (2013.01)

(58) Field of Classification Search
CPC .......... G05B 19/41865; G05B 19/4183; G05B 19/4184; G05B 19/41875; G06Q 50/04;
(Continued)

(56) References Cited

U.S. PATENT DOCUMENTS

| | | |
|---|---|---|
| 3,086,889 A | 4/1963 | Strong |
| 3,230,925 A | 1/1966 | Blanz |

(Continued)

FOREIGN PATENT DOCUMENTS

| | | |
|---|---|---|
| CA | 2307074 | 9/2001 |
| CA | 2301655 | 4/2009 |

(Continued)

OTHER PUBLICATIONS

"Beverage Can Line," Stolle Machinery Company, LLC, 2020, 8 pages.

(Continued)

*Primary Examiner* — Darrin D Dunn
(74) *Attorney, Agent, or Firm* — Sheridan Ross P.C.

(57) ABSTRACT

Systems, methods, and apparatus for marking a metallic workpiece for tracking and tracing the metallic workpiece throughout its production and consumer lifecycle are disclosed. The mark may be formed on a sheet of a metallic material. In some embodiments, a bodymaker forms a cup from a blank cut from the sheet into the metallic workpiece with the mark positioned on a closed end of the metallic workpiece. The mark is scanned for tracking and tracing at various points during the production of the metallic workpiece and during the lifecycle of the metallic workpiece, such as at a point of filling, point of sale and a collection point where the metallic workpiece is recycled or destroyed. Information collected as the mark is scanned provides valuable information that can be used to improve the manufacturing process, strategic production and distribution, (Continued)

incentivize recycling of the metallic workpiece, and to improve deposit return programs.

23 Claims, 16 Drawing Sheets

Related U.S. Application Data

(60) Provisional application No. 63/245,623, filed on Sep. 17, 2021, provisional application No. 63/154,124, filed on Feb. 26, 2021.

(58) Field of Classification Search
CPC . G06Q 10/08; G06Q 10/0833; B65D 17/4012
See application file for complete search history.

(56) References Cited

U.S. PATENT DOCUMENTS

| | | | | |
|---|---|---|---|---|
| 3,286,302 | A | 11/1966 | Doering | |
| 3,818,335 | A | 6/1974 | Stungis et al. | |
| 3,898,417 | A | 8/1975 | Atkinson | |
| 4,024,545 | A | 5/1977 | Dowling et al. | |
| 4,165,399 | A | 8/1979 | Germonprez | |
| 4,203,240 | A | 5/1980 | Goodwin | |
| 4,280,427 | A | 7/1981 | Potts | |
| 4,304,981 | A | 12/1981 | Gappa | |
| 4,393,411 | A | 7/1983 | Amtower | |
| 4,449,042 | A | 5/1984 | Hampson et al. | |
| 4,467,207 | A | 8/1984 | Lerner et al. | |
| 4,485,935 | A | 12/1984 | Stoffel | |
| 4,559,729 | A | 12/1985 | White | |
| 4,568,230 | A | 2/1986 | Brown | |
| 4,635,545 | A | 1/1987 | Kubacki et al. | |
| 4,879,457 | A | 11/1989 | Ludden | |
| 4,922,077 | A | 5/1990 | Gordon | |
| 4,965,829 | A | 10/1990 | Lemelson | |
| 5,125,780 | A | 6/1992 | Budenbender | |
| 5,170,279 | A | 12/1992 | Schwartz et al. | |
| 5,177,368 | A | 1/1993 | Kay | |
| 5,202,199 | A | 4/1993 | Mitzutani et al. | |
| 5,215,864 | A | 6/1993 | Laakmann | |
| 5,235,454 | A | 8/1993 | Iwasaki | |
| 5,247,154 | A * | 9/1993 | Ahmed | G06K 1/126 382/152 |
| 5,315,108 | A | 5/1994 | Gross | |
| 5,331,443 | A | 7/1994 | Stanisci | |
| 5,353,356 | A * | 10/1994 | Waugh | B07C 5/10 382/160 |
| RE34,837 | E | 1/1995 | Iwanami et al. | |
| 5,401,979 | A | 3/1995 | Kooijman et al. | |
| 5,555,992 | A | 9/1996 | Sedgeley | |
| 5,632,916 | A | 5/1997 | Lappalainen et al. | |
| 5,653,900 | A | 8/1997 | Clement et al. | |
| 5,719,372 | A | 2/1998 | Togari et al. | |
| 5,742,037 | A | 4/1998 | Scola et al. | |
| 5,751,436 | A | 5/1998 | Kwon et al. | |
| 5,777,876 | A | 7/1998 | Beauchesne | |
| 5,788,076 | A | 8/1998 | Simmons | |
| 5,837,962 | A | 11/1998 | Overbeck | |
| 5,855,969 | A | 1/1999 | Robertson | |
| 5,864,788 | A | 1/1999 | Kutsumi | |
| 5,992,892 | A | 11/1999 | Schaefer et al. | |
| 6,021,266 | A | 2/2000 | Kay | |
| 6,053,349 | A | 4/2000 | Griggs, Jr. et al. | |
| 6,062,556 | A | 5/2000 | McCay | |
| 6,080,958 | A | 6/2000 | Miller et al. | |
| 6,105,806 | A | 8/2000 | Stasiuk | |
| 6,202,880 | B1 | 3/2001 | Strube et al. | |
| 6,314,562 | B1 | 11/2001 | Biggerstaff | |
| 6,390,368 | B1 | 5/2002 | Edwards | |
| 6,433,302 | B1 | 8/2002 | Miller et al. | |
| 6,460,723 | B2 | 10/2002 | Nguyen et al. | |
| 6,478,861 | B1 | 11/2002 | Kwan et al. | |
| 6,479,787 | B1 | 11/2002 | Jendick | |
| 6,498,318 | B1 | 12/2002 | Miller et al. | |
| 6,533,518 | B1 | 3/2003 | Turner et al. | |
| 6,685,094 | B2 | 2/2004 | Cameron | |
| 6,706,995 | B2 | 3/2004 | Miller et al. | |
| 6,745,384 | B1 | 6/2004 | Biggerstaff | |
| 6,808,351 | B1 | 10/2004 | Brown et al. | |
| 6,872,913 | B1 | 3/2005 | Jendick | |
| 6,877,607 | B2 | 4/2005 | Jenkins | |
| 6,926,487 | B1 | 8/2005 | Jendick | |
| 7,108,469 | B2 | 9/2006 | Jenkins | |
| 7,227,166 | B2 | 6/2007 | Cochran et al. | |
| 7,638,252 | B2 | 12/2009 | Stasiak et al. | |
| 7,972,426 | B2 | 7/2011 | Hinch et al. | |
| 8,146,768 | B2 | 4/2012 | Forrest et al. | |
| 8,608,007 | B2 | 12/2013 | Seo | |
| 8,708,188 | B2 | 4/2014 | Chapin | |
| 8,720,077 | B1 | 5/2014 | Fallisgaard | |
| 8,844,747 | B2 | 9/2014 | Petti | |
| 9,007,413 | B2 | 4/2015 | Boisvert et al. | |
| 9,186,924 | B2 | 11/2015 | Lewis | |
| 9,278,776 | B2 | 3/2016 | Ramsey et al. | |
| 9,340,368 | B2 | 5/2016 | Ellefson et al. | |
| 9,495,572 | B2 | 11/2016 | Sempere et al. | |
| 9,517,498 | B2 | 12/2016 | Siles et al. | |
| 9,592,569 | B2 | 3/2017 | Reed et al. | |
| 9,652,652 | B2 | 5/2017 | Aspert et al. | |
| 9,663,846 | B2 | 5/2017 | Siles et al. | |
| 10,073,443 | B2 | 9/2018 | Gorsuch et al. | |
| 10,108,888 | B2 * | 10/2018 | Ramsey | G06K 19/06046 |
| 10,118,729 | B2 | 11/2018 | Lewis | |
| 10,227,158 | B2 | 3/2019 | Miller, Jr. | |
| 10,421,111 | B2 | 9/2019 | Gorsuch et al. | |
| 10,442,564 | B2 | 10/2019 | Ojima et al. | |
| 10,549,921 | B2 | 2/2020 | Leitzen et al. | |
| 10,583,668 | B2 | 3/2020 | Yohn | |
| 10,726,288 | B2 | 7/2020 | Hirt et al. | |
| 10,810,394 | B2 | 10/2020 | Smith et al. | |
| 10,889,104 | B2 | 1/2021 | Noll et al. | |
| 11,192,390 | B2 | 12/2021 | Noll et al. | |
| 11,326,066 | B2 | 5/2022 | Amako et al. | |
| 11,534,817 | B2 | 12/2022 | Mercer et al. | |
| 11,739,024 | B2 | 8/2023 | Vandecruys et al. | |
| 11,884,056 | B2 | 1/2024 | Hughes et al. | |
| 2002/0075504 | A1 | 6/2002 | Fernandez et al. | |
| 2003/0015507 | A1 | 1/2003 | Miller et al. | |
| 2003/0044582 | A1 | 3/2003 | Sakoske | |
| 2003/0158795 | A1 | 8/2003 | Markham et al. | |
| 2004/0108237 | A1 | 6/2004 | McClintock | |
| 2005/0045637 | A1 | 3/2005 | Rohr et al. | |
| 2005/0075900 | A1 | 4/2005 | Arguimbau, III | |
| 2005/0174571 | A1 | 8/2005 | Cochran et al. | |
| 2005/0190367 | A1 | 9/2005 | Colvill et al. | |
| 2005/0256788 | A1 * | 11/2005 | Mukai | G06Q 10/0875 705/29 |
| 2006/0004475 | A1 * | 1/2006 | Brackett | G06F 16/215 700/115 |
| 2006/0047454 | A1 | 3/2006 | Tamaki et al. | |
| 2006/0117980 | A1 | 6/2006 | Cesak et al. | |
| 2006/0140746 | A1 | 6/2006 | Koon | |
| 2006/0151501 | A1 | 7/2006 | Chang et al. | |
| 2008/0011772 | A1 | 1/2008 | Morris et al. | |
| 2008/0302153 | A1 | 12/2008 | Kondo et al. | |
| 2009/0008859 | A1 | 1/2009 | Fairweather et al. | |
| 2009/0179375 | A1 | 7/2009 | Tamura et al. | |
| 2009/0204415 | A1 | 8/2009 | Baiera | |
| 2010/0024364 | A1 | 2/2010 | Schagidow et al. | |
| 2010/0088665 | A1 | 4/2010 | Langworthy et al. | |
| 2010/0131936 | A1 | 5/2010 | Cheriton | |
| 2010/0276466 | A1 | 11/2010 | Kameda | |
| 2011/0084051 | A1 | 4/2011 | Reed et al. | |
| 2011/0115815 | A1 | 5/2011 | Xu et al. | |
| 2012/0209783 | A1 * | 8/2012 | Smith, Jr. | G06Q 20/384 705/308 |
| 2012/0241043 | A1 | 9/2012 | Perazzo et al. | |
| 2013/0075401 | A1 | 3/2013 | Forrest | |
| 2013/0098928 | A1 | 4/2013 | Selepack et al. | |
| 2013/0224379 | A1 | 8/2013 | Kitamura et al. | |
| 2014/0084003 | A1 | 3/2014 | Ramsey et al. | |
| 2014/0271043 | A1 | 9/2014 | Butcher et al. | |

(56) References Cited

U.S. PATENT DOCUMENTS

| | | | |
|---|---|---|---|
| 2014/0271044 A1 | 9/2014 | Butcher et al. | |
| 2014/0291322 A1 | 10/2014 | Ramsey et al. | |
| 2015/0014984 A1 | 1/2015 | Decoux et al. | |
| 2015/0020205 A1 | 1/2015 | Wang et al. | |
| 2015/0020364 A1 | 1/2015 | Bonfoey | |
| 2015/0027327 A1 | 1/2015 | Ellefson | |
| 2015/0076218 A1 | 3/2015 | Wood et al. | |
| 2015/0158627 A1 | 6/2015 | Ramsey et al. | |
| 2015/0174638 A1 | 6/2015 | Anguera et al. | |
| 2015/0174917 A1 | 6/2015 | Noll et al. | |
| 2015/0209854 A1 | 7/2015 | Selepack | |
| 2015/0235233 A1 | 8/2015 | Dangmann et al. | |
| 2015/0239272 A1 | 8/2015 | Selepack et al. | |
| 2015/0243108 A1* | 8/2015 | Nakayama | H05K 13/083 702/81 |
| 2015/0353236 A1 | 12/2015 | Gentile et al. | |
| 2015/0375943 A1 | 12/2015 | Ellefson et al. | |
| 2016/0016687 A1 | 1/2016 | Ramsey et al. | |
| 2016/0034805 A1 | 2/2016 | Ramsey | |
| 2016/0046033 A1 | 2/2016 | Zuech et al. | |
| 2016/0114501 A1 | 4/2016 | Carson et al. | |
| 2016/0179909 A1* | 6/2016 | Wells | G06Q 10/087 235/385 |
| 2016/0221065 A1 | 8/2016 | Butcher et al. | |
| 2016/0332772 A1 | 11/2016 | Ramsey | |
| 2016/0350090 A1 | 12/2016 | Kawaguchi | |
| 2017/0061350 A1* | 3/2017 | Smith | G06Q 10/08 |
| 2017/0132724 A1* | 5/2017 | Aqlan | G06Q 10/063112 |
| 2017/0197241 A1 | 7/2017 | Ellefson | |
| 2017/0349343 A1 | 12/2017 | Wu et al. | |
| 2018/0015498 A1 | 1/2018 | Nicol et al. | |
| 2018/0032951 A1* | 2/2018 | Chanez | G06Q 10/0832 |
| 2018/0046114 A1 | 2/2018 | Stowitts | |
| 2018/0164719 A1 | 6/2018 | Stowitts | |
| 2018/0197053 A1* | 7/2018 | Picard | G06K 7/1417 |
| 2018/0273233 A1 | 9/2018 | Giampietro | |
| 2018/0345709 A1 | 12/2018 | Loccufier et al. | |
| 2019/0018396 A1* | 1/2019 | Gorsuch | B23K 26/0846 |
| 2019/0084029 A1 | 3/2019 | Jentzsh et al. | |
| 2019/0095928 A1 | 3/2019 | Lane | |
| 2019/0234974 A1 | 8/2019 | Wiederin et al. | |
| 2019/0240703 A1* | 8/2019 | Kiefer | G05B 19/4183 |
| 2019/0329955 A1 | 10/2019 | Thompson | |
| 2019/0354094 A1* | 11/2019 | Lin | G06F 16/24578 |
| 2020/0016918 A1 | 1/2020 | Weiss et al. | |
| 2020/0047480 A1 | 2/2020 | Gamito et al. | |
| 2020/0070494 A1 | 3/2020 | Lefevre et al. | |
| 2020/0174462 A1* | 6/2020 | Sirohi | G05B 13/042 |
| 2020/0175239 A1 | 6/2020 | Herrera et al. | |
| 2020/0210664 A1 | 7/2020 | Taylor | |
| 2020/0219112 A1* | 7/2020 | Nakayama | B65G 61/00 |
| 2020/0342463 A1 | 10/2020 | Whittington et al. | |
| 2020/0356798 A1 | 11/2020 | Kotula | |
| 2021/0087043 A1 | 3/2021 | Szeteli et al. | |
| 2021/0089727 A1 | 3/2021 | Moran | |
| 2021/0132597 A1 | 5/2021 | Saunders, Jr. et al. | |
| 2021/0162733 A1 | 6/2021 | Ojima et al. | |
| 2021/0206186 A1 | 7/2021 | Ramsey | |
| 2021/0214152 A1 | 7/2021 | Thompson et al. | |
| 2021/0232128 A1 | 7/2021 | Kiefer et al. | |
| 2021/0261290 A1 | 8/2021 | Chiji et al. | |
| 2021/0276069 A1 | 9/2021 | Johnson et al. | |
| 2021/0309004 A1 | 10/2021 | Atramiz et al. | |
| 2021/0362537 A1 | 11/2021 | Ramsey | |
| 2021/0379131 A1 | 12/2021 | Alsayar et al. | |
| 2022/0032670 A1 | 2/2022 | Yamada et al. | |
| 2022/0097436 A1 | 3/2022 | Schutte et al. | |
| 2022/0108142 A1 | 4/2022 | Bathelet | |
| 2022/0126599 A1 | 4/2022 | Miller et al. | |
| 2022/0134789 A1 | 5/2022 | Goldstein | |
| 2022/0143754 A1 | 5/2022 | Hori et al. | |
| 2022/0148457 A1 | 5/2022 | Takaoka | |
| 2022/0164936 A1 | 5/2022 | Shibata et al. | |
| 2022/0274729 A1 | 9/2022 | Kelly et al. | |
| 2022/0363438 A1 | 11/2022 | Vandecruys et al. | |
| 2023/0049800 A1 | 2/2023 | Eve et al. | |
| 2023/0081638 A1* | 3/2023 | Tochigi | G06Q 10/0639 53/396 |
| 2023/0186252 A1* | 6/2023 | Burke | G06Q 10/20 |

FOREIGN PATENT DOCUMENTS

| | | |
|---|---|---|
| CA | 2867218 | 9/2013 |
| CA | 2778711 | 9/2015 |
| CA | 2769856 | 4/2017 |
| CN | 1313801 | 9/2001 |
| CN | 102009222 | 4/2011 |
| CN | 102409364 | 4/2012 |
| CN | 103715390 | 4/2014 |
| CN | 103786057 | 5/2014 |
| CN | 203845533 | 9/2014 |
| CN | 113329887 | 8/2021 |
| CN | 118348932 | 7/2024 |
| EP | 0993964 | 4/2000 |
| EP | 1467306 | 10/2004 |
| EP | 1123772 | 12/2006 |
| EP | 1123815 | 3/2011 |
| EP | 1590108 | 6/2011 |
| EP | 3556675 | 10/2019 |
| EP | 3660654 | 6/2020 |
| EP | 3751529 | 12/2020 |
| EP | 3858616 | 8/2021 |
| EP | 4129492 | 2/2023 |
| FR | 3063367 | 8/2018 |
| GB | 2154775 | 9/1985 |
| GB | 2320008 | 6/1998 |
| GB | 2428659 | 11/2007 |
| GB | 2428668 | 7/2008 |
| GB | 2576679 | 2/2020 |
| JP | S63-252746 | 10/1988 |
| JP | H08-175006 | 7/1996 |
| JP | H09-226776 | 9/1997 |
| JP | 3971064 | 9/2007 |
| JP | 4532259 | 8/2010 |
| JP | 2011-006093 | 1/2011 |
| JP | 2011-011760 | 1/2011 |
| JP | 2011-016545 | 1/2011 |
| JP | 2011-016546 | 1/2011 |
| JP | 2011-20701 | 2/2011 |
| SU | 791207 | 12/1980 |
| WO | WO 2005/104005 | 11/2005 |
| WO | WO 2007/007102 | 1/2007 |
| WO | WO 2009/069517 | 6/2009 |
| WO | WO 2011/053776 | 5/2011 |
| WO | WO 2013/049313 | 4/2013 |
| WO | WO 2013/135899 | 9/2013 |
| WO | WO 2013/138595 | 9/2013 |
| WO | WO 2013/155423 | 10/2013 |
| WO | WO 2014/028360 | 2/2014 |
| WO | WO 2014/063837 | 5/2014 |
| WO | WO 2014/072455 | 5/2014 |
| WO | WO 2014/150647 | 9/2014 |
| WO | WO 2014/152858 | 9/2014 |
| WO | WO 2014/187474 | 11/2014 |
| WO | WO 2016/168636 | 10/2016 |
| WO | WO 2016/183452 | 11/2016 |
| WO | WO 2017/027727 | 2/2017 |
| WO | WO 2018/033627 | 2/2018 |
| WO | WO 2018/109110 | 6/2018 |
| WO | WO 2018/206543 | 11/2018 |
| WO | WO 2019/049454 | 3/2019 |
| WO | WO 2019/238791 | 12/2019 |
| WO | WO 2020/035835 | 2/2020 |
| WO | WO 2020/067099 | 4/2020 |
| WO | WO 2021/220900 | 11/2021 |
| WO | WO 2022/183054 | 9/2022 |
| WO | WO 2022/271692 | 12/2022 |
| WO | WO 2023/017303 | 2/2023 |

(56) References Cited

FOREIGN PATENT DOCUMENTS

| | | |
|---|---|---|
| WO | WO 2023/017304 | 2/2023 |
| WO | WO 2023/017305 | 2/2023 |

OTHER PUBLICATIONS

"Beverage Cans and Ends," ArdaghGroup, 2016, 13 pages.
"Bringing Augmented Reality to Cans," Crown, 2021, 2 pages.
"Charisma of laser marking on the pop can," hglaser.com, May 20, 2018, 4 pages [retrieved online Jul. 30, 2020 from: en.hglaser.com/news/16765_for_CompanyNews_text.htm].
"F-Series for Beverage Premium Fibre Laser," Domino, 2021, 5 pages.
"Inside a Ball Beverage Can Plant," Ball, Sep. 2002, 1 page [retrieved online from: www.ball.com/Ball/media/Ball/Global/Downloads/How_a_Ball_Metal_Beverage_Can_Is_Made.pdf?ext=.pdf].
"High-Speed Marking on Beverage Cans," BNP Media, Dec. 3, 2021, 3 pages.
"How Ball Makes Beverage Ends," Ball, last modified Dec. 5, 2013, 1 page [retrieved from: http://www.ball.com/images/ball_com/product_options_files/How_Ball_Makes_Beverage_Ends.pdf].
"How Ball Makes Three-Piece Welded Cans," Ball, Feb. 2017, 1 page [retrieved online from: www.ball.com/Ball/media/Ball/Global/Downloads/How_Ball_Makes_Three-Piece_Weldedl_Food_Cans.pdf?ext=.pdf].
"How Ball Builds Better Cans," Ball, Feb. 2017, 2 pages [retrieved online from: www.ball.com/Ball/media/Ball/Global/Downloads/How-Ball-Builds-Better-Cans_2.pdf?ext=.pdf].
"Lasered Tabs," Ball Corporation, 2016, 2 pages [retrieved online Jul. 30, 2020 from: www.ball.com/na/solutions/markets-capabilities/capabilities/beverage-ends/lasered-tabs].
"Videojet® Allprint LN100A ND: YAG Laser Marking System," Videojet Technologies Inc., © 2010, 2 pages.
Arthur "CrownSmart uses scannable codes under can tabs to give insight into consumer behaviour," Container and Packaging, William Reed Business Media Ltd, Nov. 19, 2015, 2 pages [retrieved online Jul. 30, 2020 from: www.beveragedaily.com/Article/2015/11/19/CrownSmart-uses-scannable-codes-under-can-tabs-to-give-insight-into-consumer-behaviour#].
Glinz "QR-Code Marking on Beverage Can Lids," FOBA Blog, Apr. 13, 2018, 2 pages [retrieved online Jul. 30, 2020 from: www.fobalaser.com/blog/qr-code-markierung-auf-getraenkedosen].
Mccauley "How to silk print barcodes and make them scannable," Container and Packaging Supply, Inc., Sep. 8, 2020, 11 pages [retrieved online Jul. 30, 2020 from: www.containerandpackaging.com/resources/how-to-silk-print-barcodes-and-make-them-scannable-2/].
Nachtrieb "Printing Barcodes on Metal," barcode-test.com, Jun. 24, 2013, 2 pages [retrieved online Jul. 30, 2020 from: barcode-test.com/301/printing-barcodes-on-metal].
International Search Report and Written Opinion for International (PCT) Patent Application No. PCT/US22/41239, dated Jan. 18, 2023 19 pages.
Partial Supplementary Search Report for European Patent Application No. 22870490.4, dated Nov. 18, 2025 10 pages.
Official Action with English Translation for Russia Patent Application No. 2024106775/11, dated Oct. 13, 2025 15 pages.
Official Action with English Translation for Russia Patent Application No. 2024106775/11, dated Jan. 19, 2026 25 pages.
Extended Search Report for European Patent Application No. 22870490.4, dated Feb. 10, 2026 9 pages.

* cited by examiner

APPARATUS AND METHOD OF ENGRAVING MACHINE READABLE INFORMATION ON A METALLIC WORKPIECE DURING MANUFACTURING AND TRACKING SYSTEMS RELATED THERETO

CROSS REFERENCE TO RELATED APPLICATIONS

This is a Continuation-In-Part application of and claims priority and benefit to U.S. application Ser. No. 17/681,549, filed Feb. 25, 2022, which claims priority and benefits under 35 U.S.C. § 119(e) to U.S. Provisional Patent Application Ser. No. 63/154,124 filed on Feb. 26, 2021, and this application claims priority and benefits under 35 U.S.C. § 119(e) to U.S. Provisional Patent Application Ser. No. 63/245,623 filed on Sep. 17, 2021, which are each incorporated herein in their entirety by reference.

FIELD

The present disclosure relates generally to systems, methods, and apparatus for marking a metallic workpiece, such as a container, an end closure, a roll-on pilfer proof (ROPP) closure, or other metal packaging, for tracking and tracing throughout its lifecycle.

BACKGROUND

Metal packaging, such as metallic containers, offers distributors and consumers many benefits and is used to store a variety of products including beverages and food products. The body of a metallic container provides enhanced protection properties for beverages and other liquids, foodstuffs, and a variety of other products including personal care items such as deodorant, sunscreen, hair spray, and the like. The surfaces of metallic containers are also ideal for decorating with brand names, logos, designs, product information, and/or other preferred indicia for identifying, marketing, and distinguishing the metallic container and its contents from other products and competitors. Thus, metallic containers offer bottlers, distributors, and retailers an ability to stand out at the point of sale.

Metallic containers are frequently produced by a draw and wall ironing (DWI) process. Production lines generally start with an uncoiler that unrolls a coil of an aluminum sheet. Two or more coils of aluminum sheet may be used each day for a production line. The aluminum sheet is fed into a cupper which cuts circular blanks from the aluminum sheet and forms the blanks into cups.

The cups are then transported by a conveyor to a bodymaker. The bodymaker forms the cups into container bodies. The production line may have two or more bodymakers that operate in parallel. Some production lines have seven or more bodymakers.

The container bodies are subsequently transported to downstream equipment which performs additional operations on the container bodies. The equipment downstream from the bodymakers may include trimmers, washers, ovens, decorators, internal coaters, neckers, flangers, and palletizers. Container bodies produced by two or more bodymakers may be combined on a single conveyor as the container bodies are transported to the downstream equipment.

Monitoring the health and performance of the equipment is critical for efficient operation of a container production line. When equipment on the production line malfunctions or operates out of specification, a large number of container bodies that are deficient may be produced in a very short period of time. For example, some production lines produce 2,000 container bodies per minute. Accordingly, it is very important to quickly trace the cause of a deficient container body to equipment that caused the deficiency.

The bodymakers may produce a mark on the dome of the container bodies. Referring now to FIG. 1, a picture of a prior art mark 6 formed on a dome 4 at a closed end of a container body 2 is provided. Some prior art bodymakers produce two numbers on the public side of the dome, similar to the "35" shown in FIG. 1. One mark 6A (the number "3" in this example) may refer to a production line of a production facility. Another mark 6B (in this example, the number "5") may identify the bodymaker in the production line. The mark (or marks) 6 produced by a bodymaker do not change; the same mark 6 is formed by the bodymaker on each container body it produces until the bodymaker is disassembled and the marking dies are changed. Accordingly, the bodymaker does not produce a mark that is unique for each container body.

The mark 6 is used to identify a bodymaker and a production line that produced the container body. The mark 6 is used for troubleshooting of the production line. However, because a production line typically has more than two bodymakers operating in parallel, and container bodies from multiple bodymakers are normally transported by one conveyor to downstream equipment (such as a washer), the mark 6 cannot be used to identify other equipment on the production line that performs subsequent operations on the container bodies. Further, the time or date the container body is produced or when other operations are performed are not recorded and cannot be traced by the mark 6.

Other problems with the mark 6 formed by the bodymaker is that it cannot be used to track the container bodies after they leave the production facility and the mark cannot be used to encourage recycling. The mark 6 also cannot be used to trace the container body back to a particular coil of the aluminum sheet from which the cupper cut a blank used to form the particular container body. Thus, the mark 6 produced by a bodymaker cannot be used to identify the manufacturer of the coil of the aluminum sheet used to produce a container body. Accordingly, deficiencies in a container body that are caused by a problem with the aluminum sheet cannot be traced back to the manufacturer after the container body leaves the production line.

As will be appreciated by one of skill in the art, the tooling within the bodymaker that forms the mark 6 wears out over time. Wear and degradation of the tools that form the mark results in a lack of definition of the mark 6 formed on the container bodies. The lack of definition of a mark 6 formed by worn out tooling results in poor readability. Some inspection systems of production lines use cameras to read the marks 6 on container bodies. Marks 6 formed by a bodymaker with damaged or worn out marking dies may not have sufficient definition and clarity to be read by the cameras of the inspection system resulting in erroneous tracking and incorrect identification of a bodymaker responsible for production of a container body that is deficient.

Some equipment downline from the bodymakers may also produce additional marks on the container bodies. For example, a date code may be applied as part of a decoration. Other equipment, such as an internal coater, may add an identification mark to a container body. These marks also have deficiencies, including deficiencies similar to the mark 6 formed by the bodymaker. Specifically, the marks formed as part of a decoration or by an internal coater are not unique to each container body and may not include a time stamp. Accordingly, these marks also cannot be used to track an individual container body and cannot be used to trace the container body once it leaves a production facility. Moreover, the equipment or tooling used to form the marks downline from the bodymakers may also require maintenance and would not be necessary if a single piece of equipment would form a unique mark for each container body at or near the beginning of the production line.

Tracking and tracing of container bodies is also important for recycling programs. Recycling of used metallic containers is important for a number of reasons. Recycling has been, and continues to be, one of the primary ways to reduce pollution, contaminants, and related negative environmental effects. Pollution is a particularly acute issue for food and beverage packaging since consumers buy and consume food and beverages stored in disposable packaging on a frequent and periodic basis. Recycling of metal packaging diverts food and beverage containers as well as other consumer products away from landfills and oceans to manufacturing plants where the packaging is reused to create additional packaging or to make completely unrelated products. As a result, pollution and contaminants in landfills and oceans are reduced.

In addition, less raw material is extracted from the Earth when metal packaging is produced from recycled metal material which further reduces negative effects on the environment. Recycling used aluminum containers and using the recovered aluminum to form a new container body reduces the energy required to produce the new container body by 90% compared to a container body formed from virgin aluminum material. Thus, it is important to increase the rate of recycling of metal packaging.

Tracking and tracing container bodies at the end of life is also important because used metal packaging is very valuable. For example, used beverage cans are about ten times more valuable than glass, and about six times more valuable than clear PET. The homogenous design of metallic containers and use of a material, such as aluminum, that is endlessly recyclable through simple remelting, means that the recycling of used metallic containers is a profitable activity. Accordingly, accurate record keeping and tracking of metallic containers collected at a recycling center is important. However, prior art marks 6 formed on container bodies are not unique and cannot be used to track or identify individual container bodies 2 of the prior art.

It would be beneficial to track a container body from a production line until end of life to monitor disposal and recycling of the container body. Recycling rates vary greatly globally and regionally. Collecting data on the lifecycle of container bodies from production to end of life collection is useful for analyzing recycling rates. Analyzing data collected on a container body as it moves from a production line, to a filler, to a point of sale, and from the point of sale to a consumer and then to a collection point at end of life may identify deficiencies in a distribution program or a recycling program. The information may also help identify successful recycling programs that could be implemented in other areas. For example, analyzing the lifecycle of a container body may be used to identify shortcomings in recycling (or collecting) infrastructure and deficiencies in collection centers. Unfortunately, the marks 6 currently formed on container bodies 2 provide a very limited amount of information that gives little insight into the life cycle of an individual container body.

One way to increase recycling rates is through effective incentive programs. Recycling is incentivized in a number of ways. For instance, a commercial advertisement campaign can be used to provide information to consumers and to persuade consumers to recycle. Some U.S. states and other countries have programs where a container or other product can be returned for money. For example, California has a recycling program in which consumers pay a deposit fee, for example, $0.05, when purchasing a beverage container. Beverage containers purchased in California can be returned to a California recycling center and receive a redemption of the $0.05 per container deposit fee.

There are several issues with existing recycling programs, information, and incentives. Because a container body does not have a unique mark that can be used to identify a location of purchase and to track the lifecycle of the container body, it is possible to cheat or defraud recycling programs such as the California program. For example, people in a first region that does not charge consumers a deposition fee may transport used container bodies to a recycling center in a second region (such as California) to fraudulently recover the deposit fee redemption.

Further, a container body could be taken (or stolen) from a recycling center after the deposit fee for the container body has been redeemed. The container body could then be returned to a deposit center and redeemed a second time.

Accordingly, record keeping, such as identification of container bodies that are returned to a recycling center and redeemed for a deposit is critical to prevent fraud. However, the marks 6 currently formed on container bodies 2 do not provide sufficient information to uniquely identify each container body. Providing a unique mark to individually identify each container body would provide a means to improve record keeping of individual container bodies and help reduce fraud associated with current recycling incentive programs.

A unique mark formed on each container body could be used to track recycling rates of each brand and each product in a container body as well as recycling rates for (or in) a region or portion of a region. For example, the unique mark for each container body could be stored in a record (such as in a database). When the container body is filled, the record could be updated with information about the product. If the container body is turned in to a collection point (such as a recycling center) at its end of life, the unique mark may be scanned and the record in the database may be updated again. Analyzing this data could identify deficiencies in recycling rates in a region, for a brand, for a type of product, or for a type or style of container body. With this information, trends could be identified and targeted advertising could be used to incentivize recycling. If a container body could be tracked after production, brands could target recycling marketing if, for instance, tracking information indicates that consumers of beverage A in a first geographic region are not recycling at a rate comparable to consumers of beverage A in a second geographic region. Unfortunately, the current marks 6 formed on container bodies do not provide enough information to track container bodies in this manner.

Advertisement campaigns are expensive, and thus, are not persistent in the minds of consumers. Moreover, with so many different means and platforms for receiving advertisements, a given consumer who does not monitor all means and platforms may simply miss an advertisement for a recycling program. Recycling programs in the U.S. are run by states, and thus, a given consumer may not be aware of a specific recycling program when traveling or moving between states. In addition, monetary incentives such as a 5¢ per container deposit refund may not sufficiently incentivize a consumer to travel to a recycling center to return a container. Thus, there is a need to provide incentives to consumers to encourage recycling and to enable manufacturers and retailers to track the lifecycle of recyclable products. Unfortunately, the mark 6 formed by prior art bodymakers cannot be used to track container bodies to end of life collection.

Accordingly, there is an unmet need for methods and apparatus of forming a mark that is unique on a metallic workpiece, such as a container body or other metal packaging, for tracking and tracing the metallic workpiece during production, during distribution, and to end of life collection without sacrificing production efficiency in a high-speed manufacturing process. There is also a need for a system of tracking and tracing each individual metallic workpiece through all phases of the manufacturing process and for identifying some or all pieces of equipment that perform an operation on the container body during the metallic workpiece. Moreover, there is a need for a system and method of tracking a metallic workpiece from the end of the manufacturing process to a consumer and until the metallic workpiece is collected at its end of life. Another needed piece of information is a time stamp collected at different locations and phases as an individual metallic workpiece moves through the manufacturing process, enters the distribution stream, is purchased, and then collected at end of life.

SUMMARY

In one aspect of the present disclosure is a system and a method of providing a mark on a metallic workpiece, the mark being unique to each metallic workpiece. A metallic workpiece with a mark that is unique and according to the present disclosure can be tracked and traced through every step of a manufacturing process from coil to pallet of a production line that manufactures the metallic workpiece. In this manner, each piece of equipment that handles the metallic workpiece or that performs an operation on the metallic workpiece can be identified. Moreover, after the metallic workpiece leaves a production facility, the mark may be scanned as the metallic workpiece travels to a filler. Thereafter, the mark may be scanned as the metallic workpiece moves through a distribution system to a point of sale, to a consumer, and then to a point of collection, such as a recycling center, when the metallic workpiece reaches its end of life. In this manner, the metallic workpiece can be tracked from cradle to grave by scanning the mark.

The mark, or marks, can be applied using various marking technologies at different points in the manufacturing process. Moreover, further technologies support the marking technologies including technologies for orienting and/or stabilizing a metallic workpiece for marking. Additionally, the manufacturing process may be altered to decrease the rate of movement of the metallic workpiece to provide marking equipment sufficient time to form the mark. For example, a single lane conveyor in a portion of the manufacturing process may be changed to include from two to twenty parallel lanes to decrease the rate of movement of a metallic workpiece relative to the marking equipment. As a result, one or more marks are applied to a metallic workpiece that serves as a container, a container body, an end closure, a tab, etc.

The mark may be formed on any part of a container, a can, a bottle, an end shell or end closure, a tapered cup, etc. For example, the mark may be formed on a closed end of a container such as an inwardly-extending dome, a cup base, a region of a container that is interior to a container standing surface, etc. This location may be advantageous for a mark since the closed end will typically remain intact even after the container is crushed or damaged.

Additionally, or alternatively, a mark may be formed on a body of a container such as a label portion or a neck portion. The label portion of a container is generally the cylindrical portion of a container where a label or decoration is placed. The label portion is highly visible which is useful for scanning a mark during the manufacturing process and at subsequent locations. The neck portion of a container includes the radius and angled necked regions of, for instance, a can or bottle. This neck portion is also highly visible which is useful for scanning a mark.

The end shell that forms part of an end closure can also bear a mark, or marks. In particular, the mark can be placed on either (or both) the product side that contacts the contents of the container or the public side that an end user views and contacts. In some embodiments, the mark is applied to the product side of the end shell, and then later in the manufacturing process the mark is copied to the public side of the end shell. Thus, the same mark can be viewed and scanned without needing to reorient the end shell. In other embodiments, the end shell has different marks, one on the product side for tracking and tracing the end shell during manufacturing, and one on the public side for tracking and tracing the finished container after manufacturing.

A mark can also be applied to a tab of an end closure. This location may be advantageous for scanning a mark since a user readily interacts with and operates the tab. The mark can even be placed on an underside of a tab as discussed herein.

Finally, a mark may also be applied to a cap of a container such as a bottle. The mark can be applied to any portion of, for instance, a coated aluminum, unthreaded cap with a polymer seal disk. The mark can also be applied to pilfer-proof cap.

A variety of different marking technologies may apply the mark to a metallic workpiece. For example, a continuous inkjet (CIJ) printer can apply a mark to a metallic workpiece with a pressurized flow of ink that is sprayed onto the metallic workpiece as the metallic workpiece moves during the manufacturing process or as the metallic workpiece is stationary, for instance, during a dwell period as described herein. In some embodiments, metallic workpieces are separated into multiple lanes to slow the production speed. This type of printing can apply marks up to 12×12 mm in size but can also apply marks 6×6 mm in size and smaller. In some embodiments, the ink is a toner ink that is suitable for printing various shapes as the toner is fast curing, has high adhesion, and is resistant to abrasion with no impact on mobility.

Drop on demand (DoD) inkjet printing is a type of printing where piezo or thermal modes of jetting ink are used to deposit ink onto a metallic workpiece to form a mark with resolutions up to 600 dots per inch (236 dots per cm). This type of printing can produce a mark with a height or size up to between 10-12 mm when a single print head is used. An array comprising two to twenty DoD print heads can produce a mark of up to 70 mm. In some embodiments, the mark can be between 50-80 mm. A solvent ink may be used with drop on demand inkjet printing on a non-porous metallic workpiece such as aluminum. In various embodiments, the DoD print head is positioned between 1-5 mm from the metallic workpiece, and a drying time of between 0.5-20 seconds is required.

In some embodiments, drop on demand inkjet printing may jet one of a solvent, an ultraviolet cure material, and/or a thermal cure material. In embodiments with an ultraviolet cure material, the ink is applied to a metallic workpiece, then the ink is cured. The ink can be cured without an exterior source within about one second. However, one or more radiation sources can emit radiation on the ink to speed the curing time. These radiation sources can emit the same or different wavelengths. In some embodiments, at least one radiation source emits ultraviolet radiation between approximately 10-400 nm wavelengths, or even between 200-400 nm wavelengths, and at least one further radiation source is a mercury lamp that emits radiation in spectrum of wavelengths that at least partially includes radiation within the spectrum of ultraviolet radiation. The light initiates photochemicals in the ink which causes crosslinking in a polymer matrix. In a further embodiment, one or more radiation sources are light-emitting diode (LED) ultraviolet (UV) lamps.

Electrostatic jetting is a type of drop on demand inkjet printing where an array of ejector electrodes is positioned inline within the printing head. Voltage is varied to the electrodes to control the ink accumulated on top of the electrodes, and thus, control the ejected drop volume. In various embodiments, this type of printing deposits ink on a metallic workpiece positioned up to about 1-10 mm from the electrodes.

A variety of laser technologies may also apply a mark to a metallic workpiece. Laser etching can be used to ablate, selectively oxidize, and/or remove an over varnish and/or ink on, for instance, a surface of a decorated container to expose the base material. The selective exposing of the base material produces a mark, and the removal of only a varnish and/or ink does not impact the structural integrity of the container. The exposed base material can be allowed to stain in subsequent washing and/or thermal operations to produce a more visible mark.

In some embodiments, a laser may ablate and vaporize a small portion of a metallic workpiece but not substantially impact the structural integrity of, for example, the resulting container. The vaporization changes, for example, a reflectivity of part of the container to produce a mark. In some embodiments, a laser used to form a mark on a metallic cup may ablate or vaporize more material because the metallic cup is not sealed and does not retain a product under pressure. The removal of more material can produce a mark with increased contrast that is more easily scanned.

In yet a further embodiment, a laser is used to slowly heat the metallic workpiece to diffuse oxygen below the surface of the workpiece, which oxidizes a portion of the workpiece with a different color to produce a mark. As discussed herein, a laser can also activate a thermally and/or light sensitive ink on part of a metallic workpiece. Portions of the ink are activated to produce the mark without impacting the structurally integrity of, for example, the resulting container.

Digital printing can produce a unique mark on a metallic workpiece. In some embodiments, different print heads all with the same color can increase production speed by coordinating and combining to print a given mark faster. In other embodiments, one print head produces one mark at a time, and a production line with multiple print heads can increase overall production speed. In yet further embodiments, different print heads with different colors can produce a mark with different colors. The print heads may deposit ink directly onto a metallic workpiece or onto a printing plate, which then contacts the metallic workpiece.

Watermark technology can also be used to form a mark on a metallic workpiece where the watermark has low visibility and does not interfere with other marks or decorations on, for instance, the resulting container. Specifically, in some embodiments, a plate of a decorator applies an ink to a container body to form a mark that is imperceptible, or nearly imperceptible to humans. The brightness and intensity of the color or colors that form the mark are adjusted to be imperceptible to humans, yet the mark is easily read by scanners and other sensors to detect track and trace the mark and container body through the manufacturing process and/or end user applications. Further, in some embodiments, spaces between two different colors are adjusted to form a mark. As a result, instead of relying on, for instance, a black and white barcode in one location on a finished container, multiple marks can be applied all over the finished container without interfering with the decoration.

Finally, fingerprinting technology can use variations in the metallic workpiece and/or resulting container itself as a mark. A container has distinct variations in appearance outside of the decoration applied to metallic workpieces and/or containers in a lot or sequence. These variations can include patterns in the metal, ink, varnish, etc. Thus, a camera or other sensor can detect or take a picture of the metallic workpiece and/or resulting container which is used to identify distinct variations to use as a "fingerprint." A subsequent sensor can detect this fingerprint to add data to a record of the container. These marking technologies are exemplary in nature, and embodiments of the present disclosure encompass a variety of marking technologies.

Next, various treatments may condition a metallic workpiece for these various marking technologies. For instance, a metallic workpiece can be subjected to a plasma or coronal treatment that burns oil and/or impurities from the surface of the metallic workpiece and increases the surface energy of the metallic workpiece before, for instance, a primer application or ink application. In some embodiments, this treatment is critical for controlling the adhesion of a primer, an ink, or other material to a metallic workpiece. The primer can be white or clear in various embodiments, and the primer helps promote adhesion of a subsequent ink. Moreover, washing and/or oxidation of a metallic workpiece can improve the surface tension of the workpiece for the application of inks and can even eliminate the need for a primer. It will be appreciated that these treatments may be located prior to a decoration or ink application station of a production line and the metallic workpiece is typically a container body, however, these treatments can be located at any point in a production line of a manufacturing process and can be applied to any metallic workpiece.

In addition, control systems can be used to synchronize marking technologies with existing components, stations, and equipment on a production line of a manufacturing process. Specifically, timing control is critical as metallic workpieces such as container bodies can pass through a station on a production line at a rate of thousands per minute or more. Thus, timing control can change a speed or output of various stations or lines with, for instance, encoder wheels, reading the speed from variable frequency drives that power the movement of equipment on the production line, and reading signals from servo drives. Moreover, the position of a metallic workpiece can be stabilized with a star wheel, feed screws, variable speed vacuum conveyance, etc. as described herein. Multiple markers can also increase the rate of marking a metallic workpiece to match production line speeds.

The marking technologies can apply a mark to a metallic workpiece at various locations in the manufacturing process. In some embodiments, a marker forms a mark on a continuous sheet of metallic material before blanks are cut or punched from the continuous sheet. For example, in some embodiments, the marker forms the mark before the continuous sheet is fed into a cupper or blanking operation. Specifically, the mark can be formed as the continuous sheet is stationary during a dwell period of the cupper or blanking operation, such as between incremental movements of the continuous sheet. Advantageously, the continuous sheet has low lubrication and debris contamination at this point in the manufacturing process which leads to a higher quality mark.

The marker is operable to form a mark which is unique for each container body produced by the production line. The mark is formed at each location of the continuous sheet where a blank will be cut. As will be appreciated by one of skill in the art, the blank is generally circular.

In some embodiments, the blank is cut by a cupper. The cupper may be on a production line that manufactures container bodies.

Alternatively, the blank is cut from the coil by equipment other than a cupper, such as a blanker. For example, in some embodiments, a blank is cut from a coil by a blanker at a site where the coil is manufactured. The blanker may be at an aluminum rolling mill or other similar production facility that manufactures coils of metallic material. Thereafter the blank is shipped to the production facility with a production line that transforms the blank into a container body.

Optionally, the marker can form the mark at two or more portions of the blank location. In this manner, each container body may have the unique mark at two or more locations.

In some embodiments, the mark is formed at each blank location on only a first side of the continuous sheet of metallic material. The first side of the continuous sheet may subsequently define an exterior surface of the container body such that the mark is positioned on a portion of the exterior surface (or "public side") of the container body. Alternatively, the first side of the continuous sheet may form an interior surface (or "product side") of the container body.

In some embodiments, the marker may form the mark on a portion of a blank location that will form a closed end of a container body. The mark may be centered on the closed end or offset from a center in some embodiments. Additionally, or alternatively, the marker can form the mark on a portion of a blank location that will form a sidewall or cylindrical portion of a container body. When a blank with the mark in the blank location is formed into a container body, the mark may be on the exterior surface or the interior surface of the container body. The marks on the continuous sheet can be synchronized with subsequent operations in the manufacturing process to ensure that the mark appears consistently in the same location and same orientation. For example, the marks on the continuous sheet are synchronized with a shell press to ensure the mark appears consistently on an end closure. In some embodiments, a marker such as a laser can form multiple marks, or multiple lasers can form a single mark.

Optionally, a first marker is positioned to form a first mark on a first side of a first blank location of the continuous sheet. A second marker is positioned to form the same first mark on a second side of the first blank location of the continuous sheet. In this manner, in some embodiments, the first mark may be formed on both sides of the continuous sheet of the first blank location where a blank will be cut from the continuous sheet. Accordingly, a container body may have the first mark positioned on its exterior surface or public side. The same first mark can be repeated on an interior surface (or product side) of the container body to allow for readability and scanning of the mark at any point in the manufacturing process where either the product side or public side is exposed.

Optionally, the first mark formed on the first side of the first blank location is positioned approximately opposite to a position of the first mark formed on the second side of the first blank location. Alternatively, the first mark on the first side is offset from the first mark on the second side. In this manner, the first mark may be positioned on a closed end on a first surface of the container body and the first mark can be positioned on a sidewall on a second surface of the container body. In various embodiments, the first mark is formed on the sidewall after the container body is formed by an ironing process.

In some embodiments, a mark is only formed on a first side of the continuous sheet.

In other embodiments, a mark is only formed on a second side of the continuous sheet.

Optionally, a mark may be formed on both a first side and a second side of the continuous sheet.

The mark formed by the marker is adapted to be read or scanned by a scanner. The mark may comprise any combination of letters, numbers, symbols, and machine readable codes arranged in any order or orientation and of any size. In some embodiments, the mark is an alphanumerical code, a bar code (or "1D code"), a 2D code (such as a quick response (QR) code or a data matrix (DM) code), and the like. For example, each mark may be a randomized alphanumerical code which is unique for each blank location and accordingly provides a unique identifier for each container body produced from each blank location.

The mark formed by the marker includes a unique identifier for the container body. In addition, the mark may also include one or more of: (a) a production date; (b) a production time; (c) a production location (or identifier of the production facility); (d) a production line identifier; (e) a batch number; (f) a shift identifier; (g) material specifications of the continuous sheet (such as the type of aluminum alloy or other material in the continuous sheet); (h) an identifier for the manufacturer of a coil from which the continuous sheet is unwound; (i) an identifier or serial number of the coil; (j) a position of the mark on the continuous sheet (such as an X, Y coordinate of a blank location where the mark is formed); (k) a mass of the container body; (l) a name or identifier for a customer (such as a filler) that ordered the container body; and (m) a randomized alphanumerical code.

In some embodiments, the marker is positioned on a production line that includes a cupper. For example, the marker may be down line from an uncoiler and up line of the cupper. Specifically, a mark is applied to a continuous sheet as it feeds into a cupper, and/or a mark is applied to a cup at the outfeed conveyance of the cupper.

In other embodiments, the marker is not associated with the production line that has a cupper. For example, in some embodiments, the marker may form marks on a continuous sheet before a coil with the continuous sheet that includes the marks is loaded into an uncoiler associated with a production line that has a cupper. In these and other embodiments, the marker, or markers, forms a mark on the continuous sheet as the sheet is moving at a constant speed, and the marking process is separate from any dwell period. However, it will be appreciated that the marker can form a mark on the sheet as the sheet is stationary during a dwell period, moving, or a combination thereof. Next, the continuous sheet is flat or nearly flat at this point in the production line, and therefore, the mark or marks applied to the sheet have no distortion compared to forming a mark on a concave surface. As discussed herein, marking earlier in the manufacturing process allows for the collection of more data, which is important to track and trace any metallic workpieces and reduce spoilage, reduce material costs, etc.

Optionally, the marker is positioned in a production facility that has a cupper. In some embodiments, the production facility includes a marker positioned between a first uncoiler and a coiler (or recoiler). In this embodiment, the first uncoiler uncoils a continuous sheet of a metallic material from a first coil. The marker forms marks on the continuous sheet at each blank location where a blank will be cut from the continuous sheet. The recoiler then rolls the continuous sheet with the marks into a second coil. The second coil with the marks is subsequently loaded into a second uncoiler associated with a production line that includes the cupper.

Additionally, or alternatively, the marker is not positioned in a production facility that includes a cupper. In this embodiment, marks are formed on a continuous sheet of metallic material before a coil with the marked continuous sheet is delivered to the production facility that includes the cupper. Accordingly, the continuous sheet that includes marks may be recoiled by a coiler after the marker has formed the marks. In at least one embodiment, the marker is positioned between an uncoiler and a coiler that recoils a continuous sheet that includes marks.

Optionally, blanks are cut from the coil at the blank locations which include a mark by a blanker. Thereafter, the blanks are delivered to the production facility and transformed into container bodies.

In some embodiments, the marker is at a location where a continuous sheet of metallic material is manufactured and rolled into a coil. For example, the marker may be located in a metal production plant where the continuous sheet is manufactured. The marker can form marks on the continuous sheet before the continuous sheet is rolled into a coil. In this manner, a coil with a plurality of unique marks may be delivered to a production facility with a cupper.

As noted above, a marker can mark a cup at the outfeed conveyance of the cupper. In some embodiments, a laser can etch a closed end of a cup with a mark. The mark can be on center or off center on the closed end, on either the product side or the public side. The outfeed conveyance may handle the cups in various orientations where the marker such as a laser can apply the mark. Multiple lasers can apply a single mark, a single laser can apply multiple marks, etc. The marker can apply the mark while the cups are moving, stationary, or both. Forming the mark at the outfeed conveyance of the cupper is advantageous compared to the infeed as no stabilization of a continuous sheet is needed, and marking is independent from the stroke cycle of the cupper. Further, by forming the mark at the outfeed conveyance, production data may be collected on all subsequent equipment and operations that perform operations on the cup. Moreover, because the cupper forms a plurality of cups across the width (or Y-dimension) of a sheet of aluminum, information about variations in cups formed across the width of the sheet may be identified and tracked.

Scanners, cameras, and/or sensors operable to read a mark on each container body may be associated with each piece of equipment of the production line. For example, a scanner may be associated with one or more of: a cupper, a bodymaker, a trimmer, a washer, a dry off oven, a basecoater, a basecoat oven, a conveyor, a decorator, a deco oven, an internal coater, an internal bake oven, an ejector, a necker, a flanger, a palletizer, and any other equipment of the production line. In some embodiments, a scanner is associated with each conveyor (whether a single-line conveyor or a mass conveyor) that transports a container body from a first piece of equipment to a second piece of equipment (or from a first process to a second process) of the production line.

In some embodiments, a first scanner is positioned up line (or at an in-feed) of each piece of equipment. Additionally, or alternatively, a second scanner may be positioned down line (or at an out-feed) of each piece of equipment. Optionally, some pieces of equipment may have a scanner positioned at both an input and an exit of the equipment.

In some embodiments, information from the scanner is transmitted to a control system each time the mark of a container body is read. The scanner may transmit at least a unique identifier of the mark, a date and a time the mark was scanned, and a location of the scanner (such as, where the scanner is located within the production line, or which piece of equipment the scanner is associated with).

The control system includes a database with a record for each container body. The record may include information about the container body including the unique identifier of the mark. The control system is operable to update the record for each container body each time the mark is scanned by a scanner.

The production line optionally includes an inspection system. A scanner may be associated with the inspection system. The inspection system may retrieve information from a record associated with a container body stored in the database after the scanner reads the mark on the container body. The inspection system may separate a container body from the production line based on an identification of a piece of equipment that performed an operation on the container body for a routine quality inspection. In this manner, a first container body processed by a first piece of equipment may be distinguished from a second container body processed by a second piece of equipment that performs the same operation or function as the first piece of equipment. Specifically, in some embodiments, a record in a database may store information for a container body that indicates each piece of equipment that performed an operation on (or handled) the container body.

For example, a record associated with a first container body may have a field that indicates the first container body was processed by a first bodymaker. A record associated with a second container body may have a field that indicates the second container body was processed by a second bodymaker. Accordingly, by scanning marks on the first and second container bodies, the first container body may be separated from the production line and inspected to determine performance of the first bodymaker.

Additionally, if a container body is found to be deficient during inspection and ejected from the production line, the scanner can read the mark. The inspection system may then provide data (such as a reason for the rejection) to the control system and the control system may update a record in the database associated with the rejected container body. Because the mark facilitates identifying each piece of equipment that handled or performed an operation on the container body, it is possible to identify the equipment that caused the deficiency found by the inspection system. Accordingly, equipment that is out of calibration or in need of maintenance can be quickly identified.

Once a container body or other metallic workpiece is rejected from the manufacturing process, the defective container body is optionally inspected by additional scanners, cameras, and/or sensors. Data from the defective container body is transmitted to the database where information about the rejected container body is associated with a mark on the container body, and thus, associated with production information related to the mark and container body in a record. This additional collection of information can help trace particular defect issues with a container body instead of simply recording a container body as "defective" in general without further information. As a result, this additional collection of information aids in the reduction of spoilage, reduce material costs, etc.

Another aspect of the present disclosure is a system and method of tracking and tracing a metallic workpiece (such as a container body, a metallic cup, an end closure, or a tab) throughout its life cycle from production to collection at end of life. The system and method include forming a unique mark on a continuous sheet of material.

In some embodiments, the mark is subsequently cut from the continuous sheet by a cupper as part of a blank. The cupper forms the blank into a cup that is subsequently formed into a metallic workpiece.

Scanners or sensors positioned along a production line that produces the metallic workpiece scan the mark and track the progress of the metallic workpiece through the production line. This information includes an identity of each piece of equipment, lane, gun, etc. that handles the metallic workpiece or that performs and operation on the metallic workpiece. In addition, this information is collected in real time. Therefore, any possible defects are detected quickly and can be traced to a deficient process, station, tool, etc. Even if a defect is detected further downstream, including after the manufacturing process, the collection of data described in the present disclosure allows the source, or at least potential sources, of the defect to be quickly identified. This benefit greatly reduces spoilage and reduces material waste and is optionally used to schedule preemptive maintenance and increase overall manufacturing efficiency.

Collecting and storing the information on equipment that handles or performs an operation on each metallic workpiece provides many benefits. For example, the information will provide insight into the quality of metallic workpieces produced by the production line, performance of equipment on the production line, indications that equipment on the production line requires maintenance, and spoilage rates for one or more of: the production line as a whole as well as individual pieces of equipment of the production line. The information collected as metallic workpieces are processed by the production line may also provide insight into a spoilage rate associated with a coil of metallic material and/or a spoilage rate associated with a manufacturer of a coil of a metallic sheet.

The information collected may also be used to provide a report for each production line with information about the performance of equipment, spoilage rates, upcoming maintenance, and the like. The report could be based on performance over a predetermined period of time. For example, a report could be prepared for each production line based on data collected for one shift, one production run, one day, one week, one month, one year, or any other period of time. Moreover, finished containers are optionally sorted after manufacturing to scrap individual containers due to an individual defective process, station, tool, etc. rather than scraping an entire lot of containers when a defect in one container is discovered. This additional benefit of the present disclosure saves on materials, costs, and reduces harm to the environment.

In some embodiments, the production line ends with a palletizer that places the metallic workpiece on a pallet. The mark on the metallic workpiece allows the metallic workpiece to be associated with a pallet, such as a pallet of unfilled metallic containers. The location of the metallic workpiece can then be tracked to a filler. The filler receives the metallic workpiece (such as a container body and/or an end closure). Once the container body is filled and sealed with the end closure, the filled metallic container may be scanned and tracked to a pallet of filled metallic containers. The filled metallic container can then be tracked from the filler to a distributor, to a point of sale, to a consumer, and to a collection point (such as a recycler or a deposit redemption center) by scanners at each location.

A control system with a database can update a record for the metallic workpiece each time the mark is scanned. In this manner, the location of the metallic workpiece can be tracked throughout its lifecycle from the first operation performed in a production line until the mark is scanned at a collection center. With this information, a consumer can be rewarded for recycling the metallic workpiece after use. Further the information can be used to monitor recycle rates and performance of incentive programs designed to encourage recycling.

The information may also be used to provide alerts to fillers, points of sale, and consumers about the status of a product in a metallic workpiece. For example, information about a product sealed in a metallic workpiece may be stored in the record for the metallic workpiece. Accordingly, if a product needs to be recalled, such as a metallic container filled with a food product or a medicine, an alert may be provided to the filler, point of sale, or consumer identified as currently in possession of the metallic workpiece. Further, when a product in a metallic workpiece reaches its expiration date, the control system can send an alert to the filler, point of sale, or consumer identified as currently in possession of the metallic workpiece.

In some embodiments, a mark is applied to a metallic workpiece at other points in the manufacturing process. The metallic workpiece may refer to workpieces in different manufacturing processes for containers, cans, container bodies, shells, end closures, tapered cups, tabs, etc. In one example, after a washing action in a manufacturing process, container bodies are dried and conveyed to another station in the production line. During this conveyance, the container bodies can flow from a single lane to multiple lanes, or from single file to mass conveyance, to slow the conveyance speed of the container bodies. Then, a marker (for example, a laser or inkjet printing technology such as pad printing or continuous inkjet spraying) can apply a mark to a closed end of a container body (such as a concave dome). When marking a concave dome, the distance between the marker (such as a laser) and the metallic workpiece varies. Thus, in some embodiments a laser is articulatable about multiple degrees of freedom. In an exemplary embodiment, the laser moves about three axes to maintain the focus of the laser on the concave dome and prevent poor marking. In a further exemplary embodiment, the laser is stationary, and one or more of a lens and a mirror associated with the laser head moves to maintain a focus of the laser on the concave dome and prevent poor marking.

A rim coat machine may be positioned after washer oven discharge. At the washer over discharge, container bodies are in mass conveyance with the closed ends (and their domes) facing upward which allows a marker to apply a mark to this closed end. A varnish covered roller with a width as wide as the mass conveyor can roll a thin film onto the "standing surface" of can. Varnish provides a low friction standing surface to the container bodies to help with mobility throughout the manufacturing and filling line. As discussed herein, a marker such as a laser can selectively remove or ablate part of the varnish to form a unique mark in various embodiments. Additionally or alternatively, an inkjet printer applies a second mark to the closed end of a container body. Subsequently, part of the ink is ablated by, for instance, a laser to create a mark on the closed end.

In some embodiments, the container bodies are conveyed to a decorator where the container bodies already receive forms of decoration at speeds that allow, for instance, the application and curing of ink. With respect to the decorator, it will be appreciated that ink or laser or other types of marking technologies can be used to apply a mark to any portion of a container body such as a label portion or closed end at the infeed, within the decorator, or outfeed locations. The container bodies may need to have their position stabilized and/or orientation controlled to ensure a consistent application of a mark, or marks. Position and orientation technologies are described in further detail herein.

In some embodiments, within the decorator while a container body is on the mandrel of the decorator, an ink-based or laser-produced mark can be applied to the label portion of the container body or even a closed end of the container body. A high speed inkjet printer can form a mark with no dwell time as fast as the container bodies move through the decorator. Moreover, a mark comprising ink can be first transferred to a blanket or other intermediate component, then the ink is transferred to the container body. It will be appreciated that the blanket can be cleaned or at least partially cleaned between variable applications to prevent or reduce a memory effect between multiple container bodies where residual ink is unintentionally applied to the next container body.

Next, a drop on demand inkjet printer may mark a label portion or other portion of a container body at an infeed or outfeed location of the decorator. The inkjet printer may rely on, for example, piezo or thermal control as discussed herein, and the mark may be any size, including up to 70 mm of vertical height or size along the label portion of a container body. Continuous inkjet printers are also contemplated for marks that are 6×6 mm or smaller. As noted above, the container bodies are already conveyed at speeds conducive for decoration, 2000 containers per minute in various embodiments, but the container bodies may require some treatment for the adherence of the ink. Moreover, the ink can be any type of ink such as an ultraviolet-based ink that cures with the use of ultraviolet lamps. A laser may also apply a mark to any part of the container body as described herein using, for instance, ablation of a material or coating, activation of a light or thermally sensitive ink, etc.

In addition, the container bodies may be inspected at any point after the decorator, including immediately after the decorator, to assess the quality of the decorations. In some embodiments, the container bodies may be inspected while being transported on a pin chain. Inspecting the container bodies while on a pin chain being transported away from the decorator and before the container bodies are positioned on a mass conveyor is beneficial because the quality of the decoration can still be associated with the decorator. Further, components of the decorator that contacted the container body (such as a particular mandrel or a particular printing plate) or that helped form the image (including a particular printing blanket) can be identified and associated with the container body and stored in a record in the database. Any substandard decorations are grounds to reject a container body. At this point, a marker may apply a mark to the container body. In some embodiments, a laser ablates a material or coating on a label portion of a container body to form a mark, a laser activates an ink on the body label portion to form a mark, and/or a continuous inkjet printer applies ink to a body label portion to form a mark.

A closed end or a dome of a container body can be an advantageous part of a container to locate a mark since the closed end is largely protected from many types of wear and generally remains intact after crushing. While a container body is positioned in a rotational indexer or other part of a decorator, or even after a decorator, an overvarnish and/or a bottom coat can be applied to a container body, including the closed end. At a dome spraying location of the production line, a laser can ablation one or more aspect of the closed end to form a mark. Specifically, in one embodiment, a dome spraying system can apply a material to the dome, then a laser can ablate part of that material to form a mark as raw aluminum will potentially stain or oxidize during subsequently processing and stand in contrast to the coated portion of the dome. In some embodiments, the material is a clear varnish. In other embodiments, the material is an ink, tinted varnish, or matte translucent varnish to achieve a higher contrast with the laser formed mark on the closed end. The higher contrast means less time is necessary for a sensor to detect the mark in view of any lighting or glare issues. In some embodiments, a matte material is advantageous for a reduction in overspray and delineation line issues where edges of a mark can bleed together making the mark illegible.

Ovens or curing devices associated with inks or materials such as ultraviolet-activated inks can be used to help complete the marking process. In the instance of an oven, the increase in temperature from a heat source causes a chemical reaction in the polymer matrix that hardens the polymer and can also evaporate a solvent in the ink to speed curing. In an exemplary E-Beam curing process, the ink or coating is solidified with electrons emitted from multiple sources and wavelengths to initiate a cross-linking process in various monomers and/or polymers to cure the ink or coating.

In various embodiments, a spray nozzle can jet a material onto the dome to stand in contrast to a subsequently laser marked portion of the dome. The spray nozzle may jet material in a discrete shot with, for instance, a round spray pattern to form a circle/dot. In other embodiments, a fan shaped nozzle can jet material in a discrete shot to form a square pattern. In yet further embodiments, the entire dome is coated with a material. Then, part of the material can be ablated with a laser to remove at least some ink and/or expose part of the container body material such as aluminum to form the mark. The jetted material can be ink, tinted varnish, matte translucent varnish, etc. In some embodiments, hydraulic pressure can be used to apply material to reduce overspray. In other embodiments, air-atomized material is applied to the closed end of the container body. Optionally, the material can be a solvent material or an ultraviolet-activated ink to avoid the use of a large oven. These marks can be formed on multiple metallic workpieces at once when the metallic workpieces are formed from an uncontrolled mass conveyance into a repeatable pattern. For instance, using gates, channels, or other similar components, an unorganized number of metallic workpieces is formed into an ordered pattern that can more readily and easily receive marks from markers.

In some embodiments, material can be simultaneously applied to multiple container bodies then selectively ablated by one or more lasers to form marks. Multiple pad print devices on a common rotating shaft of a translating platform can simultaneously pad print multiple container bodies on, for instance, closed ends or domes of the container bodies. Pad printing utilizes a pad that presses onto a print head to receive ink and then presses against a metallic workpiece such as the dome of a container body to transfer the ink to the metallic workpiece. The ink can include multiple colors and form complex graphics, and the container bodies may move at a rate of 2000 containers per minute. The container bodies may be oriented with the closed end or dome facing upward during this form of material application, which is advantageous since any drips will move to a center of the closed end. In embodiments where the material is an ultra-violet-activated ink, the material can be cured in an oven on the production line that is used to cure a rim coat. In other embodiments, the material applied by the pad print devices is a laser or heat-activated ink applied to a closed end of a container body such as a dome. One or more lasers may subsequently activate the ink to form a mark that stands in contrast to the un-activated parts of the ink. Again, this high contrast means less time is required for a sensor to detect the mark in view of any lighting or glare issues.

A mark also can be applied to a container body at the inside spray coating part of the manufacturing process. A mark can be applied to, for instance, a closed end such as a dome of a container body at the infeed portion of the inside spray machine where any trackwork or conveyance is directing container bodies into the inside spray machine. Specifically, for example, a continuous inkjet printer can apply an ink or a laser can etch a mark on the closed end or any portion of the container body positioned in the infeed portion of the inside spray machine. In some embodiments, the container bodies are stabilized with a feed screw or belt to control the position, timing, and orientation of the container bodies as described herein to ensure a consistent mark position. The marker can be located at a waterfall location from a mezzanine level into the inside spray machine. Specifically, the container bodies flow from a station in the production line at the elevated mezzanine level and then are gravity fed into an inside spray machine positioned below or lower than the mezzanine level, and a marker can apply a mark to a container body as it moves, for instance, in a cage system from the mezzanine level to the inside spray machine. Further, a mark can be applied to a container body as the container body is positioned in a star wheel that moves the container body through the inside spray machine itself.

Additionally, or alternatively, a mark can be applied to a metallic workpiece at a necker machine or after a necker machine. Some necker machines reduce the diameter of an end of a container body such as an open end. This can reduce the amount of material used in the container body, reduce costs, and provide a geometry that allows multiple containers to be stacked, etc. A necker machine can also add a threaded surface to the end of a container body. The position and/or orientation of the container bodies may need to be controlled to provide a mark at a consistent location on the container body such as the neck, the label portion of the body or the closed end. Position and orientation technologies are described in further detail herein. Moreover, the container bodies may be divided into multiple lanes of conveyance to reduce the speed of conveyance and ensure a complete marking process in the instance of, for example, two dimensional marking such as a QR code.

In some embodiments, a necker machine comprises a marker that is a continuous inkjet printer or drop on demand inkjet printer, which jets ink using piezo or thermal modes of operation, that marks the neck, the label portion and/or closed end of a container body as the container body is positioned in an indexing turret or an indexing necker. In other embodiments, the marker is a laser that ablates part of a coating on the container body as the container body is positioned in an indexing turret or an indexing necker. The exposed metal can stand in contrast to the coated portion, and the exposed metal may oxidize or develop a stain during further processes for greater contrast with the coated portion.

The marker is positioned in a relatively small space within the necker machine without interfering with any operations of the necker machine. In some embodiments, the marker may replace tools of a station of the necker machine. Alternatively, the marker may be positioned between stations of the necker machine, or between two necker machines that operate in series, such that the marker marks the container body between forming operations and/or during indexing.

Within the production facility, a container body may also be marked near the end of the production line and before the container bodies are palletized for transportation. Again, the container bodies may be divided into multiple lanes of conveyance to reduce the speed of the container bodies moving through the production line. At this point in the production line, if a mark is applied to a closed end of the container body, the conveying structure or multiple lanes of conveyance may expose the closed end of the container body for marking. Exposure in this sense may mean a conveyance through a cage system where a container body is constrained in multiple directions by rails or rods but is otherwise exposed for marking. In some embodiments, the conveying structure may comprise a belt.

Orientation technology may be used to apply a mark in a consistent location on the container body, as described in greater detail herein. The marker can be a drop on demand inkjet printer with piezo or thermal control. The mark can be applied to a label portion of a container body and extend up to, for instance, 70 mm in a vertical direction on the label portion. Additionally, or alternatively, a continuous inkjet print head may also apply a mark to the container body at this point in the production line. In some embodiments, a pre-treatment is applied to the container body for the ink to properly adhere. Further, a laser can ablate part of the ink or overcoating or even active part of the ink or overcoating as described herein. It will be appreciated that with this embodiment or any embodiment described herein, an over-varnish is optionally applied to a metallic workpiece to protect a mark. Ablating material such as lasering an ink or part of a metallic workpiece can leave metal exposed. This may be undesirable since exposed metal can oxidize or may not be appropriate to contact contents of a finished container due to safety concerns. Thus, an overvarnish can be applied to a marked portion of a metallic workpiece using, for instance, a wheel, a spray head, a drop on demand head, etc. Optionally, the overvarnish can be cured thermally and/or with ultraviolet light.

Marking technologies may also be located at a filler location. Generally, a manufacturer produces a container body, a can, a bottle, an end closure, a closure (such as a roll-on pilfer proof closure), etc., then these components are shipped to a general customer such as a filler. The filler may rinse one or more of these components, add contents to the container body, and then seal the contents with an end closure, a ROPP closure, or a cap to create the finished container. The filler also operates equipment to test the containers, package the containers, and palletize the cans, ends, bottles, and closures. A marker can add a mark to various parts of the container at different locations at the filler. For example, a drop on demand inkjet printer can apply a mark to a metallic workpiece prior to packaging, then the packaged metallic workpieces are palletized.

End shells are manufactured into end closures then shipped to a filler. The end closure may have features such as a tab, a frangible score that defines a pour opening, etc. The shell of the end closure forms most of the end closure including the central panel.

An end shell can begin at the manufacturer as a coil of a continuous sheet of metal like the container body. Thus, a mark can be applied to the continuous sheet at a shell press coil infeed the same as, or similar to, marking a continuous sheet that forms container bodies. For instance, the marker or marking device may be synchronized with a shell press that separates a portion of metal from the continuous sheet to ensure that a mark is formed on the same part of each end shell, and thus, same part of each end closure.

In some embodiments, the marker can form the mark on the continuous sheet during a forming action of the shell press. This is beneficial as the continuous sheet may be substantially stationary during the forming action.

Additionally, or alternatively, the marker may form the mark between forming actions of the shell press. For example, in some embodiments the marker is positioned and operable to form the mark on the continuous sheet when it is being fed into the shell press such that the continuous sheet is in motion while the mark is formed. As noted in various embodiments herein, the marker forms the mark during an indexing of the continuous sheet, or even upstream at a coil feed where the continuous sheet moves at a constant speed and is separated from an indexing motion at a shell press by a length of slack sheet material.

A mark can be applied (in some embodiments) to a continuous sheet at the infeed of the shell press by an inkjet printer, such as a continuous inkjet printer. Specifically, in at least one embodiment, the mark is formed on a side of a continuous sheet that forms the product side of an end shell, and the mark can be formed by, for instance, food grade ink that will maintain the safe nature of the interior of a finished container and satisfy the U.S. Food and Drug Administration's regulations for direct food contact. In addition or alternatively, a mark can be applied by a marker (a laser, an inkjet printer, etc.) to a public side of the end shell at or near a location that will ultimately serve as a rivet or tab attachment location. Marking the end shell at this location in the production line allows for subsequent detection through the manufacturing process which generates more data and leads to better and more efficient manufacturing. Marking on the public side will also preserve the ability for end user data collection. Forming the mark on the public side at or near the location of the rivet is beneficial because in embodiments in which the rivet is centered on the end shell, the orientation of the end shell when the mark is formed is not critical. With the product side mark and the public side mark associated with each other at a database, the information related to the manufacturing of the finished container is associated with any subsequent end user data collection.

Once an end shell is formed, the end shell is joined with a tab, among other actions at a conversion press, to form an end closure. An infeed conveyor conveys end shells into the conversion press. The infeed conveyor may comprise one or more rods or rails that form a cage. The cage feeds a continuous stack of end shells vertically downward to a separating device, or downstacker, for placement in the conversion press timing belt and/or transfer belt where an end shell can be marked. The transfer belt conveys individual end shells in belt pockets into the conversion press and through a series of tools that form various end features on the end shell. The transfer belt prevents rotation of the end shell, allowing progressive die features to correctly form the end shell and resulting end closure with respect to the mark. Thus, a marker or marking device can mark a public side of the end shell alongside other tools, which ensures that the end shell is oriented properly for forming a mark or marks in a consistent position on the resulting end closure. Consistent marking in this context is advantageous to prevent a mark from being obscured, damaged, or interrupted by end features (such as the score or the tab), if desired, or interfering with features of the end closure such as a tear panel. Alternatively, in some embodiments, it may be advantageous to locate the mark underneath the tab to avoid interfering with an overall aesthetic appearance of the container, in which case, the tab can be articulated to expose the mark for subsequent scanning and detection.

After the end shell and tab are combined to form an end closure, the conversion press outfeed conveys the end closures away from the conversion press. Specifically, the transfer belt conveys the end closures away, and in some embodiments, up to four end closures can fit across the width of the transfer belt. A light tester is positioned above the transfer belt to conduct a pin hole check, and a marker (such as an inkjet or laser system) can also form a mark on the public side of the end closure at this point on the transfer belt. The mark can be formed, for instance, on a tab or central panel or other portion of the end closure. Next, a vacuum belt is positioned above the end closures to hold the end closures as the transfer belt moves over a roller to return to the infeed of the conversion press. Once held by the vacuum belt, again, a marker (such as an inkjet or laser system) can form a mark on the product side of the end closure. Specifically in the instance of the laser marker, a camera system can identify various feature of the end closure, and then a laser can articulate to apply a mark to an area of the end closure that does not interfere with the identified features of the end closure. This camera and laser system can thus be used in lieu of orientation systems.

Cages can also convey the end closures (or end shells) between stations of the production line. In various embodiments, four to five rods or rails are arranged to form a tunnel that constrains the movement of the end closures in more than one direction but then permits movement in at least one direction to convey a continuous flow of stacked end closures. The rods or rails can be straight, radiused, follow an n-order polynomial shape, etc. The gaps between the rods allow access to the end closures, for example, if an end closure needs to be removed from the stack. The gaps also present an opportunity for a marker to apply a mark to the end closures. Auxiliary devices can push the stack of end closures through parts of the cage and/or count end closures, etc.

A continuous stack of end shells or end closures is separated into individual shells or end closures by a downstacker which has multiple wheels arrayed around the continuous stack. The wheels have a helical shape such that as the wheels turn, the wheels engage an edge or a curl of an end shell or end closure to separate the end shell or end closure from the continuous stack. In some embodiments, three wheels are synchronized to work at high speeds. Downstackers may be positioned at a compound liner machine infeed, a conversion press infeed, and/or a seamer infeed. Furthermore, downstackers can be positioned at a manufacturer or at a filler to separate ends for marking. A marker such as a laser can apply a mark to an outer edge of a shell or end closure such as a chuckwall in a continuous stack or to any portion of an end shell or end closure once separated from the continuous stack.

A compound liner machine applies a compound to end shells prior to the conversion press. An outfeed conveyor, such as a vacuum belt, can convey the end shells at a high speed as spaced by the release from the compound liner machine. At this point, the public side of the end shell is facing upward and available for compound inspection and marking. An air rejection system can blow substandard end shells off of the conveyer and into a scrap bin. The outfeed conveyor can extend between 15-20 feet (4.57-6.10 meters) and terminate in a 90 degree elbow rod cage that stacks end shells for subsequent conveyance.

A marker can apply a mark to the product side of the end shell positioned on the outfeed conveyor of the compound liner machine. In some embodiment, the marker comprises an inkjet printer but may also include other marking technologies discussed herein. Alternatively, the marker at the outfeed conveyor of the compound liner machine is a continuous inkjet printer. The ink used to form the mark by the continuous inkjet printer can be food grade to maintain safety of the resulting container. Forming a mark while the end shell is positioned in the outfeed conveyor of the compound liner machine is advantageous as the ink can be subsequently cured in a liner oven.

A shell accumulation balancer collects end shells at different points in the manufacturing process, including an A Balancer between a curler and a liner machine and a B Balancer between the liner machine and a conversion press. The accumulation balancer can include manual balancers where operators may physically remove end shells from one rod cage and add end shells to any of multiple outfeeds. The end shells can also be held for inspection to reject defective shells. At this point, the end shells are positioned in open, half cylinder troughs that are fed by and discharged to rod cages. Automatic balancers have lengths of end shells fed onto trays which are automatically moved to a desired discharge rod cage to meet line control demands. Trays of end shells can also be removed from balancers by forklifts for temporary warehouse storage/buffering.

Within these manual and automatic balancers are opportunities to apply a mark to an end shell. End shells can be fed to marking loops where a marker can apply a mark to any part, public side or product side, of shells. For instance, end shells can be fed to a balancer, exit the balancer to a marking loop, reenter the balancer, and exit the balancer to a downstream process or even into an inventory holding rack for storage in a warehouse and future use.

In some embodiments, the marker uses an ink to form the mark while the end shell is in a marking loop. The marker may be a continuous inkjet printer or a drop on demand printer. Alternatively, the marker at the marking loop may comprise a laser.

After a balancer, a feeder can be positioned in the end closure production line. Specifically, a feeder can be an end closure accumulation and staging machine for a customer such as a filler. Unsleeved “sticks” of end closures are loaded in a vertical orientation into a carousel staging pocket. Many stacks of end closures can be unsleeved loaded into different pockets at once to make efficient use of operator time. Pockets are conveyed around the carousel to an unloading position, where the end closures in the pocket are released to the rod cage conveyance.

A marker can mark part of an end closure while the end closures are within the rod cage conveyance. A separate system may take the output from the conversion press at a faster speed and feed several different marking lanes/devices at a slower speed. Marked end closures can then be loaded back to the balancer/feeder in different positions to then be passed to the existing palletizer system.

In some embodiments, the marker uses an ink to form the mark while the end shell or end closure is positioned within a rod cage conveyance. The marker may be a continuous inkjet printer or a drop on demand printer. Alternatively, the marker which is positioned to form the mark on end closures or end shells within a rod cage conveyance may comprise a laser.

In various embodiments, a mark is located on a peripheral curl of an end closure. This portion of the end closure is a relatively thin portion extending around an outer circumference of the end closure on a public side of the end closure. In some embodiments, the mark is a one-dimensional code like a bar code where the mark appears as alternating lines and spaces extending around the outer circumference of the end closure. Moreover, the mark is optionally repeated at several positions around the outer circumference of the end closure such that a scanner directed at one side of the end closure reads at least one of the marks. With a mark in this location, the mark can be read while end closures are stacked in, for example, a rod cage.

A marker, including any marker described herein such as a laser or a pad printer, forms this mark at any location in the manufacturing process, including the beginning of the manufacturing process. In various embodiments, a marker forms a mark at a blank location of a continuous sheet of metallic material prior to a press. This mark may comprise alternating lines and spaces in a circular shape at an outer edge of the circular blank location and appears as a partial, sun burst pattern. Once the blank is cut from the sheet and formed into, for instance, an end shell and then an end closure, the resulting mark is located at an exterior of the peripheral curl of the shell or end closure. Then, when the end shells or end closures are arranged in a stack, the mark can be read by a scanner to generate a scan event, which is transmitted to a database to update a record associated with the mark, and thus, the end shell or end closure.

In various embodiments, the mark on the peripheral curl allows the end shell and/or end closure to be tracked and traced through the manufacturing process and even to a customer such as a filler. However, once a filler seams the end closure to a container body, the mark on the peripheral curl may be partially or fully covered. Accordingly, in various embodiments, an additional mark is formed on another location on the public side of the end closure. For example, this additional mark can be formed at or near a center of an end shell that, in some embodiments, is the location of the rivet to which the pull tab joins. The area of the central panel of the end closure around the rivet typically does not have features such as scores. Thus, the mark can be formed on the end shell without concern of the particular orientation of the end shell as the mark does not interfere with any subsequent features on the end closure, and this additional mark allows for the tracking and tracing of the end closure and/or finished container if the mark on the peripheral curl is covered.

The packing location of a production line at the filler also presents another opportunity for marking. The containers may be divided into multiple lanes of conveyance to reduce the speed of the containers moving through the production line. At this point in the production line, if a mark is applied to a closed end or a container body of the containers, the conveying structure or multiple lanes of conveyance may expose the closed end of the container for marking. Exposure in this sense may mean a conveyance through a cage system where a container body is constrained in multiple directions by rails or rods but is otherwise exposed for marking. Orientation technology may be used to apply a mark in a consistent location on the container, as described in greater detail herein.

The marker associated with the packing location may comprise a laser or use an ink to form a mark on the container. In some embodiments, the marker can be a drop on demand inkjet printer with piezo or thermal control. The mark can be applied to a label portion of a container and extend up to, for instance, 70 mm in a vertical direction on the label portion.

Additionally, or alternatively, a print head of a continuous inkjet printer may also apply a mark to the container at this point (the packing location) in the production line. In some embodiments, a pre-treatment is applied to the container for the ink to properly adhere as described herein.

Further, in some embodiments, a laser associated with the packing location can ablate part of the ink or overcoating (or even activate part of the ink or overcoating) to form a mark on the container body or the end closure. The packing location at the filler provides space to mount orientation cameras and lasers to optionally orient containers and mark containers. For example, the orientation cameras or lasers may be positioned proximate to existing systems such as pressure checker platforms after, for instance, filling or pasteurization.

Tabs are manufactured and then combined with an end shell to form a complete end closure at a conversion press. At the tab stock infeed for the conversion press, a marker can mark portions of the tab stock where individual tabs will be formed during the dwell time or period of the conversion press. The tab stock moves into the conversion press incrementally and the dwell period is defined by a period when the tab stock is substantially stationary. Even before a conversion press, a marker such as a laser can ablate part of a coating on the tab stock to form a mark. The mark can be, for instance, a small two-dimension code that is less that 2 mm in size and positioned on a topside of the tab, which would face upward toward the end user once the finished container is produced. It will be appreciated that a mark can be formed on any part of the tab even including the underside. Moreover, in some embodiments, a portion of the tab proximate to the lifting end includes a flat, webbed panel instead of a fingerhole to provide more surface area to bear a mark or marks. In various embodiments, a mark is applied between the rivet island and the nose end of the tab.

One aspect of the present disclosure is a tab with an increased size compared to prior art tabs. Increasing the size of the tab is beneficial because the larger tab provides additional space to form marks, or to form a larger mark. The larger tab thus provides benefits which outweigh the increased material costs and costs associated with changes to the end closure production line that are required to form and handle larger tabs.

As discussed herein, a metallic workpiece may be stabilized and/or oriented for a marking process to ensure marks are repeatably produced at a consistent location on the metallic workpiece. Stabilization and orientation control make the mark legible for subsequent scanning events and prevent the mark from interfering with other features of the finished container such as a tab or pour opening.

Accordingly, in some embodiments, the orientation of the metallic workpiece is optionally controlled before or during a marking process. This prevents the mark from damaging features such as score lines, from being hidden, and/or from becoming unreadable. Any metallic workpiece can have its orientation controlled including, but not limited to, an end shell, an end closure, and a container body. In some embodiments, an end shell is formed and marked, then the end shell is oriented to a predetermined orientation before entering the conversion press to ensure the mark is in the proper location on the resulting end closure. In various embodiments, an end closure is oriented to a predetermined orientation after the conversion press, and a mark is applied to the oriented end closure.

Orientation systems of the present disclosure are configured to rotate the metallic workpiece about at least one axis. One exemplary orientation system comprises at least one belt of a conveyance. A metallic workpiece (such as a container body) is conveyed in a first direction and the longitudinal axis of the metallic workpiece extends along a perpendicular, second direction. A first belt is positioned on one side of the metallic workpiece and a second belt is positioned on an opposing side of the metallic workpiece. A camera or other sensor at the beginning of the conveyance can detect the initial orientation of the metallic workpiece. Based on this information, a control system or other electronic device can determine the amount and direction of rotation required to place the metallic workpiece in a final orientation. Then, the control system directs the belts to rotate at different speeds to rotate the metallic workpiece about its longitudinal axis as the metallic workpiece moves by the belts, and the workpiece emerges from the belts of the orientation system in the final orientation for marking.

Another exemplary orientation system is a servo system. A metallic workpiece such as a container body can be loaded into a plate or wheel. A camera or other sensor can detect the initial orientation of the metallic workpiece. Based on this information, a control system or other electronic device can determine the amount and direction of rotation required to place the metallic workpiece in a final orientation. Then, the control system directs a servo motor on the plate or wheel to rotate the container body to the final orientation.

It will be appreciated that these orientation systems will work with any marking technology described herein. It will also be appreciated that the orientation systems will work with any metallic workpiece described herein at any station in the production line of any manufacturing process.

In some embodiments, the metallic workpiece is optionally stabilized during the marking process. Improper stabilization due to random movement such as jostling can cause a mismark due to a laser being out of focus or a print head at an improper distance from a metallic workpiece, which leads to a rejection of a metallic workpiece. Various stabilization systems are contemplated, and a stabilization system can stabilize a metallic workpiece prior to a marker or can be incorporated with a marker such that the stabilization system is engaging a metallic workpiece as a marker applies a mark to the metallic workpiece.

In at least one embodiment, the stabilization system comprises a feed screw to stabilize a metallic workpiece such as a container body. As a container body is conveyed in a first direction, the longitudinal axis of the container body is oriented in a perpendicular, second direction. Within the stabilization system, a feed screw is positioned on one side of the container body and its longitudinal axis. The feed screw has a thread that rotate around a rotation axis oriented in the first direction. The stabilization system also comprises a wall opposing the feed screw, and the wall extends in the first direction substantially parallel to the rotation axis. The wall is flat or substantially flat. In some embodiments, the wall can be a moving belt to prevent rotation of the container body. As a container body enters the stabilization system, the container body is positioned in a valley (or pocket) formed between crests of the thread and pressed laterally in yet a third direction that is perpendicular to both the first and second directions. This pressing motion causes the container body to contact the flat wall, which reduces movement such that a marker can apply a mark to the container body.

Another stabilization system of the present disclosure utilizes a star wheel. Metallic workpieces such as container bodies are conveyed in a first direction, and longitudinal axes of the container bodies are oriented in a perpendicular, second direction. The star wheel is a generally cylindrical device that rotates around a rotation axis aligned with the second direction. The star wheel has a plurality of recesses in an outer circumference that are substantially the same shape and size as a container body. The star wheel is at least partially positioned in the flow of conveying container bodies. As a container body approaches the star wheel, the container body enters a recess on the star wheel. The star wheel reduces movement and rotates the container body where a marker can apply a mark to the container body. Then, the star wheel continues rotating around the rotation axis and releases the container body back into the flow of conveying container bodies.

A further stabilization system is a vacuum conveyance. Metallic workpieces such as container bodies are conveyed in a first direction, and longitudinal axes of the container bodies are oriented in a perpendicular, second direction. One wall in the stabilization system draws in a vacuum. As the container bodies move over the vacuum wall, the container bodies are drawn to the wall and movement such as jostling in the container bodies is reduced. Then, a marker can apply a mark to the container bodies.

In some embodiments the vacuum conveyance comprises a mesh belt. The mesh belt is configured to move the container bodies in the first direction. A vacuum is formed such that a predetermined portion of the container bodies is drawn against the mesh belt. In some embodiments, an open end of the container bodies is positioned against and drawn to the mesh belt. Alternatively, in other embodiments, a close end of the container bodies is positioned against and drawn to the mesh belt.

Yet another stabilization system is a grip system. Metallic workpieces such as container bodies are conveyed in a first direction, and longitudinal axes of the container bodies are oriented in a perpendicular, second direction. In some embodiments, protrusions extend from one wall of the stabilization system to contact container bodies. In other embodiments, protrusions extend from opposing walls of the stabilization system to contact container bodies. Thus, as a container body enters the stabilization system, one or more protrusions contact the container body to stabilize the container body and reduce movement such that a marker can apply a mark to the container body.

In some embodiments, the walls comprise belts positioned on either side of the longitudinal axis of a container body. A first one of the belts may rotate in a first direction. A second one of the belts may rotate in a second direction opposite to the first direction.

Pneumatic systems positioned downstream of the stabilization system can reject any container bodies with mismarks. It will be appreciated that these stabilization systems will work with any marking technology described herein, and the stabilization system will work with any metallic workpiece described herein at any station in the production line in the manufacturing process.

One aspect of the present disclosure is a method of marking a container body for tracking and tracing, comprising: (1) moving a continuous sheet of a metallic material past a marker; (2) forming a mark by the marker at a blank location on the continuous sheet where a blank will be cut from the continuous sheet, the mark being unique to the blank location; (3) moving the continuous sheet into a cupper in a production line; (5) cutting the blank with the mark from the continuous sheet by the cupper; (6) forming the blank into a cup by the cupper such that the mark is positioned on an exterior surface of a closed end of the cup; and (7) forming the cup into the container body by a bodymaker of the production line.

In some embodiments the marker forms the mark without contacting the continuous sheet.

Optionally, the marker includes a laser to form the mark.

In some embodiments, the laser forms the mark by etching or engraving the continuous sheet.

In at least one embodiment, the mark is formed with an ink.

In some embodiments, the ink is an ultraviolet ink such that the mark is visible when exposed to an ultraviolet light.

In some embodiments, the mark is formed by exposing a coating on the continuous sheet to a light source. The coating may be a photo-reactive ink. Optionally, the light source is a laser. Accordingly, the mark may be formed by exposing selected portions of the photo-reactive ink to the laser.

Additionally, or alternatively, the marker may include an inkjet print head to form the mark.

The method may include one or more of the previous embodiments and, in some embodiments, the marker contacts the continuous sheet when forming the mark.

Additionally, or alternatively, the mark is formed with a toner material.

In some embodiments, the marker includes an electrophotographic print unit to form the mark.

Optionally, in one or more of the previous embodiments, the marker forms the mark during a dwell period during which the continuous sheet is not advanced into the cupper such that the continuous sheet is generally stationary.

In some embodiments, the marker is operable to form the mark while the continuous sheet is moving.

Accordingly, in some embodiments, the marker may form the mark while the continuous sheet is stationary, while the continuous sheet is moving, or while the continuous sheet is both stationary and moving.

The method may include one or more of the previous embodiments and, in some embodiments, the mark is a computer readable code.

In some embodiments, the mark comprises a series of indicia and spaces arranged in rows and columns.

The method optionally includes one or more of the previous embodiments and in at least one embodiment, the mark includes a unique identifier for the container body.

In some embodiments, that mark further comprises one or more of: (i) a randomized alphanumerical code; (ii) a production date; (iii) a production time; (iv) a production location; (v) a production line identifier; (vi) a batch number; (vii) a shift identifier; (viii) material specifications of the metallic material of the continuous sheet; (ix) an identifier for the manufacturer of the coil; (x) an identifier or a serial number of the coil; (xi) a position of the mark on the continuous sheet (such as an X, Y coordinate a location on the continuous sheet where the mark is formed; (xii) a mass of the container body; and (xiii) a name of the filler that ordered the container body.

The method may include one or more of the previous embodiments and optionally the mark is generated by a control system in communication with the marker.

In some embodiments the method further comprises receiving the mark from the control system. The control system may communicate with the marker over a network, such as the internet. Optionally, the control system is located away from the production line that includes the marker.

Optionally, the method includes any one or more of the previous embodiments and may further comprise: (a) scanning the mark by a sensor; (b) transmitting data from the sensor to a control system; and (c) updating a record associated with the container body. The record may be stored in a database.

In some embodiments, the record may be updated to include one or more of: (i) a date of the scan; (ii) a time of the scan; (iii) a location of the sensor; and (iv) a rejection identification code. The rejection identification code may identify a cause of a rejection or a location at which the container body was rejected. Accordingly, the rejection identification code may identify a reason for rejection of the container body, such as tear-off at a bodymaker, blow-off at a decorator, failure in a necker, and the like.

The method may include any one or more of the previous embodiments, and further comprise the sensor being positioned on the production line.

In some embodiments the sensor is positioned at one or more of an infeed and an outfeed of a piece of equipment of the production line.

In some embodiments, the piece of equipment is the bodymaker.

Additionally, or alternatively, a sensor may be associated with an infeed or an outfeed of an internal coater of the production line.

The method may include any one or more of the previous embodiments, and in some embodiments the sensor is at a point of sale.

In some embodiments, a sensor is at a collection point associated with a recycling center.

Another aspect of the present disclosure is a system for tracking and tracing a container body, comprising: (1) a marker operable to form a mark on a continuous sheet of a metallic material at a blank location where a blank will be cut from the continuous sheet; (2) an uncoiler to uncoil a coil comprising the continuous sheet of the metallic material; (3) a cupper to cut the blank from the continuous sheet at the blank location and form the blank into a metallic cup; (4) a conveyor to transport the metallic cup to a bodymaker that forms the metallic cup into a container body, the bodymaker having an identifier; (5) a sensor to scan the mark, the sensor positioned at an infeed or an outfeed of the bodymaker; and (6) a control system in communication with the marker and the sensor, the control system operable to: (a) generate the mark formed by the marker; and (b) update a record in a database for the container body to include the identifier of the bodymaker after the sensor scans the mark.

In some embodiments, the mark is a computer readable code.

For example, the mark may be a data matrix code, a bar code, a quick response (QR) code, and the like.

Additionally, or alternatively, the mark comprises a series of markings and blanks arranged in any manner or sequence. For example, the mark may comprise a series of indicia, such as a dot, a square, a circle, a symbol, a line, a letter or any other marking. Optionally, the mark may comprise spaces between one or more of the indicia. In some embodiments, the mark includes indicia and spaces arranged in rows and columns.

The system may include one or more of the previous embodiments and optionally the mark includes a unique identifier for the container body.

In some embodiments, the mark includes an ink or a toner.

In some embodiments, the ink is an ultraviolet ink such that the mark is visible when exposed to an ultraviolet light.

In some embodiments, the mark is formed by exposing a coating on the continuous sheet to a light source. The coating may be a photo-reactive ink. Optionally, the light source is a laser. Accordingly, the mark may be formed by exposing selected portions of the photo-reactive ink to the laser.

Additionally, or alternatively, the mark is engraved and/or etched in the continuous sheet.

The system may include any one or more of the previous embodiments, and the mark may further comprise one or more of: (i) a production date; (ii) a production time; (iii) a production location; (iv) a production line identifier; (v) a batch number; (vi) a shift identifier; (vii) material specifications of the metallic material of the continuous sheet; (viii) an identifier for a manufacturer of the coil; (ix) an identifier or serial number of the coil; (x) a position of the mark on the continuous sheet; (xi) a mass of the container body; (xii) a name of a filler that ordered the container body; and (xiii) a randomized alphanumerical code.

In some embodiments, the marker comprises a laser to form the mark.

The system may include one or more of the previous embodiments, and optionally the marker comprises an inkjet print head to form the mark.

Additionally, or alternatively, the marker may comprise an electrophotographic print unit to form the mark.

Optionally, the marker forms the mark during a dwell period during which the continuous sheet is not advanced into the cupper such that the continuous sheet is generally stationary.

In some embodiments, the marker is operable to form the mark while the continuous sheet is moving.

Accordingly, in some embodiments, the marker may form the mark while the continuous sheet is stationary, while the continuous sheet is moving, or while the continuous sheet is both stationary and moving.

The system may include any one or more of the previous embodiments, and optionally the system further comprises: (a) a decorator downline from the bodymaker, the decorator having a unique name or identifier; and (b) a second sensor to scan the mark, the second sensor positioned at an infeed or an outfeed of the bodymaker.

In some embodiments, the control system is further operable to update the record in the database for the container body to include the unique name of the bodymaker after the second sensor scans the mark.

Optionally, the control system includes a date and time of the scan of the mark by the second sensor in the record in the database.

In some embodiments, the control system is further operable to update the record in the database for the container body when a sensor associated with a point of sale scans the mark.

Still another aspect of the present disclosure is a metallic container having a mark for tracking and tracing the metallic container, comprising: (1) a body with a closed end, a sidewall extending upward from the closed end, and an opening located at an upper end of the body; and (2) the mark positioned on the closed end, the mark including a unique identifier for the metallic container which is distinct from every other metallic container.

In some embodiments, the mark is a computer readable code.

For example, the mark may be a data matrix code, a bar code, a quick response (QR) code, and the like.

Additionally, or alternatively, the mark comprises a series of markings and blanks (or spaces) arranged in any manner or sequence. For example, the mark may comprise a series of indicia, such as a dot, a square, a circle, a symbol, a line, a letter or any other marking. Optionally, the mark may comprise spaces between one or more of the indicia. In some embodiments, the mark includes indicia and spaces arranged in rows and columns.

The metallic container may comprise one or more of the previous embodiments, and optionally the mark (and/or a record in a database that is associated with the mark) further comprises one or more of: (i) a production date; (ii) a production time; (iii) a production location; (iv) a production line identifier; (v) a batch number; (vi) a shift identifier; (vii) material specifications of a metallic material of a continuous sheet from which the metallic container was formed (such as chemical composition of the metallic material); (viii) an identifier for a manufacturer of a coil comprising the continuous sheet of metallic material; (ix) an identifier or a serial number of the coil; (x) a date of manufacture of the coil; (xi) a manufacture location of the coil; (xii) a position of the mark on the continuous sheet; (xiv) a mass of the metallic container; (xv) a name of the filler that ordered the metallic container; (xvi) a randomized alphanumerical code; and (xvi) other production data pulled from existing systems and databases associated with the production line.

In some embodiments, the mark is formed by a laser.

In some embodiments, the laser forms the mark by etching or engraving a metallic material which is formed into the metallic container.

Optionally, the mark is engraved in the closed end.

The metallic container may include any one or more of the previous embodiments, and optionally the mark is formed with an ink.

In some embodiments, the ink is an ultraviolet ink such that the mark is visible when exposed to an ultraviolet light.

In some embodiments, the mark is formed by exposing a coating to a light source. The coating may be a photo-reactive ink. Optionally, the light source is a laser. Accordingly, the mark may be formed by exposing selected portions of the photo-reactive ink to the laser.

Additionally, or alternatively, the mark may be formed with a toner material.

In some embodiments, the mark is stored in a record in a database. The record may include two or more of: (i) an identifier for a bodymaker that formed the metallic container; (ii) an identifier for a decorator that formed a decoration on the sidewall; (iii) an identifier for an internal coater that sprayed a coating into a hollow interior of the body; (iv) an identifier for a necker that formed a neck on the metallic container; and (v) an identifier for a cupper that formed a cup that was subsequently formed into the metallic container.

Optionally, the record further comprises one or more of: (a) an identifier for a manufacturer of a coil comprising the continuous sheet of metallic material; (b) an identifier for a palletizer that placed the metallic container into a pallet; (c) an identifier for a shipper that transported the metallic container to a filler; (d) an identifier for a point of sale that sold the metallic container; and (e) an identifier for a collection point that received the metallic container.

In some embodiments, the record may also include one or more of: (a) a mass of the metallic container; (b) a name of the filler that ordered the metallic container; (c) a randomized alphanumerical code; (d) a date the metallic container left the production facility; (e) an identification of a filler; (f) an identify of a product with which the metallic container was filled; and (g) an expiration date of the product Optionally the record may be manually updated. For example, a user may enter data into a record of a database that is associated with a container body. The user may enter production data, such as a date and a time that equipment of a production line was adjusted or information about a material applied to container bodies by equipment of the production line. In this manner, information about types of coatings, inks, or decorations applied to an interior surface or an exterior surface of a container body may be entered in a record by a user.

Additionally, or alternatively, the record may further comprise other production data pulled from existing systems and databases associated with a production line that produced the metallic container. The other production data may include data such as, but not limited to: (a) a temperature of an oven that dried the metallic container; (b) a temperature of an oven that cured an ink or coating on the metallic container; (c) a time stamp identifying when the metallic container entered each piece of equipment on the production line; (d) a time stamp identifying when the metallic container exited each piece of equipment on the production line; (e) an identification of a coating on an exterior surface of the metallic container; (f) an identification of a coating on an interior surface of the metallic container; (g) an identification of an ink used in a decoration on the exterior surface; (h) a PH of a fluid used to wash the container body; (i) a weight or volume of a coating applied to the interior surface; and (j) a weight or volume of a coating applied to the exterior surface.

The metallic container may include one or more of the previous embodiments, and optionally the metallic container is formed of an aluminum material.

In some embodiments, the metallic material of the continuous sheet is a steel or tin coated steel.

In some embodiments, the metallic container is a recyclable tapered cup.

Alternatively, in another embodiment, the metallic container is a bottle.

In at least one embodiment, the metallic container has a flange to receive an end closure.

Optionally, the metallic container is a food can.

In some embodiments the metallic container is a two-piece container with a cylindrical body having one open end sealed by one end closure. Optionally, the mark may be formed on one or more of the end closure and the cylindrical body. In some embodiments, the mark is formed only on the cylindrical body of a two-piece container.

In other embodiments, the metallic container is a three-piece container that has a cylindrical body with two open ends, each open end being sealed by an end closure. In this embodiment, the mark may be formed on one or more of a first end closure, a second end closure, and a cylindrical body extending between the first and second end closures. In some embodiments, a mark is formed only on a cylindrical body of a three-piece container.

Another aspect of the present disclosure is to provide a coil of an aluminum material, comprising: (1) a sheet of the aluminum material rolled to define the coil, the sheet having a length and comprising: (a) a first long edge; and (b) a second long edge spaced from the first long edge by a width of the sheet, the second long edge approximately parallel to the first long edge; and (2) a plurality of unique marks formed on the sheet, each of the unique marks being a computer readable code and positioned within a blank location, where (i) each blank location is a circle with a center and a predetermined diameter; (ii) a first column of at least five blank locations is oriented with their centers defining a first line approximately perpendicular to the first and second edges; and (iii) a second column of at least five blank locations is oriented with their centers defining a second line approximately parallel to the first line.

In some embodiment, each of the unique marks includes an ink or a toner.

Additionally, or alternatively, the coil may include unique marks that are engraved in the continuous sheet.

In some embodiments, each of the unique marks is formed by a laser.

The coil may include any one or more of the previous embodiments, and optionally each of the unique marks is substantially centered within a blank location.

In some embodiments, each of the plurality of unique marks is formed on a first side of the sheet.

Optionally, each of the plurality of unique marks is repeated on a second side of the sheet. In this manner, a first blank location includes a first mark of the plurality of unique marks on the first side of the sheet and the first blank location includes the first mark on the second side of the sheet.

The coil may include any one or more of the previous embodiments, and optionally the first mark on the first side of the sheet is positioned substantially opposite to the first mark on the second side of the sheet.

Another aspect is to provide a system to produce a mark on a continuous sheet of a metallic material, comprising: (1) a marker to form marks on the continuous sheet at blank locations where blanks will be cut from the continuous sheet, each mark being a unique computer readable code positioned within a blank location; and (2) a coiler to roll the continuous sheet with the marks onto a coil.

Optionally, the marks include an ink or a toner.

In some embodiments, the marks are engraved in the continuous sheet.

Additionally, or alternatively, the marker comprises a laser to form the marks.

In some embodiments, the marker comprises an inkjet print head to form the marks.

In at least one embodiment, the marker comprises an electrophotographic print unit to form the marks.

The system may include one or more of the previous embodiments and optionally the marks are generated by a control system in communication with the marker.

The system may include one or more of the previous embodiments and optionally the marker forms the marks on a first side of the continuous sheet.

In some embodiments, the marker forms the marks on both the first side and a second side of the continuous sheet such that a first unique mark is formed on a first side at a first blank location and the first unique mark is formed on a second side of the first blank location.

Optionally, the marker is operable to form the first unique mark at a first position on the first side that is approximately opposite to a second position of the first unique mark on the second side.

The system may include one or more of the previous embodiments and in some embodiments each mark is a unique identifier of a blank location.

Optionally, the blank location is subsequently formed into a container body.

The system may include one or more of the previous embodiments and optionally each blank location is generally circular and has a center.

In some embodiments, the marker forms the marks such that each mark is approximately centered in a blank location.

The system may include one or more of the previous embodiments, and optionally the system further comprises an uncoiler positioned upstream from the marker, the uncoiler operable to unroll the continuous sheet from an original coil.

The system may include one or more of the previous embodiments and optionally the metallic material is an aluminum and the marker is operable to form the marks on the aluminum metallic material.

Still another aspect of the present disclosure is a method of tracking and tracing a container body, comprising: (1) creating a unique identifier; (2) storing the unique identifier in a record of a database; (3) providing the unique identifier to a marker, wherein the marker forms a mark that is positioned on the container body, wherein the mark is associated with the unique identifier; (4) scanning the mark by a first sensor in a production facility; (5) updating the record associated with the unique identifier with information received from the first sensor; (6) scanning the mark by a second sensor after the container body is transported from the production facility; and (7) updating the record associated with the unique identifier with information received from the second sensor.

Optionally the first sensor is associated with a cupper, a bodymaker, a decorator, an internal coater, a necker, a flanger, a sorter, or a palletizer of the production facility.

In some embodiments, the second sensor is associated with a filler, a distributor, a point of sale, a consumer, or a collection point.

Optionally, the second sensor is at the point of sale and the record is updated to include information about a sale of the container body and a deposit collected during the sale.

In some embodiments, the second sensor is at the collection point and the record is updated to include information about redemption of a deposit collected when the container body was sold.

The method may include one or more of the previous embodiments, and optionally further comprises modifying the record to include one or more of: (i) a production date of the container body; (ii) a production time of the container body; (iii) a production location of the container body; (iv) a production line identifier; (v) a batch number; (vi) a shift identifier; (vii) material specifications of metallic material of a sheet from which the container body was formed; (viii) an identifier for a manufacturer of a coil comprising the sheet; (ix) an identifier or a serial number of the coil; (x) a position of the mark on the sheet; (xi) a mass of the container body; (xii) a name of the filler that ordered the container body; and (xiii) a randomized alphanumerical code.

The method may further comprise modifying the record each time the mark is scanned to include one or more of: a date of the scan; a time of the scan; and a location of a sensor making the scan.

In some embodiments, the mark is a computer readable code.

Additionally, or alternatively, the method may further comprise updating the record to include one or more of: (a) an identifier for a bodymaker that formed the container body; (b) an identifier for a decorator that formed a decoration on the container body; (c) an identifier for an internal coater that sprayed a coating into a hollow interior of the container body; and (d) an identifier for a necker that formed a neck on the container body.

In some embodiments the method further comprises updating the record to include one or more of: (a) an identifier for a manufacturer of a coil from which the container body was formed; (b) an identifier for a palletizer that placed the container body into a pallet; (c) an identifier for a shipper that transported the container body to a filler; (d) an identifier for a point of sale that sold the container body; and (e) an identifier for a collection point that received the container body.

Another aspect of the present disclosure is a method of recycling a container body, comprising: (1) receiving the container body at a collection point; (2) scanning a mark on the container body with a sensor; (3) identifying a record in a database, the record being associated with the mark; (4) checking the record to determine if a deposit was collected for the container body when the container body was purchased; and (5) revising the record to indicate that the deposit was redeemed.

Still another aspect of the present disclosure is a method of forming an end closure adapted to be interconnected to an open end of a metallic container. The method comprises: (1) forming an end shell from a sheet of aluminum material, the end shell comprising a first side, a second side, and a circular perimeter; (2) feeding the end shell into a conversion press; (3) forming, by the conversion press, a rivet on the end shell; (4) interconnecting, by the conversion press, a tab to the rivet to transform the end shell into the end closure, the tab positioned on the second side of the end closure, wherein the first side of the end shell has a first mark formed before the tab is interconnected to the rivet.

Optionally, the method may further comprise forming a second mark on the second side of the end closure.

The method may optionally comprise creating a record in a database, the record comprising information about the first mark, the optional second mark, and the end closure.

Optionally, the method further comprises: (a) scanning the first mark with a first sensor after forming the rivet; and (b) updating the record with a time of the scan by the first sensor.

Additionally, or alternatively, the method may include one or more of the previous embodiments and further comprises: (c) scanning the first mark with a second sensor before attaching the tab to the rivet; and (d) updating the record with a time of the scan by the second sensor.

In some embodiments, the method comprises: (e) scanning the second mark with a third sensor after the end closure is discharged from the conversion press; and (f) updating the record with a time of the scan by the third sensor.

The method may include any one or more of the previous embodiments and optionally the first mark is identical to the second mark. Alternatively, in other embodiments, the first mark is different from the second mark. The method may optionally comprise updating a record associated with the first mark in a database to include a field with information about the second mark. In this manner, the end closure may be tracked by scanning either the first mark or the second mark.

The method may include any one or more of the previous embodiments and optionally a marker forms one or more of the first mark and the second mark with an ink. Additionally, or alternatively, a marker forms one or more of the first mark and the second mark with a laser.

In some embodiments, the marker that forms the first mark on the first side is a printer that deposits a food grade ink. The printer is optionally a continuous inkjet printer or a drop on demand inkjet printer.

In some embodiments the method includes one or more of the previous embodiments and further comprises forming a score on the second side of the end shell, the score defining a tear panel.

Optionally, the method comprises forming the second mark on the tear panel.

Additionally, or alternatively, the second mark may be formed at or near the rivet.

In one or more embodiments, the second mark is formed before the tab is interconnected to the rivet. Alternatively, the second mark is formed after the tab is interconnected to the rivet.

The method may include any of the previous embodiments and optionally, after the tab is interconnected to the rivet, the tab covers at least a portion of the second mark.

In some embodiments, forming the second mark further comprises: (i) determining an orientation of the tear panel; (ii) rotating the end closure about a central axis to a predetermined orientation such that the central axis is perpendicular to the second side; and (iii) forming the second mark in a predetermined location of the second side.

The method may include any one or more of the previous embodiments and further comprise forming the first mark before the rivet is formed.

In some embodiments, the first mark is formed before the end shell is fed into the conversion press.

Additionally, or alternatively, the first mark may be formed before the end shell is formed by a shell press.

The method may include one or more of the previous embodiments, and optionally include forming the first mark on the sheet of aluminum material.

In some embodiments, one of the first mark and the second mark is formed when the end shell is in a rod cage conveyor.

Yet another aspect of the present disclosure is to provide an end closure adapted to be seamed to an open end of a metallic container, comprising: (1) a peripheral curl; (2) a chuck wall extending downwardly from the peripheral curl; (3) a countersink interconnected to a lower end of the chuck wall; (4) a central panel interconnected to the countersink; (5) a tear panel defined by a score in the central panel; (6) a tab operably interconnected to a public side of the central panel; (7) a product side opposite to the public side; and (8) a first mark on the product side.

Optionally, the end closure further comprises a second mark selectively visible from the public side.

The first mark is optionally identical to the second mark.

Alternatively, the first mark is different from the second mark.

In some embodiments, one or more of the first mark and the second mark is formed by an ink.

Additionally, or alternatively, one or more of the first mark and the second mark is formed by a laser.

In some embodiments, the first mark is formed of a food grade ink. Additionally, or alternatively, the first mark is optionally formed by a continuous inkjet printer or a drop on demand inkjet printer.

The end closure may include one or more of the previous embodiments and further comprise the second mark formed on the tear panel.

In at least one embodiment, the second mark is covered at least partially by the tab.

In some embodiments, the second mark is formed on a first surface of the tab facing the public side of the central panel such that the second mark is visible after the tab is pivoted relative to the central panel.

The second mark may optionally be formed on a second surface of the tab facing away from the public side of the central panel.

The end closure may include one or more of the previous embodiments, and the tab may optionally comprise: (a) a nose end to engage the tear panel; (b) a tail end opposite to the nose end that is configured to be manipulated by a user to force the nose end against the tear panel; and (c) a medial portion between the nose end and the tail end that is operably interconnected to the central panel.

In some embodiments, the second mark is formed on the tail end of the tab.

The tab may optionally have a closed web of aluminum material in the tail end. In some embodiments, the second mark is formed on the closed web.

Additionally, or alternatively, the second mark is formed proximate to the nose end of the tab.

In one or more of the previous embodiments, the second mark is positioned between the nose end and a point at which the tab is operably interconnected to the central panel.

One aspect of the present disclosure is to provide an end closure adapted to be seamed to an open end of a metallic container for tracking and tracing the end closure, comprising a product side and an opposing public side of the end closure; a chuck wall extending downwardly from a peripheral curl, wherein a countersink is interconnected to a lower end of the chuck wall, and a central panel is interconnected to the countersink; a tear panel defined by a score in the central panel; a tab operably interconnected the central panel; and a mark on the public side of the end closure at the peripheral curl.

The end closure of the present disclosure may include the previous embodiment and optionally an additional mark on the public side of the central panel. In some embodiments, the additional mark is partially covered by the tab.

Another aspect of the present disclosure is to provide a method of marking a continuous sheet of a metallic material for tracking and tracing an end closure during a manufacturing process and during the subsequent distribution of the end closure, comprising moving the sheet proximate to a marker; forming, by the marker, a mark at an outer edge of a blank location of the sheet, wherein the mark includes a unique identifier; cutting a blank from the sheet such that the mark is located on a public side of the blank; forming the blank into an end shell having a chuck wall extending downwardly from a peripheral curl, wherein a countersink is interconnected to a lower end of the chuck wall, and a central panel is interconnected to the countersink, wherein the mark is located on the peripheral curl; forming the end shell into the end closure; scanning, by a sensor, the mark on the end closure to generate a scan event associated with the mark; and transmitting, via a network, the scan event to a database where the scan event is used to track and trace the end closure.

One aspect of the present disclosure is to provide a method of marking an end closure during a manufacturing process for tracking and tracing the end closure, comprising cutting a blank from a continuous sheet of metallic material; forming an end shell from the blank, wherein a first mark, formed by a first marker, is located on a product side of the end shell, and the end shell has a public side opposing the product side; scanning, by a first sensor, the first mark to generate a first scan event associated with the first mark; conveying the end shell to a conversion press; forming, by a second marker, a second mark on the public side of the end shell; forming, by the conversion press, at least one feature on the public side of the end shell to form the end closure; and scanning, by a second sensor, the second mark to generate a second scan event associated with the second mark for tracking and tracing the end closure.

In some embodiments, the first mark is formed by the first marker on a product side of the continuous sheet prior to cutting the blank from the continuous sheet.

The method of the present disclosure may include one or more of the previous embodiments and optionally the first marker is a printer that deposits a food grade ink on the product side of the continuous sheet to form the first mark. In some embodiments, the printer is an inkjet printer, such as a continuous inkjet printer or a drop on demand inkjet printer.

Optionally, the second marker is a laser that ablates at least a portion of a coating or a material of the public side of the end shell to form the second mark.

In some embodiments, the second marker is a printer that uses ink to form the second mark. Optionally, the second marker comprises an inkjet printer, such as a continuous inkjet printer or a drop on demand inkjet printer.

The method of the present disclosure may include one or more of the previous embodiments and optionally the second mark is formed by the second marker at an infeed of the conversion press.

Additionally or alternatively, the method of the present disclosure may comprise forming, by the first marker, a plurality of first marks at blank locations on a product side of the continuous sheet; mapping, in a database, the plurality of first marks to the blank locations; cutting a plurality of blanks from the continuous sheet; scanning, by the first sensor, the plurality of first marks to generate a plurality of first scan events; and transmitting, via a network, the plurality of first scan events to the database where the plurality of first scan events is associated with the plurality of first marks and blank locations to collect data on the manufacturing process and to determine a deficiency in the manufacturing process.

The method of the present disclosure may include one or more of the previous embodiments and optionally further comprise holding, by a transfer belt, the end shell in a constant orientation during the forming of the second mark and the forming of the at least one feature.

In some embodiments, the second mark is associated with the first mark in a record of a database.

The method of the present disclosure may include one or more of the previous embodiments and optionally further comprise recording, in a record of a database, the first mark and associated end shell; transmitting the first scan event to the database to update the record with the first scan event, wherein subsequent scan events associated with the first mark are used to determine a deficiency in the manufacturing process; recording, in the record of the database, the second mark; and transmitting the second scan event to the database to update the record with the second scan event.

The method of the present disclosure may include one or more of the previous embodiments and optionally further comprise scanning, by a sensor of a mobile device, the second mark to generate a mobile scan event to associate the mobile device with the end closure.

It is another aspect of the present disclosure to provide an end closure adapted to be seamed to an open end of a metallic container for tracking and tracing the end closure, comprising a product side and an opposing public side of the end closure; a chuck wall extending downwardly from a peripheral curl, wherein a countersink is interconnected to a lower end of the chuck wall, and a central panel is interconnected to the countersink; a tear panel defined by a score in the central panel; a tab operably interconnected the central panel; and a first mark on the product side of the end closure, and wherein the first mark is formed of a food grade ink wherein the first mark is adapted to be scanned for tracking and tracing the end closure.

In some embodiments, the end closure further comprises a second mark on the public side of the end closure, wherein the second mark is formed by an ablated material on the public side of the end closure, and the second mark is adapted to be scanned for tracking and tracing the end closure.

In some embodiments, a unique identifier of the first mark is distinct from a unique identifier of the second mark.

The end closure of the present disclosure may include one or more of the previous embodiments and optionally the second mark is formed on at least one of the peripheral curl, the tear panel, a tail of the tab, a nose of the tab, the central panel at least partially under the tail of the tab, a surface of the tab facing the central panel, a surface of the tab facing away from the central panel, and the chuck wall.

The end closure of the present disclosure may include one or more of the previous embodiments and optionally the second mark is at least one of: formed on the tear panel, and at least partially covered by the tab.

The end closure of the present disclosure may include one or more of the previous embodiments and optionally the second mark is on a tail end of the tab.

In some embodiments, the second mark is on a surface of the tab facing the central panel of the end closure.

Alternatively or additionally, the second mark is on a surface of the tab facing away from the central panel of the end closure.

It is an aspect of the present disclosure to provide a method of marking a continuous sheet of a metallic material for tracking and tracing metallic workpieces during a manufacturing process and during the subsequent distribution of metallic containers, comprising moving the continuous sheet proximate to a marker; forming, by the marker, a plurality of marks at blank locations of the continuous sheet, wherein each mark of the plurality of marks includes a unique identifier; cutting blanks from the continuous sheet such that each blank has a mark from the plurality of marks; forming the blanks into the metallic workpieces; scanning, by a sensor, the marks on the metallic workpieces to generate a scan event associated with each mark; and transmitting, via a network, the scan events to a database where the scan events are used to track and trace the metallic workpieces.

In some embodiments, the marks are formed at the blank locations at (i) an infeed of a press during a dwell period of the continuous sheet; (ii) the infeed of the press between dwells periods of the continuous sheet; or (iii) a location upstream of the infeed of the press where a continuous feed of the continuous sheet is separated from the dwell period by a slack portion of the continuous sheet.

In various embodiments, the marker comprises at least one of a laser and a printer.

In some embodiments, the metallic workpieces are one of a cup, a tab, an end shell, and an end closure.

The method of the present disclosure may further comprise cutting, by a cupper, the blanks from the blank locations, wherein the metallic workpieces are cups, and wherein the cupper forms the blanks into the cups with one of the marks located on a closed end of each one of the cups.

Alternatively, the method of the present disclosure may further comprise cutting, by a conversion press, the blanks from the blank locations, wherein the metallic workpieces are tabs, and wherein the conversion press forms the blanks into the tabs with one of the marks located on each one of the tabs.

Alternatively, the method of the present disclosure may further comprise cutting, by a shell press, the blanks from the blank locations, wherein the metallic workpieces are end shells, and wherein the shell press forms the blanks into the end shells with one of the marks located on each one of the end shells.

The method of the present disclosure may further comprise scanning, by a second sensor, the marks on the metallic workpieces to generate a second scan event associated with each mark; transmitting, via the network, the second scan events to the database; determining that one of the metallic workpieces is defective; and identifying a cause of a deficiency in the manufacturing process based on the scan events related to the defective workpiece.

The method of the present disclosure may include one or more of the previous embodiments and optionally each mark of the plurality of marks is located proximate to an outer edge of the respective blank location, and the metallic workpieces are end shells such that each mark of the plurality of marks is position on a peripheral curl of the respective end shell.

In some embodiments, the method further comprises scanning, by the sensor, the marks to generate the scan event occurs as the plurality of end shells is arranged in a stack such that the mark on the peripheral curl of each end shell of the plurality of end shells is visible.

In various embodiments, the annular shape of each mark comprises alternating lines and spaces that form at least one barcode on the peripheral curl of each end shell of the plurality of end shells.

In some embodiments, the annular shape of each mark is on a public side of the respective end shell.

It is another aspect of the present disclosure to provide a method of marking a metallic workpiece for tracking and tracing the metallic workpiece during a manufacturing process and during the subsequent distribution of a metallic container, comprising detecting, by a sensor, a first orientation of the metallic workpiece used to produce the metallic container; reorienting the metallic workpiece from the first orientation to a second orientation; stabilizing the metallic workpiece as the metallic workpiece is moved proximate to a marker; forming, by the marker, a mark on the stabilized metallic workpiece, wherein the mark includes a unique identifier; and scanning, by a sensor, the mark to generate a scan event associated with the mark for tracking and tracing the metallic workpiece.

In various embodiments, the metallic workpiece is one of a tab, a container body, an end shell, an end closure, or a tapered cup.

In some embodiments, the marker comprises at least one of a laser and an inkjet printer.

The method of the present disclosure may include one or more of the previous embodiments and optionally further comprise providing a first belt contacting a first side of the metallic workpiece, and providing a second belt contacting a second side of the metallic workpiece; and rotating the first belt at a first speed and the second belt at a second speed, based on the first orientation, to rotate the metallic workpiece to the second orientation.

Additionally or alternatively, the method of the present disclosure may include one or more of the previous embodiments and optionally further comprise providing a rotating plate with at least one servo; positioning the metallic workpiece on the at least one servo of the rotating plate; and rotating, by the at least one servo, the metallic workpiece from the first orientation to the second orientation.

The method of the present disclosure may include one or more of the previous embodiments and optionally further comprise providing a stabilization system having a feed screw, wherein the feed screw rotates about an axis that is parallel with a direction of movement of the metallic workpiece; and contacting, by a thread of the feed screw, the metallic workpiece to move the metallic workpiece in a direction perpendicular to the movement direction such that the metallic workpiece contacts a surface to stabilize the metallic workpiece.

Additionally or alternatively, the method of the present disclosure may include one or more of the previous embodiments and optionally further comprise providing a stabilization system having a vacuum portion that moves air in a direction perpendicular to a direction of movement of the metallic workpiece; and drawing the metallic workpiece against the vacuum portion to stabilize the metallic workpiece.

In some embodiments, the marker comprises a continuous inkjet printer at an end of a production line prior to the metallic workpiece being packaged, palletized, and shipped to a second location.

In various embodiments, the marker comprises a continuous inkjet printer at an infeed of an inside spray machine, and wherein the method further comprises spraying a coating on an interior surface of the metallic workpiece.

Still another aspect of the present disclosure is a metallic container, comprising: a body comprising: a closed end; a sidewall extending upward from the closed end; a neck located at an upper end of the sidewall; and a first mark on an exterior surface of the body, the first mark adapted to be scanned for tracking and tracing the body; and an end closure connected to the neck of the body by a seam, comprising: a chuck wall extending downwardly from the seam; a countersink interconnected to a lower end of the chuck wall; a central panel interconnected to the countersink; a tear panel defined by a score in the central panel; a tab operably interconnected the central panel; and a second mark on a public side of the end closure, wherein the second mark is adapted to be scanned for tracking and tracing the end closure.

In some embodiments the first mark is formed by an ink.

Alternatively, the first mark is formed by an ablated material on the exterior surface of the body.

Optionally, the second mark is formed by an ink.

Alternatively, the second mark is formed by an ablated material on the public side of the end closure.

The metallic container may comprise one or more of the previous embodiments, and optionally a unique identifier of the first mark is distinct from a unique identifier of the second mark.

In one or more embodiments, a database comprises a record associated with the metallic container. A first field of the record includes a first identifier associated with the first mark. A second field of the record includes a second identifier associated with the second mark.

Optionally, the record comprises a first production identifier to identify a first production line that produced the container body.

Additionally, or alternatively, the record may comprise a second production identifier of a second production line that produced the container body. In at least one embodiment, the first production line is at a first geographic location and the second production line is at a second geographic location spaced at least 1 km from the first geographic location.

In some embodiments, the record comprises an identifier of a filler that filled the metallic container and seamed the end closure to the container body.

The metallic container may include any one or more of the previous embodiments, and the second mark is optionally formed on at least one of the peripheral curl, the tear panel, a tail of the tab, a nose of the tab, a portion of the central panel at least partially under the tail of the tab, a surface of the tab facing the central panel, a surface of the tab facing away from the central panel, and the chuck wall.

In at least one embodiment, the first mark is formed on the closed end of the body. Optionally, the closed end of the body comprises a dome. The first mark may be approximately centered on the dome.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The systems, methods, and apparatus of the present disclosure may be used to apply marks to workpieces and packaging formed of any material. More specifically, the systems, methods and apparatus of the present disclosure may be used to mark, track, and trace workpieces, packaging, and container bodies formed of paper and other fibrous materials, plastic, glass, metals, and other materials known to those of skill in the art.

The terms “metal” or “metallic” as used hereinto refer to any metallic material that may be used to form a container, including without limitation aluminum, steel, tin, tin coated steel, copper, and any combination thereof.

The terms “sensor,” “camera”, and “scanner” may be used interchangeably herein and generally refer to a device that detects a physical property of an object, in this instance a mark or other feature of a metallic workpiece.

Although generally referred to herein as a “container body” or a “metallic container,” it should be appreciated that the methods and apparatus described herein may be used in the production of metallic workpieces and metal packaging of any size, shape, or type which are used for any purpose. In some embodiments, the metallic workpieces include without limitation a metallic beverage bottle, a metallic beverage container, an aluminum bottle, a two-piece container, a two-piece can, a can, an aerosol container, a three-piece container (for example, a food can), or a metal cup (such as a tapered cup). As used herein, a “container body” can be formed into any type of container or vessel for a product. The product may be a liquid or a solid. In some embodiments, the product may be a beverage or a food. The produce may also be a personal care item such as deodorant, sunscreen, hair spray, and the like. In some embodiments, the product may be from a plant.

A container body generally includes a closed endwall, a sidewall, and an open end. In some embodiments the endwall includes a dome. When present, the dome is positioned inward of a standing surface or “stand ring” formed on the closed end wall. Alternatively, the endwall may be generally planar. The sidewall may be generally cylindrical. Alternatively, the sidewall is tapered such that the open end has a larger diameter than the closed endwall. In some embodiments, container body includes a neck between the sidewall and the open end.

References made herein to "end closures," or "container end closures" should not necessarily be construed as limiting the present invention to a particular size, shape, or type of end closure. It will be recognized by one skilled in the art that the systems and methods of the present disclosure may be used to form a mark on an end closure of any variety, size, or type, including end closures with one or more pour or vent openings or other areas or features. An end closure may comprise one or more of, but is not limited to: a peripheral curl, a chuck wall extending downwardly from the peripheral curl, a countersink interconnected to a lower end of the chuck wall, a central panel interconnected to the countersink, a tear panel in the central panel, and a tab operably interconnected to an exterior surface of the central panel. In some embodiments, the tab is interconnected to the central panel by a rivet. As used herein, an end shell refers to an incomplete end closure such as at a point of production before the rivet is interconnected to the central panel. The public side of an end closure refers to the side that the public interacts with. The product side of the end closure refers to the side that will be contact with product when the end closure is interconnected to a container body.

The terms "sheet" and "continuous sheet" may refer to a piece of material that has a length greater than 100 feet (30.5 meters). The sheet may also be referred to as continuous web of material. The sheet is rolled to form a coil, and a coil is unrolled to provide a sheet.

The systems and methods of the present disclosure may be used with a container body formed by any method known to one of skill in the art. For example, a container body may be formed by a draw and ironing process or by an impact extrusion process. Alternatively, a container body can be formed by a blow molding process or by injection molding.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, angles, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 10% of the stated value.

Unless otherwise indicated, the term "substantially" indicates a different of from 0% to 5% of the stated value is acceptable.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

Figure 1:
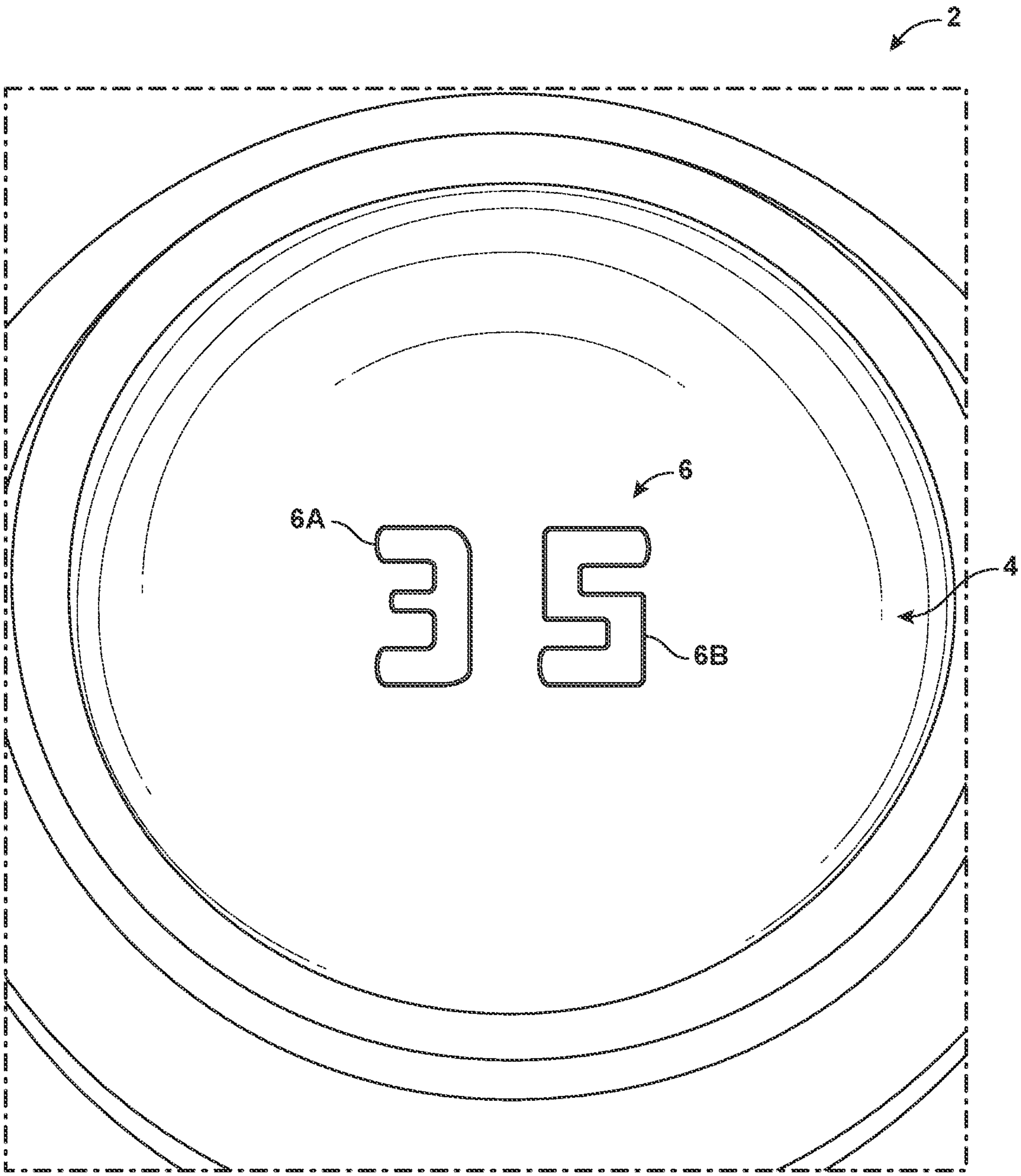
FIG. 1 (Prior Art)
FIG. 1 illustrates a closed endwall of a container body showing a prior art mark made by a bodymaker during production of the container body.

The drawings are not necessarily (but may be) to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

The following is a listing of components according to various embodiments of the present disclosure, and as shown in the drawings:

| Number | Component |
|---|---|
| 2 | Container body |
| 4 | Closed end or dome of container body |
| 6 | Mark |
| 10 | Production line |
| 12 | Uncoiler |
| 14 | Sheet |
| 16 | Arrow showing direction of movement |
| 18 | Portion of sheet |
| 20 | Blank location where a cup will be formed |
| 22 | Cupper |
| 24 | Marker |
| 26 | Mark |
| 28 | Indicia |
| 30 | Space |
| 32 | Conveyor |
| 34 | Sensor |
| 36 | Bodymaker |
| 38 | Washer |
| 40 | Dry-off Oven |
| 42 | Basecoater |
| 44 | Basecoat oven |
| 46 | Decorator |
| 48 | Deco Oven |
| 50 | Internal coater |
| 52 | Internal Bake Oven |
| 54 | Die necker |
| 56 | Flanger |
| 57 | Inspection station |
| 58 | Sorter |
| 59 | Palletizer |
| 60 | Storage |
| 61 | De-palletizer |
| 62 | Filler |
| 64 | Point of Sale |
| 66 | Consumer |
| 68 | Collection Point |
| 70 | X-axis (corresponding to a length of a sheet) |
| 72 | Y-axis (corresponding to a width of a sheet) |
| 100 | Control system |
| 102 | Bus |
| 104 | CPU |
| 106 | Input devices |
| 108 | Output devices |
| 110 | Storage devices |

-continued

| Number | Component |
|---|---|
| 112 | Computer readable storage media reader |
| 114 | Communication system |
| 116 | Working memory |
| 118 | Processing acceleration unit |
| 120 | Database |
| 122 | Network |
| 124 | Remote storage device/database |
| 126 | Operating system |
| 128 | Other code |
| 130 | Data structure |
| 132 | First data object |
| 134 | Second data object |
| 136 | Ellipses |
| 138 | Ellipses |
| 140 | Record |
| 142 | Identifier |
| 144 | Production date |
| 146 | Production time |
| 148 | Production location |
| 150 | Production line identifier |
| 152 | Cupper identifier |
| 154 | Other equipment |
| 200 | Orientation System |
| 202 | Container Body |
| 204a, 204b | Initial, Final Orientations |
| 205 | Reference Line |
| 206 | Sensor |
| 208 | Electronic Device |
| 210a, 210b | Belts |
| 212 | Orientation System |
| 214 | Infeed |
| 216 | Sensor |
| 218 | Electronic Device |
| 220 | Plate |
| 221 | Rotation Direction |
| 222 | Servo |
| 224 | Outfeed |
| 226 | Stabilization System |
| 228 | Cage |
| 230 | Container |
| 232 | First Direction |
| 234 | Second Direction |
| 236 | Feed Screw |
| 238 | Marker |
| 240 | Inspection System |
| 242 | Ejector System |
| 244 | Gap |
| 246 | Third Direction |
| 248 | Stabilization System |
| 250 | Container |
| 252 | Star Wheel |
| 254 | Marker |
| 256 | Scanner |
| 258 | Pneumatic System |
| 260 | Stabilization System |
| 262 | Container |
| 264 | Vacuum Conveyance System |
| 266 | Marker |
| 268 | Scanner |
| 270 | Pneumatic System |
| 272 | Stabilization System |
| 274 | Cage |
| 276 | Container |
| 278 | First Direction |
| 280 | Second Direction |
| 282a, 282b | Side Grip |
| 284 | Marker |
| 286 | Scanner |
| 288 | Pneumatic System |
| 290 | Process |
| 292 | Form First Mark |
| 294 | Cut Blank |
| 296 | Scan First Mark |
| 298 | Feed Transfer Belt |
| 300 | Form Second Mark |
| 302 | Form Feature |
| 304 | Scan Second Mark |

-continued

| Number | Component |
|---|---|
| 306 | End Closure |
| 308a, 308b | Mark |
| 310 | Peripheral Curl |
| 312 | Chuck Wall |
| 314 | Countersink |
| 316 | Central Panel |
| 318 | Score |
| 320 | Rivet |
| 322 | Tab |
| 324a-c | Mark |
| 326 | Process |
| 328 | Form Mark |
| 330 | Feed Cupper |
| 332 | Cut Blank |
| 334 | Form Cup |
| 336 | Process |
| 338 | Form Mark |
| 340 | Feed Inside Spray Machine |
| 342 | Process |
| 344 | Form Mark |
| 346 | Feed Conversion Press |
| 348 | Cut Blank |
| 350 | Form Tab |
| 352 | Process |
| 354 | Form Mark |
| 356 | Palletize |

DETAILED DESCRIPTION

Figure 2A:
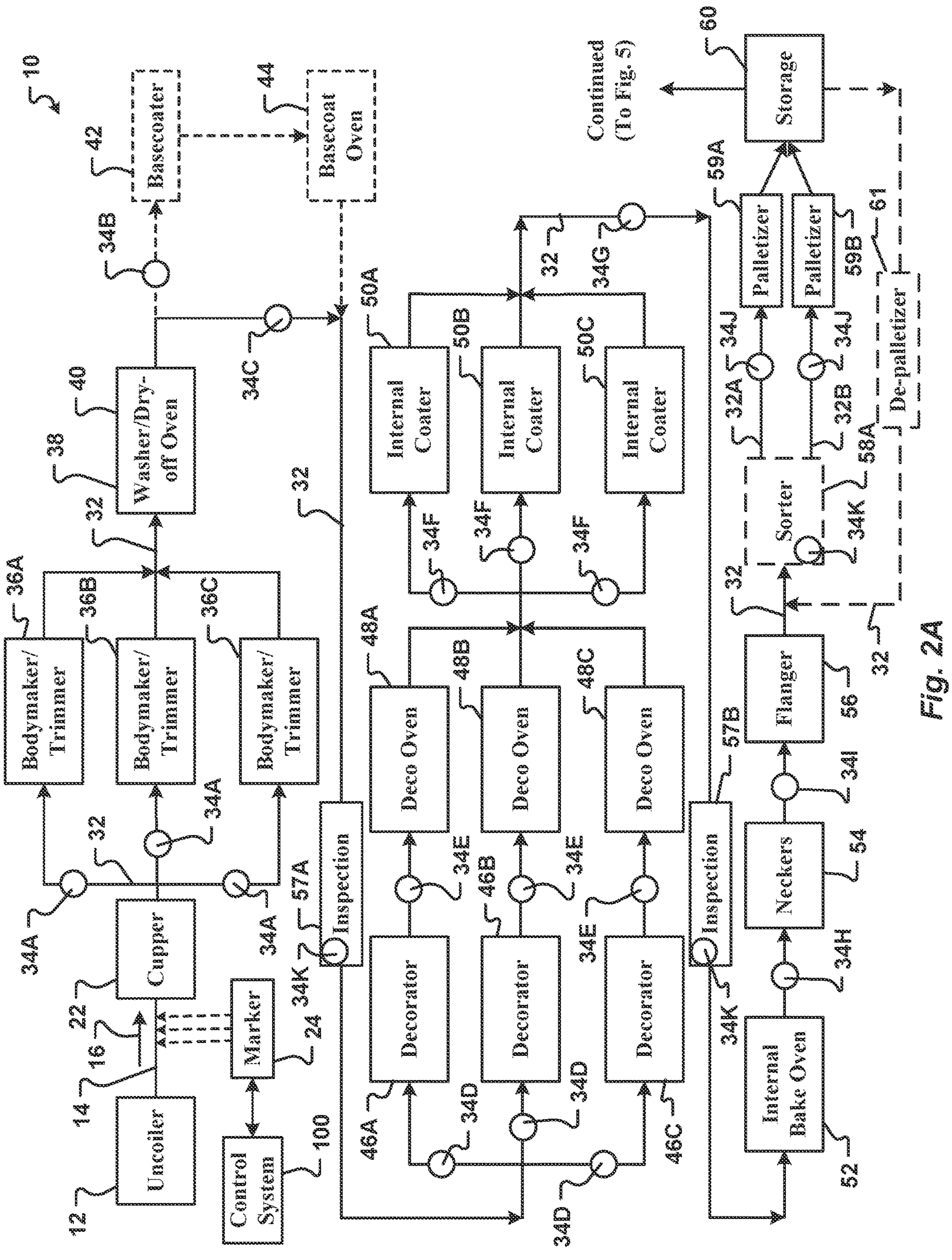
FIG. 2A is a schematic illustration of a production line according to embodiments of the present disclosure.

Referring now to FIG. 2A, a schematic illustration of a production line 10 according to embodiments of the present disclosure is generally illustrated. The production line produces container bodies by a draw and wall ironing (DWI) process.

The production line has an uncoiler 12 that unwinds a coil of a continuous sheet 14 of a metal material. The metal material may be an aluminum alloy or any other metallic material (such as a steel or a tin coated steel) used to form container bodies. The continuous sheet has a length extending in a X-direction and a width (in a Y-direction) between a first long edge and an opposite second long edge. As will be appreciated by one of skill in the art, the length of the continuous sheet 14 is substantially longer than its width.

The uncoiler 12 feeds the sheet 14 in a direction indicated by the arrow 16 into a cupper 22. The cupper cuts circular blanks from the sheet 14 and forms the blanks into cups. The sheet 14 is fed or drawn into the cupper 22 incrementally after each stroke of the cupper. Accordingly, there is a dwell period between each stroke of the cupper during which the sheet 14 is generally stationary. Some cuppers operate at up to 250 strokes per minute and may form 12 to 16 cups per stroke. A typical cupper forms eight cups in one or more rows across the width of the sheet during each cycle.

Although only one cupper is illustrated in FIG. 2A, some production lines 10 have two or more cuppers. Accordingly, during a single production run, the production line may have container bodies created from sheets 14 of two or more coils of metallic material. Similarly, although only one uncoiler 12 is illustrated, the production line 10 may have any number of uncoilers.

In some embodiments, the production line does not have any uncoilers or cuppers. In these embodiments, blanks with marks are introduced into the production line and formed into a container body by a bodymaker.

In some embodiments, the coil loaded in the uncoiler 12 includes a plurality of unique marks 26 formed on the sheet 14. The marks are formed at a plurality of blank locations 20 (illustrated in FIG. 3A) where blanks for cups will be cut by a cupper 22. Specifically, the marks 26 may be formed before the coil is loaded into the uncoiler.

In some embodiments, the marks are formed by a marker in a production facility that includes the production line 10. However, in some embodiments, the marks are formed on the sheet 14 before the coil is delivered to the production facility.

Alternatively, in some embodiments, a marker 24 according to embodiments of the present disclosure is positioned in the production line 10 between the uncoiler 12 and the cupper 22. In embodiments, the marker 24 is positioned up-line of an infeed of the cupper 22.

The marker 24 is operable to form a mark on at least one side of the sheet 14 before it is fed into the cupper. In some embodiments, the marks 26 are formed on a side of the sheet that will form an exterior surface (or "public side") of the container bodies. Alternatively, the marks 26 are formed on a side of the sheet that will form an interior surface (or "product side") of the container bodies 2.

Optionally, the marker 24 can form the mark 26 at two or more portions of each blank location 20. In this manner, each container body 2 may have the unique mark 26 at two or more locations.

In some embodiments, the marker 24 forms marks on only a first side of the sheet. Alternatively, in other embodiments, the marker 24 forms marks on only a second side of the sheet. In still other embodiments, the marker 24 forms marks on both the first and second sides of the sheet.

The marker 24 is configured to form a mark 26 at each blank location 20 where the cupper 22 will form a cup. More specifically, and referring now to FIG. 3A, the marker 24 is configured to form a mark 26 in each location 20 of the sheet 14 that will be formed into a cup by the cupper 22. In various embodiments, a plurality of markers 16 form marks 26 at multiple locations 20 of the sheet 14 to maintain a production speed of the sheet 14. For example, sixteen markers 16 can be arrayed across a width (or Y-dimension 72) of the sheet to simultaneously, or nearly simultaneously, mark sixteen blank locations 20, in this instance, 3*a*-3*p*. Thus, in a given marking sequence, each marker 26 will apply a mark with a unique identifier to one location 20 of the sheet 14. It will be appreciated that sixteen markers 24 is only exemplary in nature. In some embodiments where both of a product side and a public side of a sheet are simultaneously marked, thirty two markers 24 are used, and generally, embodiments of the present disclosure encompass any number of markers 24 in any configuration to form marks 26 on the sheet.

In some embodiments, the marker 24 is configured to form the mark 26 on any portion of a blank location 20 that will subsequently define the closed bottom end of a metallic container. In some embodiments, the marker 24 will form the mark on a portion of the blank location that is offset from a center of the closed bottom end. Additionally, or alternatively, the marker may for the mark 26 at approximately a center of each blank location 20. Positioning the marks in approximately a center of each cup location 20 beneficially ensures the marks will be approximately centered on the closed bottom ends of metallic containers formed by the production line 10.

Locating the mark 26 on a closed bottom end of a container body is advantageous for several reasons. First, in some container bodies, the closed bottom end includes a dome that is recessed inwardly. A mark 26 positioned on the bottom dome is generally protected from abrading or wearing forces that may render the mark incapable of being read by a sensor. In addition, when metallic containers are crushed to a smaller size, they are frequently crushed along a length of the container body, leaving the closed bottom end intact and substantially unchanged.

Forming the mark 26 such that it is approximately centered on a blank location 20 is also beneficial because during cupping by the cupper 22 (and in an ironing process performed by a bodymaker 36) the closed end 4 of the container body 2 experiences little deformation. Accordingly, a mark 26 formed at a position of the blank location 20 that is subsequently formed into the closed end means that the mark experience little (or no) deformation and degradation by operations performed by the cupper 22 or the bodymaker 36.

Another benefit of locating the mark 26 of the present disclosure on the closed bottom end is that the closed bottom end is not typically decorated. In contrast, the cylindrical sidewall of a container body is frequently decorated with inks or coved by a label. Accordingly, by positioning the mark on the closed bottom end, the mark is not covered by decoration and labels and does not detract from decorations formed on the cylindrical sidewall.

Moreover, a mark 26 positioned on the closed bottom end is easier to detect with a sensor 34 as a container body is transported on a conveyor 32. For example, as will be appreciated by one of skill in the art, some conveyors 32 of the production line transport a plurality of container bodies tightly packed together with either the closed bottom ends or the open ends facing the conveyor. Accordingly, a sensor positioned above or below the conveyor can scan the mark on the closed bottom end of a container body.

In contrast, the cylindrical sidewalls of the container bodies may be contacting the cylindrical sidewalls of several other container bodies. Accordingly, a mark formed on the cylindrical sidewall of a container body is frequently obstructed by other container bodies and blocked from view of a sensor.

In some embodiments, the marker 24 may form the mark 26 on a portion of a blank location 20 that will form a closed end 4 of a container body 2. Additionally, or alternatively, the marker 24 can form the mark 26 on a portion of a blank 20 location that will form a sidewall or cylindrical portion of a container body 2. The mark 26 may be formed on a side of the sheet that will subsequently define an exterior surface (the "public side") or an interior surface (the "public side") of the container body.

Optionally, a first marker 24 is positioned to form a first mark 26 on a first side of a first blank location 20 of the continuous sheet 14. A second marker 24 is positioned to form the same first mark 26 on a second side of the first blank location 20 of the continuous sheet. In this manner, in some embodiments, the first mark 26 may be formed on both sides of the continuous sheet of the first blank location 20 where a blank will be cut from the continuous sheet. Accordingly, a container body 2 may have the first mark 26 positioned on its exterior surface. The same first mark 26 can be repeated on an interior surface of the container body 2.

Optionally, the first mark formed on the first side of the first blank location 20 is positioned approximately opposite to a position of the first mark formed on the second side of the first blank location. Alternatively, the first mark on the first side is offset from the first mark on the second side. In this manner, the first mark may be positioned on a closed end on a first surface of the container body and the first mark can be positioned on a sidewall on a second surface of the container body.

In some embodiments, the marker 24 forms the marks for each cup location 20 during each cycle of the cupper 22. Optionally, the marker 24 forms the marks 26 while the sheet 14 is stationary. For example, the marker 24 may form the marks during a dwell period during which the continuous sheet 14 is not advanced into the cupper 22. Accordingly, in some embodiments, the continuous sheet is generally stationary when the marks 26 are formed.

In some embodiments, the marker 24 is operable to form the marks 26 while the continuous sheet 14 is moving. For example, the marker 24 may be configured to move with the continuous sheet. In some embodiments, the marker can be pointed or steered such that the mark is formed as the continuous sheet is moving.

Additionally, or alternatively, in some embodiments the marker includes a laser that can be pointed to form a mark 26 while the sheet is moving. In some embodiments, the marker 24 includes a mirror or lens to steer a beam from the laser against the sheet 14 as the sheet moves.

Accordingly, in some embodiments, the marker 24 may form the mark 26 while the continuous sheet 14 is stationary, while the continuous sheet 14 is moving, or while the continuous sheet is both stationary and moving.

Figure 3A:
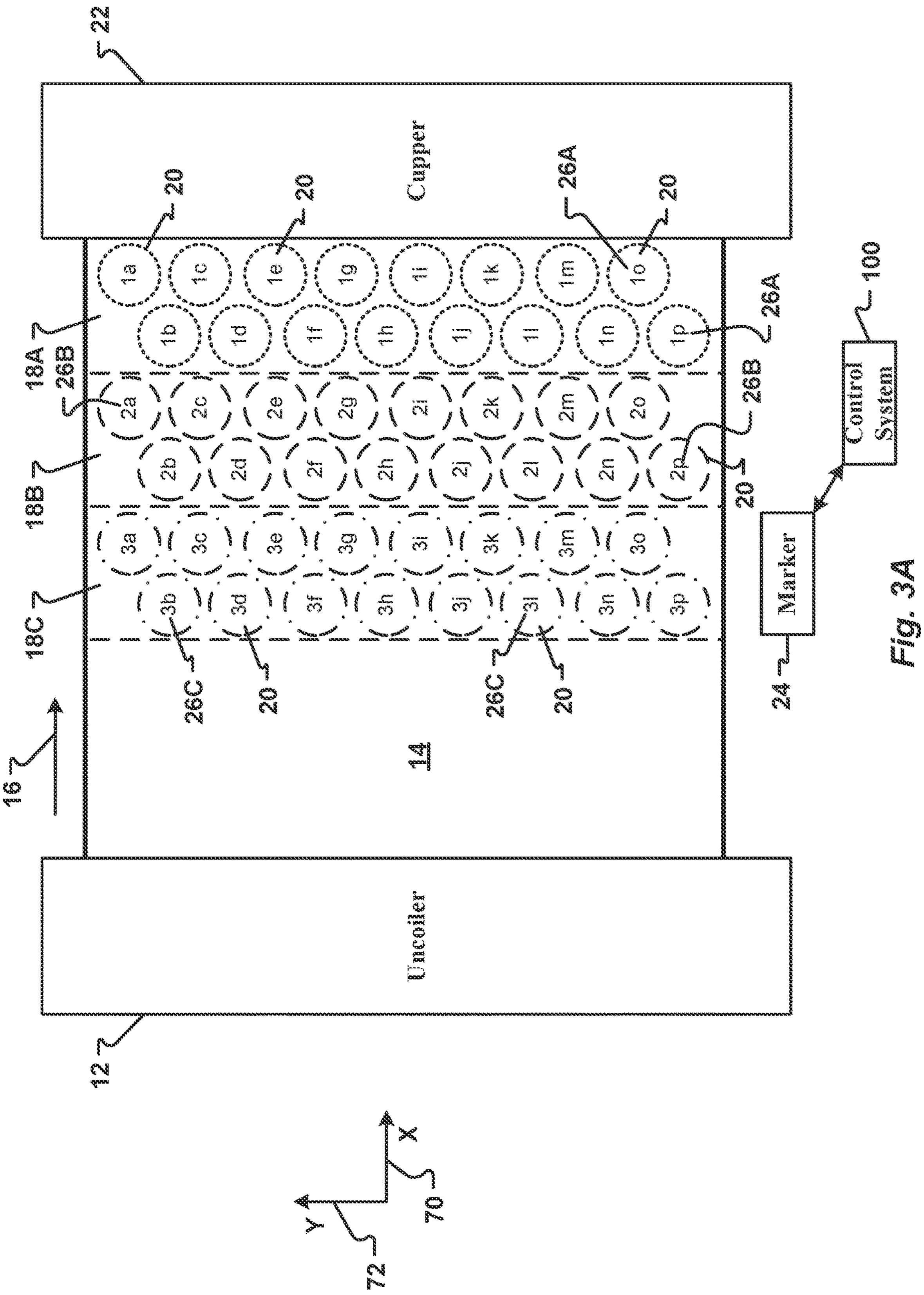
FIG. 3A is a bottom plan view of a portion of the production line of FIG. 2A.

Referring now to FIG. 3A, in one embodiment, all the marks 26A formed in a first portion 18A of the sheet are formed substantially simultaneously by the marker. Similarly, the marks 26B in the second portion 18B are formed substantially simultaneously. A third portion 18C of the sheet is generally illustrated as being aligned with the marker 24 for forming marks 26C.

The marks 26 are unique for each cup location 20 that will be cut from the sheet 14 by the cupper 22. In some embodiments, a control system 100 is in communication with the marker 24. The control system 100 may generate the marks that the marker forms on the sheet.

In some embodiments, each mark 26 comprises a unique code that identifies one container body 2. The mark may be a unique series of numbers. In some embodiments that mark is an alpha numeric code.

Optionally, each mark 26 may include one or more of: (a) a unique identifier for the container body; (b) a production date; (c) a production time; (d) a production location; (e) a production line identifier; (f) a batch number; (g) a shift identifier; (h) material specifications of the sheet (such as the type of aluminum alloy or other material in the sheet); (i) an identifier for the manufacturer of a coil from which the sheet is unwound; (j) an identifier or serial number of the coil; (k) a position of the mark on the sheet (such as an X, Y coordinate of the position of the mark); (l) a mass of the container body; and (m) a name of the filler or other customer that ordered the container body.

The marks 26 may comprise any combination of indicia, letters, numbers, symbols, spaces (or blank areas), and machine readable codes arranged in any order or orientation and of any size. In some embodiments, the marks 26 are data matrix codes, bar codes, quick response (QR) codes, and the like.

Figure 3B:
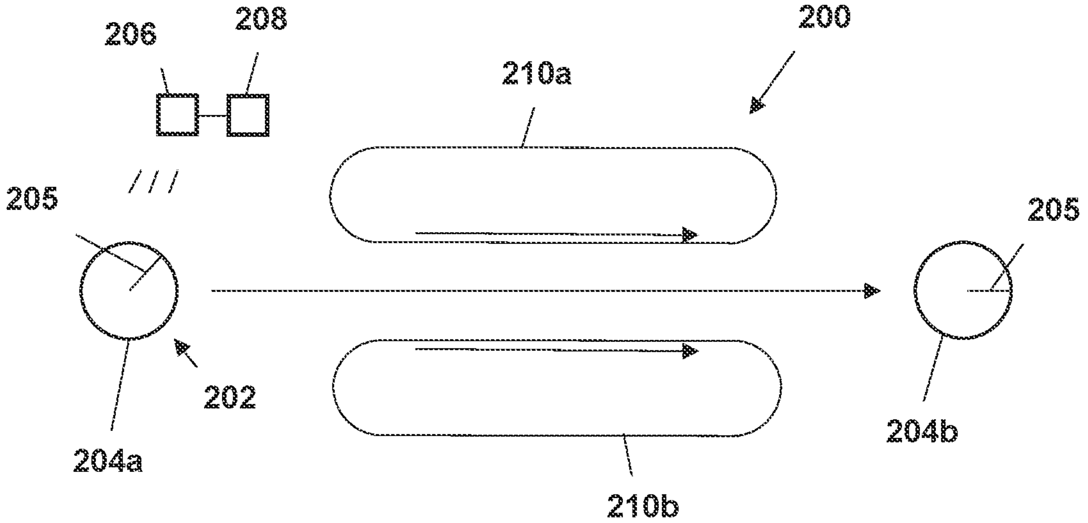
FIG. 3B is a top plan view of an orientation system comprising a belt according to the present disclosure.
Figure 3C:
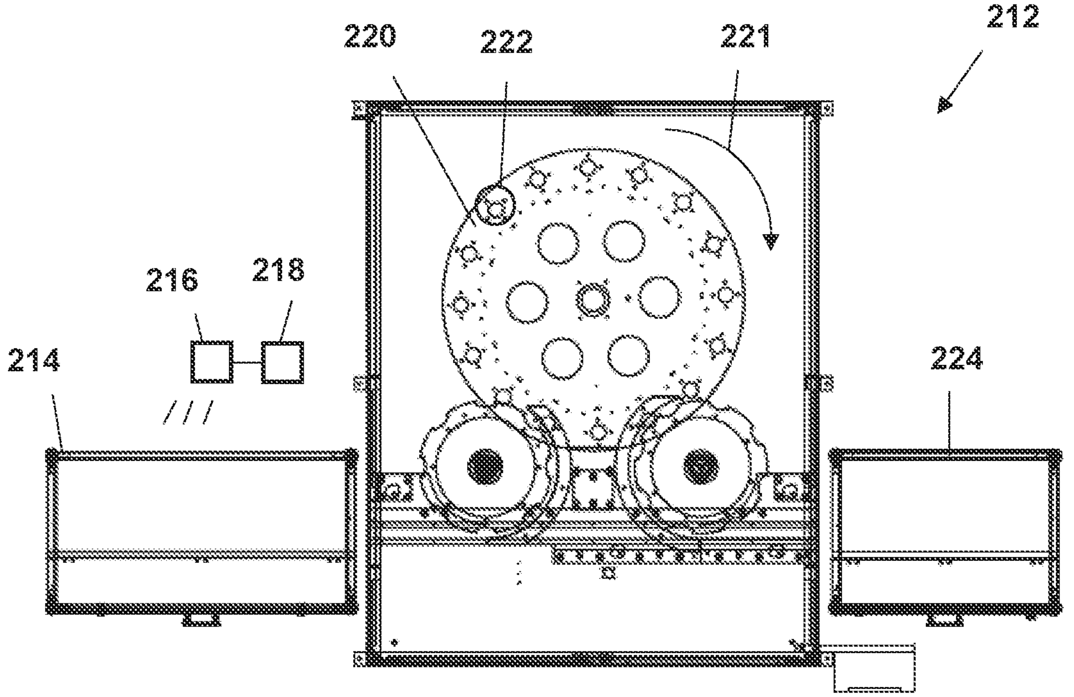
FIG. 3C is a top plan view of another orientation system comprising a rotatable plate according to the present disclosure.

Referring now to FIGS. 3B and 3C, examples of orientation systems are provided. FIG. 3B shows an orientation system 200 that comprises at least one belt, and FIG. 3C shows an orientation system 212 that comprises a rotating plate and servo. These orientation systems change the orientation of a metallic workpiece prior to marking to ensure that a mark is applied to the desired location on the metallic workpiece such that the mark does not interfere with other features on the metallic workpiece, or features that will be formed on the metallic workpiece. While the orientation systems in these figures show container bodies being oriented about a longitudinal axis for marking, it will be appreciated that orientation systems can reorient any metallic workpiece described herein in any direction.

FIG. 3B is a top plan view of an orientation system 200 that changes an orientation of a container body 202 from a first orientation 204*a* to a second orientation 204*b* prior to marking the container body 202, which ensures that marks are consistently applied to the same location on container bodies. This change in orientation 204*a*, 204*b* is shown by a reference line 205. Orientation in this embodiment means the orientation of a container body about a longitudinal or vertical axis. As container bodies 202 approach the orientation system 200, the container bodies 202 can be conveyed via a belt system, a cage system, etc. where the container bodies 202 are in random orientations. Yet, the container bodies 202 need to be in a particular orientation prior to marking.

In some embodiments, a camera 206 or other sensor detects a first orientation 204*a* of a container body 202 prior to the container body 202 contacting a pair of belts 210*a*, 210*b* of the orientation system 200. The camera 206 relays image data to an electronic device 208 (such as the control system 100) that determines the first orientation 204*a* of the container body 202. Specifically, the image of the incoming container body 202 is compared to a reference image to determine the first orientation 204*a*. For example, if the container body 202 has a mark or decoration on an outer surface, then the electronic device 208 compares the mark or decoration to one or more reference images to determine if the container body 202 is 5 degrees, 43 degrees, 163 degrees, etc. out of alignment from the proper, second orientation 204*b* for marking. Alternatively or in addition, a mark or decoration inside of the container body 202 is used to determine the orientation of the container body 202.

Once the first orientation 204*a* is determined, the electronic device 208 directs two belts 210*a*, 210*b* to change the orientation of the container body 202 from the first orientation 204*a* to a second orientation 204*b*. The belts 210*a*, 210*b* are positioned on either side of the container body 202, and the surface of each belt 210*a*, 210*b* that contacts an outer surface of the container body 202 generally moves in the same direction as the flow of container bodies 202. However, the belts 210*a*, 210*b* each vary their respective rotation speed to reorient a container body 202. For example, if the first orientation 204*a* of the container body 202 must be reoriented by 15 degrees in a clockwise direction to meet the second orientation 204*b*, then the first belt 210*a* rotates faster than the second belt 210*b*, on a relative basis, to rotate the container body 202 as the container body 202 passes by the belts 210*a*, 210*b*. When, incidentally, the first orientation 204*a* of the container body 202 is equal to the second orientation 204*a*, then the belts 210*a*, 210*b* idle allowing the container body 202 to pass by. In other words, the belts 210*a*, 210*b* rotate at the same speed to ensure that the container body 202 exits the belts 210*a*, 210*b* at the proper, second orientation 204*b*.

FIG. 3C shows another orientation system 212 where a servo changes the orientation of a container body. The orientation system 212 has an infeed 214 to take in container bodies that have random or undesirable orientations and has an outfeed 224 to convey container bodies with a uniform or desirable orientation. Like the orientation system 200 in FIG. 3B, the orientation system 212 in FIG. 3C has a camera 216 and an electronic device 218 (such as the control system 100) that determine the first or initial orientation of a container body as the container body passes through the infeed 214. The container body is then conveyed on, for example, a plate 220 or turntable that has at least one servo 222. The container body is held in place by a vacuum system on the servo 222. The vacuum system draws air through at least one opening to draw a container body against the servo 222. As the plate 220 moves in a rotational direction 221, the electronic device 218 directs the servo 222 to reorient the container body from the first orientation to a second orientation. The servo 222 can be any electromagnetic servomechanism device that converts electricity or electrical signals into physical motion, in this case, rotational motion. After rotating to the proper, second orientation, the vacuum system releases the container body, which exits the plate 220 and servo 222 and is conveyed away from the orientation system 212 at the outfeed 224. While a plate 220 is shown in FIG. 3C, other devices like a star wheel can be used to locate servos or other devices for reorienting container bodies.

Figure 3D:
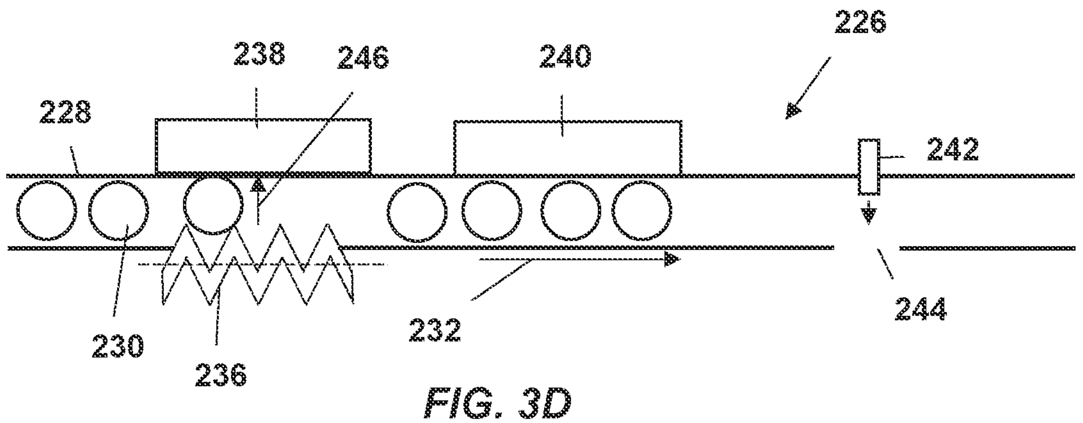
FIG. 3D is a top plan view of a stabilization system comprising a feed screw according to the present disclosure.
Figure 3E:
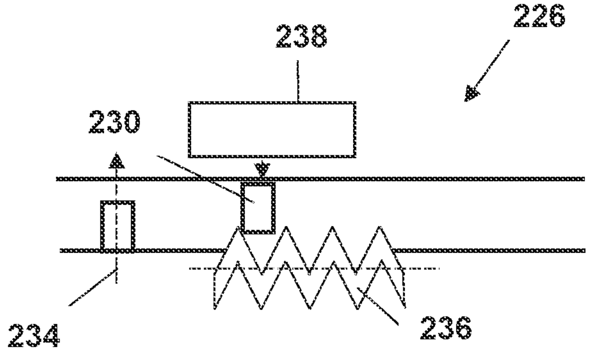
FIG. 3E is a side elevation view of the stabilization system in FIG. 3D.
Figure 3F:
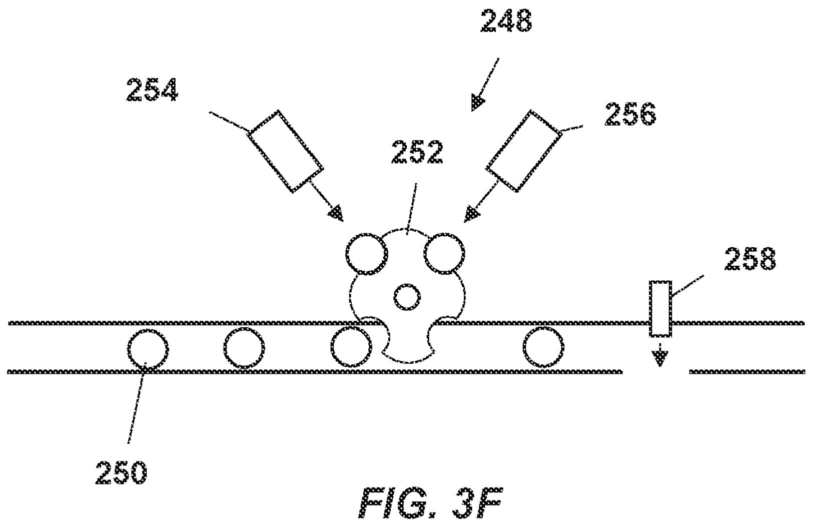
FIG. 3F is a top plan view of another stabilization system comprising a star wheel according to the present disclosure.
Figure 3G:
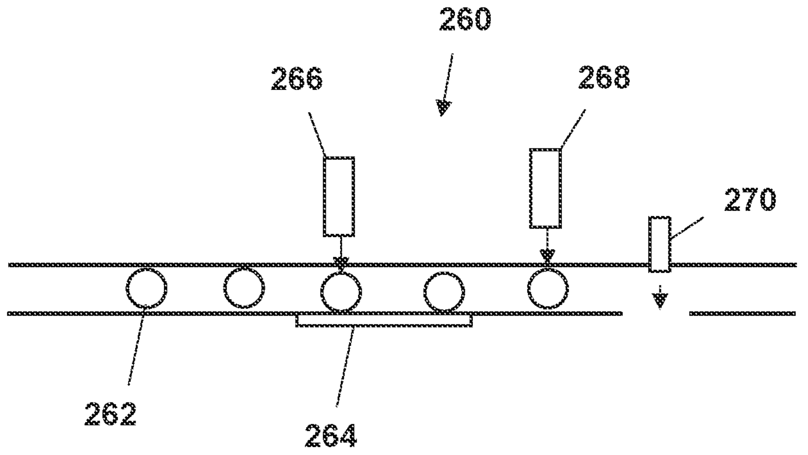
FIG. 3G is a side elevation view of a vacuum stabilization system according to the present disclosure.
Figure 3H:
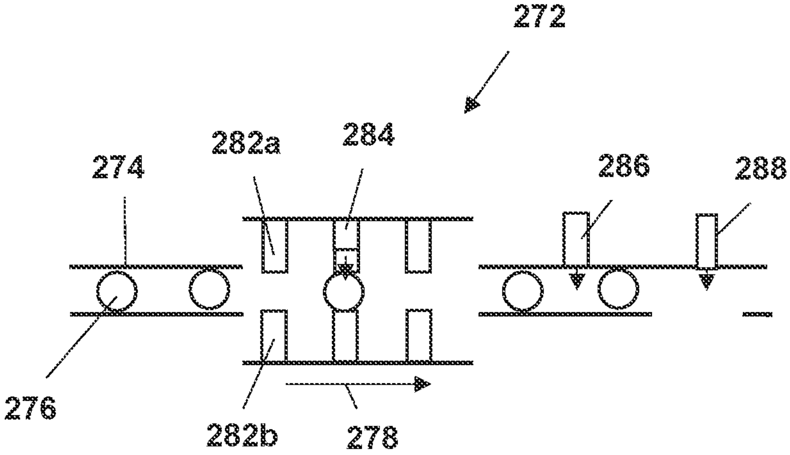
FIG. 3H is a top plan view of another stabilization system according to a present disclosure.
Figure 3I:
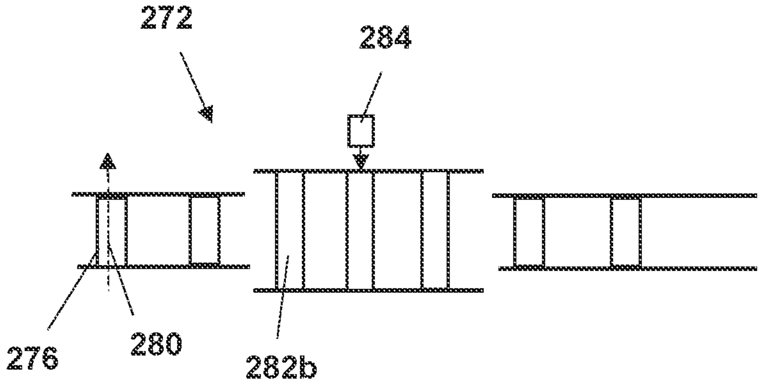
FIG. 3I is a side elevation view of the stabilization system of FIG. 3H.

Referring now to FIGS. 3D-3I, examples of stabilization systems are provided. FIGS. 3D and 3E show a stabilization system 226 that comprises a feed screw, FIG. 3F shows a stabilization system 248 that comprises a star wheel, FIG. 3G shows a stabilization system 260 that comprises a vacuum conveyance system, and FIGS. 3H and 3I show a stabilization system 272 with a side gripper system. The stabilization systems hold a metallic workpiece to reduce random movement such as jostling while the marker applies a mark to the metallic workpiece. The reduction in random movement results in a clearer and more legible mark that is more easily scanned in subsequent actions. While the stabilization systems in these figures show container bodies being stabilized for marking, it will be appreciated that stabilization systems can stabilize any metallic workpiece described herein.

FIGS. 3D and 3E show a stabilization system 226 that stabilizes a container body 230 to reduce random movement like jostling as a marker 238 applies a mark to the container body 230. The stabilization system 226 in this embodiment utilizes a feed screw 236 to receive and stabilize container bodies 230. Specifically, the container bodies 230 move in, for instance, a cage system 228 in a first direction 232. The longitudinal axes of the container bodies are oriented in a second direction 234 that is perpendicular to the first direction 232. The feed screw 236 in this embodiment has a threaded outer surface, and the feed screw 236 rotates about an axis oriented in the first direction 232. As a container body 230 enters the feed screw 236, the container body 230 is positioned between adjacent peaks or ridges of the threaded outer surface, the feed screw 236 at least partially displaces the container body 230 in a third direction 246 that is perpendicular to both the first and second directions 232, 234. The displacement braces the container body 230 against a wall or part of the cage system 228 to stabilize the container body 230 such that a marker 238 can apply a clear mark to the container body 230.

The wall 228 may be generally planar. The wall extends in the first direction 232 substantially parallel to the rotation axis of the feed screw. Optionally, the feed screw 236 may brace the container body 230 against a belt that moves at the same rate as the feed screw 236 to prevent the container body 230 from rotating as the container body 230 is stabilized.

After the mark is formed and the marked container body is discharged from the feed screw 236, a scanner 240 detects or takes a picture of the mark to determine if the mark meets predetermined standards. If not, an ejector 242 selectively rejects the container body 230 with the substandard mark out of a gap 244 in the cage system 228. In some embodiments the ejector 242 has an actuator that pushes rejected container bodies through the gap. Alternatively, the ejector 242 may comprise a pneumatic system that blows rejected container bodies through the gap.

FIG. 3F shows a stabilization system 248 that comprises a star wheel 252. Container bodies 250 flow in a conveyor (for example, a cage system) to a star wheel 252 that at least partially extends into the cage system to receive the container bodies 250. Once a container body 250 is positioned in a recess in the star wheel 252, any random movement is eliminated or at least significantly reduced. As the star wheel 252 rotates the container body 250, a marker applies a mark to the container body 250. Then a scanner 256 reads the mark to determine if the mark meets predetermined standards. Like the embodiment described in FIGS. 3D and 3E, an ejector 258 (such as a pneumatic system) selectively rejects a container body 250 with a substandard mark.

FIG. 3G shows a stabilization system 260 that comprises a vacuum conveyance system 264. Air is drawn through at least one aperture in the vacuum conveyance system 264 so that container bodies 262 passing through, for example, a cage system are drawn to the vacuum conveyance system 264. In some embodiments, air is drawn through a mesh belt as described herein. This reduces random movement such as jostling of the container bodies 262 and allows a marker 266 to apply a clear and legible mark on the container body 262. In addition, a scanner 268 reads and assesses the mark, and a pneumatic system 270 selectively rejects a container body 262 with a substandard mark. FIG. 3G generally illustrates the containers 262 oriented with their cylindrical sidewalls proximate to the vacuum conveyance system 264. However, in other embodiments, the stabilization system 260 is configured to process containers with either a closed end or an open end oriented proximate to the vacuum conveyance system.

FIGS. 3H and 3I show a stabilization system 272 that grips container bodies 276 to reduce movement such as jostling. Container bodies 276 are conveyed in a cage system 274 in a first direction 278, and the longitudinal axes of the container bodies 276 are oriented in a second direction 280 that is perpendicular to the first direction 278. As the container bodies 276 move into the stabilization system 272, protrusions **282*a*, 282*b* approach and contact the container bodies 276 from opposing sides to reduce movement. In some embodiments, the protrusions 282*a*, 282*b* contact a container body 276 at a lower location near the closed end as this part of the container body 276 is more rigid. This stabilization system 272 has the additional benefit of stabilizing container bodies individually where one pair of protrusions 282*a*, 282*b* contacts one container body 276. Thus, the protrusions 282*a*, 282*b* may contact a container body 276 in a different manner depending on the amount of movement of the container body 276. For instance, if a container body 276 has a large amount of movement, the protrusions 282*a*, 282*b* may contact the container body 276 at a slower speed to reduce the likelihood of damaging the container body 276. Then, a marker 284 applies a mark to the container body 276. The individual nature of the stabilization also improves the timing with respect to the marker 284 as the container body 276 is always exactly positioned between two protrusions 282*a*, 282*b*. As in other stabilization systems, a scanner 286 assesses the marks, and an ejector 288 selectively rejects a container body 276** with a substandard mark.

Figure 3J:
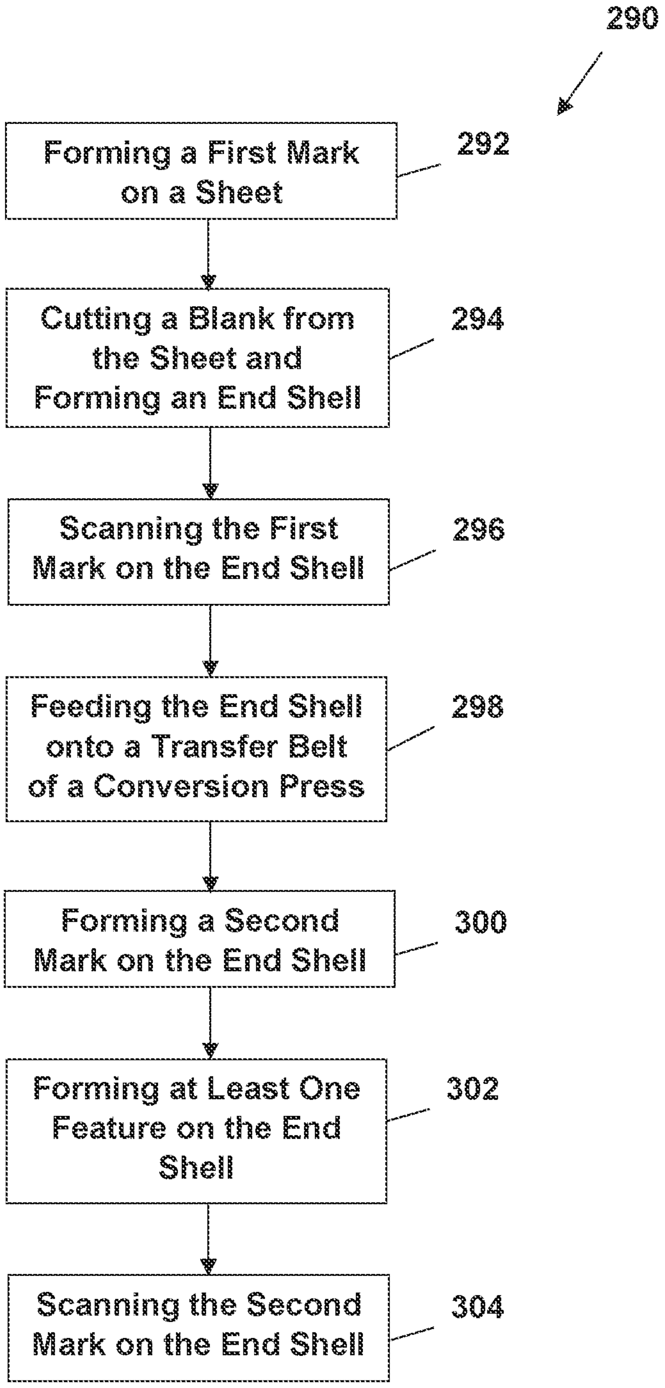
FIG. 3J is a flowchart for marking a product side and a public side of an end closure according to a present disclosure.
Figure 3K:
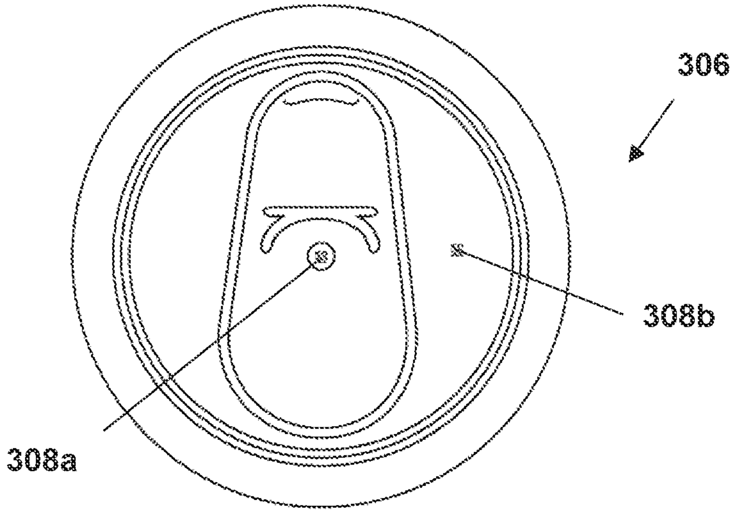
FIG. 3K is a bottom plan view of an end closure formed by the process shown in FIG. 3J.
Figure 3L:
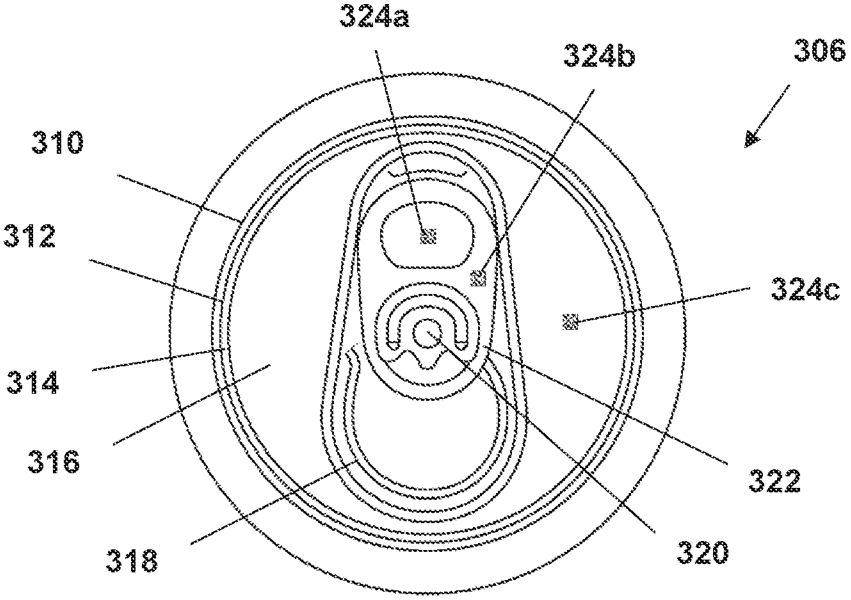
FIG. 3L is a top plan view of the end closure in FIG. 3K.

Referring now to FIGS. 3J and 3M-3P, examples of flowcharts for various marking systems and processes are provided. While these figures show an order of actions performed during a process, it will be appreciated that these actions can be performed in any order. Moreover, it will be appreciated that the marking action can be performed at any location in a production line of a manufacturing process from the coil to the finished product, as described herein, or even at subsequent locations and/or processes. FIG. 3J shows a flowchart 290 for marking a product side and a public side of an end shell, and an example of such an end shell is shown in FIGS. 3K and 3L. A mark on the product side of the end shell allows the end shell to be tracked and traced during the manufacturing process. The mark can be scanned at different points in a production line, and then the resulting data is compiled in one or more records at a database to determine any deficiencies in the sheet material, machines in the production line, etc.

To begin, unique first marks are formed 292 at known, blank locations on a product side of a metallic sheet. Accordingly, a record of a first mark and its location can be created in a database without the need to scan the first mark. This record can be created before, during, or after the actual formation of the first mark on the metallic sheet. Thus, the marks are mapped to the known, blank locations on the metallic sheet in the database.

The marker is an inkjet printer that applies a food grade ink to the sheet to form the first marks. In some embodiments, the marker is a continuous inkjet printer, or a drop on demand inkjet printer. It is not obvious to mark the product side of a metallic workpiece as this side of the metallic workpiece defines the interior of the resulting container that contacts contents consumed by humans, and disruptions to the product side can negatively impact the contents. For example, a marker that disrupts a protective liner or coating on the product side can render the liner or coating ineffective. Similarly, a marker that disrupts the metallic material can cause oxidation or other processes that render the contents unfit for human consumption. However, an inkjet printer can deposit a food grade ink that does not degrade the liner or coating or otherwise render the contents of the container unsafe for human consumption. While an inkjet printer is shown and described, it will be appreciated that the marker can be any type of marker described herein.

Blanks are then cut 294 from the sheet and formed into end shells by a shell press. Each end shell has a unique first mark on a product side. Next, the first mark of each end shell, or at least some of the end shells, is scanned 296 at a subsequent point in the production line to generate a scan event. This scan event is transmitted to a database 120, 124 via a network where the record associated with the first mark is updated to include the scan event. Subsequent scan events of the first marks are also transmitted to the database and stored in records where compiled data can be used for a subsequent analysis. For example, if blanks from one side across or along the width in the Y-dimension 72 of the metallic sheet result in substandard end shells, there may be an issue with a coiling process, an uncoiling process, an indexing process, etc. Similarly, if all blanks from a particular metallic sheet result in substandard end shells, there may be an issue with the quality of the material used to make the metallic sheet. At a shell press, unacceptably shallow features such as a panel or countersink are traced to a deficient component of the shell press like, for example, a pneumatic system for operating components of the shell press. Likewise, poor trimming on an outer edge of an end closure is traced to a deficient component in the production line.

At balancers, for instance A Balancers or B Balancers, end shells are arranged in stacks and the end shell at one end of the stack is exposed such that a mark on this end shell is read by a scanner. All end shells between this exposed end shell and the exposed end shell of the previous and/or subsequent scan are therefore known to the database. For instance, the end shells can be loaded into a stack in the same sequence that the end shells were marked. In another example, a scanner detects the marks on the end shells as the end shells are loaded into a stack, and therefore, the end shells between consecutive scans are known to the database. The entire stack of end shells can be dispositioned for a warehouse, positioned on a tray, loaded into a downstream process such as a conversion press, etc., and the database tracks and traces each end shell at these locations. For example, each conversion press in a production line may have four lanes, and a score tool may be improperly shimmed or machined which creates defective end closures that will not open. With a subsequent scanning and cataloging of end closures and marks in one or more records at the database, the defective tool is quickly identified and fixed.

At a filler, a customer optionally associates a mark on an end closure or container body with a particular seam head that filled a container. Therefore, data like carbonation level, product temperature, etc. is captured and associated with the mark. In addition, at a seamer, cameras inspect the shape of the sealant on the end closure that presses against an end of a container body to form the finished container. These cameras also detect one or more marks on the end closure or container body and associate, for instance, a lower amount of sealant with one or more end closures. An exemplary production line can have six liner machines with each liner machine having six guns that deposit the sealant on the end closures. Based on data collected in one or more records at a database, low sealant weights are tracked and traced to a liner machine and a particular gun, which is then fixed. Similar associations are optionally made at a pasteurizer with pasteurization and/or retort conditions and at a packager at the filler. These situations and analyses are exemplary in nature, and embodiments of the present disclosure encompass further uses and analyses of data from the marks and scan events.

After forming the first mark on the product side of the end shell, a second mark is formed on a public side of the end shell. The first mark is used for tracking and tracing during a manufacturing process, and the second mark is used for tracking and tracing a finished container after the manufacturing process such as at a filler, a distributor, a retainer, and/or an end user. As described herein, a user may scan the second mark with a camera of a mobile device to associate the second mark and a container with the mobile device to, for instance, incentive and track recycling of the container. These marks may not be exclusively used for these purposes. For instance, the second mark can be used for tracking and tracing during a manufacturing process too. The location of the first mark on the product side of the end shell can be useful as a mark on this location is less likely to interfere with forming actions applied to the public side of the end shell during the manufacturing process. Moreover, at some points during the manufacturing process such as during a conveyance the product side may be the only side readily visible, and thus, the first mark can be scanned to generate a scan event without a costly and complex operation to flip or reorient the end shell.

In some embodiments, the second mark is formed at a conversion press, including at the infeed of the conversion press. First, the end shell is fed 298 into a recess of a transfer belt of the conversion press. The transfer belt is made from a pliable material, and therefore, the end shell is held in the recess and kept in a constant orientation through the conversion press. This aspect of the transfer belt can also advantageously avoid the need for orientation and stabilization systems since the end shell is held in a constant orientation and stably. The transfer belt moves periodically because a dwell period is associated with the conversion press as the various tools of the conversion press interact with the end shell. In some embodiments, the dwell period is between 0.03 and 0.08 seconds. A marker such as a laser or an inkjet printer can be positioned at the infeed location of the conversion press where the laser forms 300 the second mark during the dwell period on a predetermined area of the public side of the end shell. The laser partially ablates material on the public side of the end shell to form the second mark, and the material can be a coating, a varnish, or even part of the end shell itself. However, it will be appreciated that the marker can be any type of marker described herein.

Optionally, the marker can be positioned at a tooling location inside the conversion press. In some embodiments, the marker is positioned between a first tooling location and a second tooling location inside the conversion press. Conversion presses have a sequence of tooling actions that convert the end shell into a complete end closure. In one process, the laser ablates material on the end shell. Then, a rivet is formed on the end shell, a score is formed, a deboss is formed, and the tab is staked to the rivet of the end shell. This process is exemplary and may include fewer or more actions in any order. In particular, the laser may ablate material before the forming actions as the end shell is cleaner at the start of the conversion press, but it will be appreciated that the laser or any marker can be positioned at any point in the conversion press. In some embodiments, the marker is between a first forming station and a second forming station of the conversion press.

The features formed by the conversion press on the end shell are located outside of the predetermined area with the second mark such that the second mark does not affect the features and vice versa. Again, the constant orientation of the end shell in the transfer belt means that the tools, including the marker, can form marks and features without the marks and features interfering with each other. Then, the second mark is subsequently scanned 304 in a production facility and/or beyond the production facility to facilitate track and trace systems with an end user to encourage, for instance, recycling, as described herein.

The first and second marks can be identical in some embodiments. Thus, the database 120, 124 that stores scan events immediately associates end user scan events of the second mark with production scan events of the first mark in a record at a database 120, 124. In other embodiments, the first and second marks are distinct, and the second mark is applied to a metallic workpiece later than the first mark. In some embodiments, the first mark is known to the database as the second mark is formed on a metallic workpiece. Therefore, the first and second marks are associated in a record at the database 120, 124. In other embodiments, the first mark is detected by a scanner to associate the first and second marks in a record at the database 120, 124. For example, a vacuum belt contacts and holds a public side of the end closure at the outfeed of the conversion press to convey the end closure, which exposes the first mark on the product side of the end closure. Thus, the second mark is applied to the public side of the end closure in the conversion press, then a camera detects the first mark on the end shell at the outfeed, and the first and second marks are associated with each other in a record at the database. Optionally, the first and second marks may not be associated with each other.

The second mark is formed on any portion of the public side of the end shell. In some embodiments, the second mark is formed on a tear panel portion of the central panel of the end closure. This second mark can be at least partially covered or obscured by the tab until the tab is actuated to deflect the tear panel. In various embodiments, the second mark is applied to a part of the tab itself. This may include the side of the tab facing the central panel or the side of the tab facing away from the central panel. The second mark can be applied to a tail end or a nose end of the tab. Further still, the second mark can be applied to a webbed portion at the tail end of the tab that replaces a fingerhole in the tab.

The benefits of forming a mark on both the product side and the public side are substantial and outweigh the additional costs associated with providing and maintaining two separate markers to mark each side. More specifically, providing a first mark on the product side is beneficial because the mark can be formed early in the end closure production process and then scanned before, during, or after subsequent operations to collect data on the production process and the equipment and tooling that performs the subsequent operations. Forming the second mark on the public side is beneficial because it permits the end closure and a container body it seals to be tracked. In this manner, the life of the end closure may be tracked from the beginning of the production process to end of life disposal of the end closure.

FIGS. 3K and 3L show a bottom plan view and a top plan view, respectively, of an end closure 306 formed from an end shell. FIG. 3K shows some exemplary first marks 308*a*, 308*b* at various locations on the end closure 306. The first mark can be formed at one or more of these locations, or other locations. The first mark is formed on the product side of an end shell, or on a sheet or workpiece that is formed into the end shell, and in some embodiments, the first mark is formed by a continuous inkjet printer with a food grade ink. Other marking techniques can interfere with a film or coating on the product side of the end closure 306 or otherwise interfere with the part of the end closure that contacts the contents of the resulting container. The first mark 308*a* can be located in the center of the end closure 306 for easy readability, or for example, the first mark 308*b* can be located off center to avoid interfering with a feature such as a rivet or a process at a station in the production line such as the conversion press. While a continuous inkjet printer is described herein, it will be appreciated that the marker that produces the first mark 308*a*, 308*b* can be any marker described herein.

FIG. 3L shows a public side of the end closure 306, which has a peripheral curl 310, a chuck wall 312, a countersink 314, and a central panel 316. A score line 318 defines a tear panel which is selectively opened to access the contents of the resulting container. A public side of the rivet 320 is shown with a tab 322 operably interconnected thereto. A user lifts a tail end of the tab 322 to drive a nose end of the tab 322 into the tear panel, which severs the score line 318. Various second marks 324*a*, 324*b*, 324*c* are depicted in several, exemplary locations. The second mark can be formed at one or more of these locations, or other locations. In some embodiments, a laser forms the second mark by partially ablating material, which is faster and/or more efficient than some other marker technologies. However, it will be appreciated that any marker described herein can form the second mark.

While first and second marks are described as located on the product side and public side, respectively, of an end closure, it will be appreciated that the present disclosure encompasses a variety of embodiments and combinations of marks and metallic workpieces. For instance, in some embodiments, a first mark is applied to a first workpiece and a second mark is applied to a second workpiece where the first and second workpieces are adapted to be joined together to form, at least in part, a finished container. For example, in some embodiments, a first mark is applied to a first metallic workpiece that is formed into a container body. The first mark can be applied to a product side or public side of the metallic workpiece, and the first mark is used to track and trace the metallic workpiece during the manufacturing process, and even at subsequent processes and locations. The second mark is applied to a public side of a second metallic workpiece that is formed into an end closure. This second mark can be used to track and trace the second metallic workpiece during the manufacturing process. Since the second mark is on a public side of the end closure, the second mark can be used to track and trace the finished container through end user applications.

At, for instance, a seamer, the first and second marks on the first and second metallic workpieces can be associated with each other. This can be accomplished by one or more scanners that read the first and second marks and transmit one or more scan events to a database. These scan events associated with the first and second marks update one or more existing records on the database that relate to the first and second marks. In some embodiments, the first metallic workpiece has a mark on a public side, which is used for track and tracing through end user applications, and the second metallic workpiece has a mark on a product side which is used for tracking and tracing through at least the end of the manufacturing process. In various embodiments, a given metallic workpiece has multiple marks, some on a public side, some on a product side. Then, other metallic workpieces have a single mark for tracking and tracing through the end of the manufacturing process. Thus, in an exemplary embodiment, the end closure has a first mark on a product side and a second mark on a public side, the tab has a mark, and the container body has a mark. These embodiments are exemplary in nature, and the present disclosure encompasses various combinations of marks on different sides of the metallic workpieces that form the finished container.

Figure 3M:
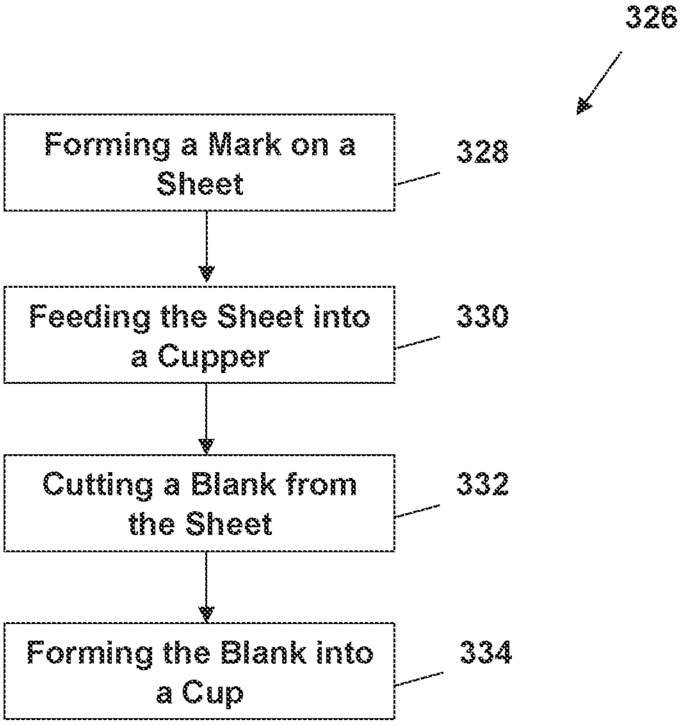
FIG. 3M is a flowchart for marking a metallic workpiece prior to a cupper according to a present disclosure.

FIG. 3M shows a process 326 for applying a mark to a sheet from which a cup and container body are formed. As described above with respect to FIG. 3J, a marker forms 328 a plurality of marks on a sheet of metallic material such as aluminum. In this embodiment, the marks are formed on a public side of the sheet at known, blank locations. In some embodiments, the marker is a laser that ablates part of the material of the sheet, but it will be appreciated that the marker can be any type of marker described herein. The sheet is incrementally fed 330 into a cupper that cuts 332 the blanks from the blank locations of the sheet. Dwell periods during which the sheet is substantially stationary are defined between each incremental movement of the sheet. The cupper cuts the blanks during a dwell period, and the laser can mark the sheet during the dwell period. Each resulting blank has a mark on a public side of the blank. Then, the blanks are formed 334 into a cup by the cupper, and the cups are formed into container bodies. The mark is located on a closed end of the cup and container body that serves as the dome of the resulting container because, as described herein, a mark on the dome avoids damage compared to other areas of the container.

Figure 3N:
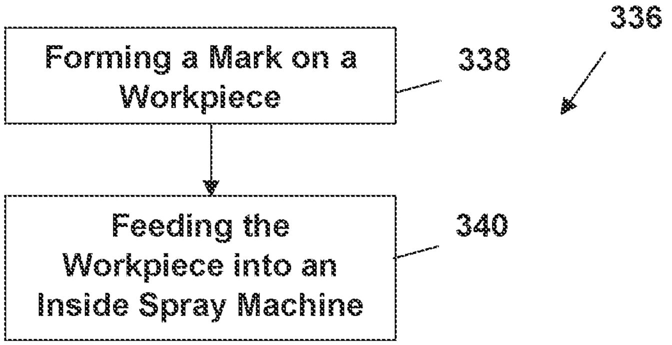
FIG. 3N is a flowchart for marking a container body prior to an inside spray machine according to a present disclosure.

FIG. 3N shows a process 336 where a metallic workpiece such as a container body is marked 338 with, for example, a continuous inkjet printer. However, it will be appreciated that the marker can be any type of marker described herein. The mark is formed on a closed end of the container body such as a dome, but it will be appreciated that the mark can be formed on any portion of the container body or metallic workpiece. Then, the container body is fed 340 into an inside spray machine where a coating is applied to an interior surface of the container body.

Figure 3O:
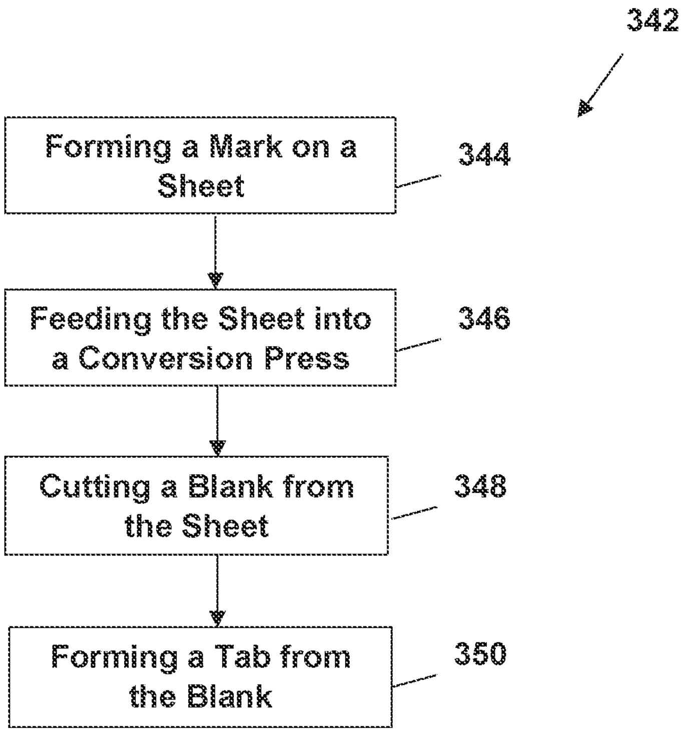
FIG. 3O is a flowchart for marking a tab prior to a conversion press according to a present disclosure.

FIG. 3O shows a process 342 where, again, a mark is formed 344 onto a sheet of metallic material such as aluminum. The marker is a laser that ablates part of the material of the sheet, in particular a coating of the sheet, but it will be appreciated that the marker can be any type of marker described herein. In this embodiment, the sheet with marks is fed 346 into a conversion press where the conversion press cuts 348 blanks from the sheet, and each blank has a mark. Then, the blanks are formed 350 into tabs. As discussed herein, the mark can be located on any portion of the completed tab.

Figure 3P:
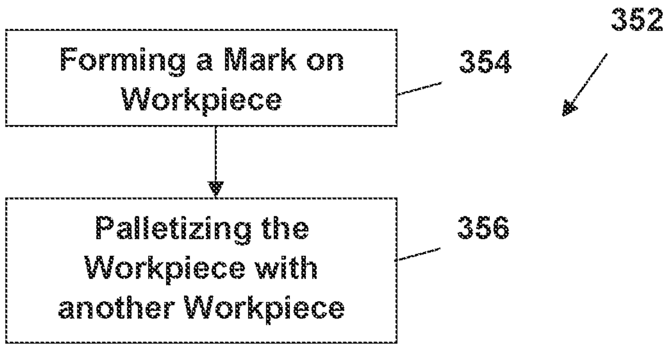
FIG. 3P is a flowchart for marking a container body prior to a palletizer according to a present disclosure.

FIG. 3P shows a process 352 where a metallic workpiece such as a container body is marked 354 with, for example, a continuous inkjet printer. However, it will be appreciated that the marker can be any type of marker described herein. The mark is formed on the body label portion of a container body, but it will be appreciated that the mark can be formed on any portion of the container body or metallic workpiece. Then, the marked container body is combined with at least one other container body at a palletizer 356 for shipping.

Figure 4A:
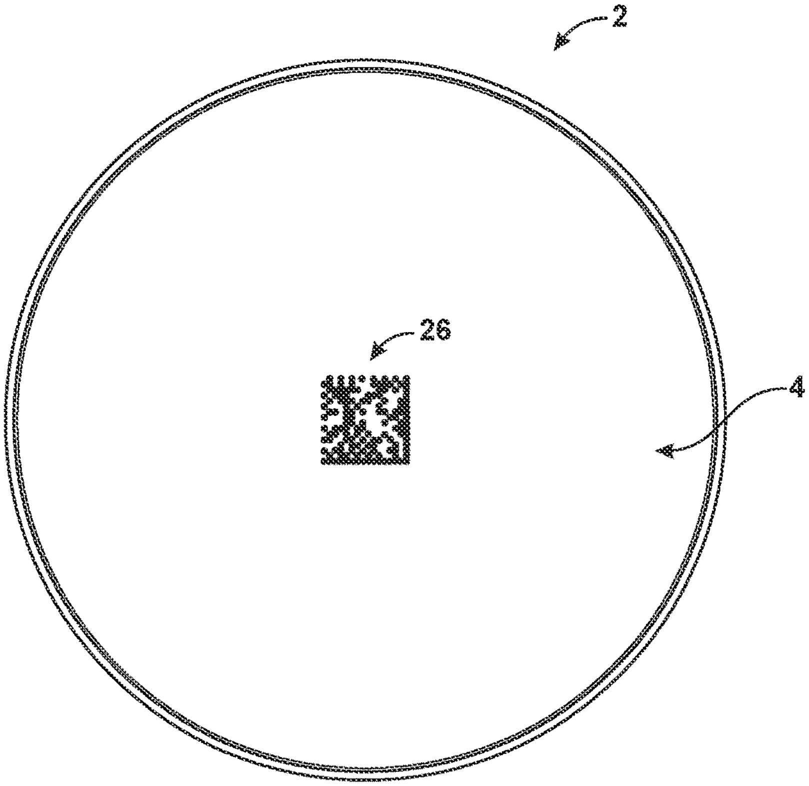
FIG. 4A illustrates a mark formed on a closed end of a container body according to embodiments of the present disclosure.
Figure 4B:
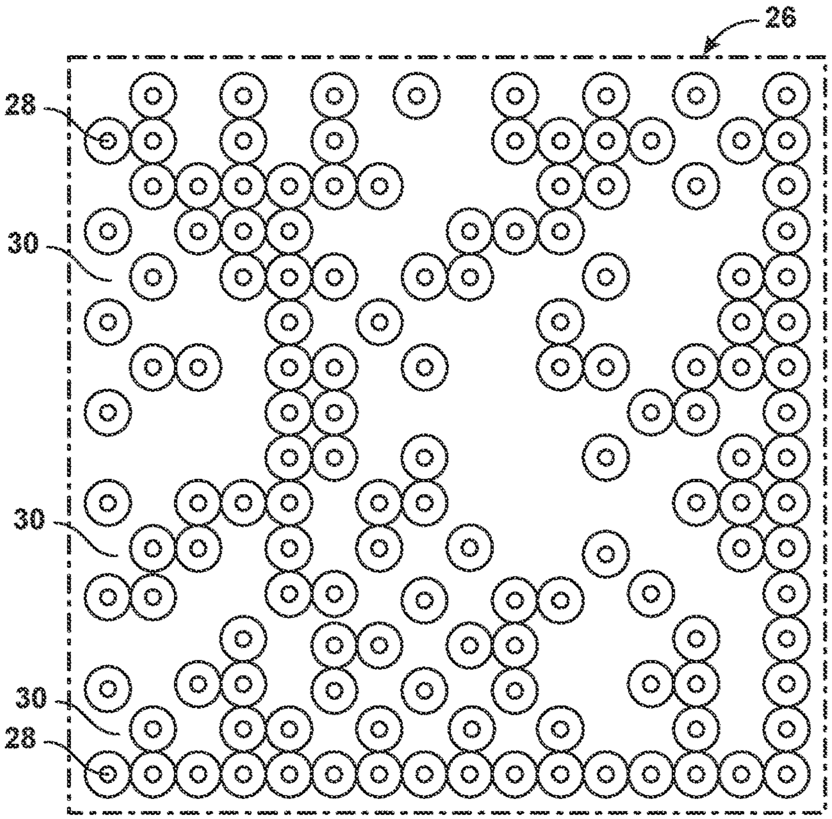
FIG. 4B is an enlarged illustration of the mark of FIG. 4A.

Referring now to FIGS. 4A, 4B, examples of a mark 26 formed according to embodiments of the present disclosure are generally illustrated. As shown in FIG. 4B, a mark 26 may comprise a series of indicia 28 and spaces 30. In the example of FIG. 4B, the indicia 28 are generally round "dots", or shapes that are generally circular. In some embodiments, the indicia and spaces are organized in rows and columns. However, marks 26 of other forms may be created by the marker 24 of the present disclosure.

The marker may use any suitable method known to those of skill in the art to form the mark 26 on the sheet. For example, the marker 24 may use an ink to form the mark 26. In some embodiments, the marker includes a digital print head, such as an inkjet print head, to form the mark 26. In some embodiments, the ink is an ultraviolet ink such that the mark is visible when exposed to an ultraviolet light.

Additionally, or alternatively, the marker may use an electrophotographic print system to form the mark. Accordingly, the mark 26 may be formed with a toner material.

In some embodiments, the mark 26 is formed by exposing a coating on the continuous sheet 14 to a light source. The coating may be a photo-reactive ink. Optionally, the light source is a laser. Accordingly, the mark may be formed by exposing selected portions of the photo-reactive ink to the laser.

Optionally, the marker 24 is operable to form the mark 26 without contacting the sheet 14. In some embodiments, the marker 24 contacts the sheet 14 to form the mark 26.

In some embodiments, the marker forms the mark 26 by etching or engraving the continuous sheet 14.

In some embodiments, the marker 24 includes at least one laser to mark at least one side of the sheet 14 before it is fed into the cupper 22. The marker 24 can have any number of lasers to form the marks 26. Optionally, the marker 24 has one laser to form marks 26 on one side of the sheet.

The marker 24 may have any known optical elements to one or more of steer, direct, focus, and move a beam from a laser. For example, the maker may have one or more mirrors, lenses, refractive elements, reflective elements, and beam splitters to form marks 26.

Optionally, the marker may include one laser configured to form two or more marks approximately simultaneously. For example, the marker may include the one laser and optical elements to split a beam from the laser into two or more beams. Further, the marker may have optical elements to direct the two or more beams to form two or more different marks that are each unique on the sheet.

In some embodiments, the marker includes at least one laser to form a mark 26 in each blank location 20 for each cup that will be formed during a stroke of the cupper. For example, in a production line 10 with a cupper 22 that forms 16 cups per stroke (such as generally illustrated in FIG. 3A), the marker may have 16 lasers to form 16 unique marks for each blank location 20 where a cup will be formed.

In some embodiments, the marker 24 includes a mirror and/or other optical elements to steer a beam from a laser. Optionally, each laser of the marker 24 may have at least one mirror or other optical element to steer its beam. Additionally, or alternatively, an actuator may be associated with a laser of the marker 24 to steer or point a beam from the laser.

The marker 24 is operable to form the marks 26 on the continuous sheet during each cycle of the continuous sheet into the cupper 22. In some embodiments, the marker 24 can form the marks at up to 400 cycles per minute. In some embodiments, the marker 24 can form a mark 26 in between about 0.001 seconds to about 0.5 seconds. Additionally, or alternatively, the marker 24 may form each mark in from about 0.01 second to about 0.4 seconds. Optionally, the marker 24 can form a mark in approximately 0.16 seconds. In other embodiments, the marker forms the marks in less than about 0.3 seconds.

Any suitable laser known to those of skill in the art may be used with the marker 24 of the present disclosure. In embodiments the marker 24 may have one or more Nd:YAG lasers (also known as neodymium-doped yttrium aluminum garnet lasers). In various embodiments, the laser is a 10.6 or 9.3 μm $CO_2$ laser or a neodymium-doped yttrium aluminum garnet ($Nd{:}Y_3Al_5O_{12}$) laser.

In further embodiments, the laser is a fiber laser where the active gain medium is an optical fiber doped with rare-earth elements such as erbium, ytterbium, neodymium, dysprosium, praseodymium, thulium and/or holmium.

In some embodiments, the laser has a wavelength of approximately 1.064 μm. Additionally, or alternatively, the laser may have an output of from about 40 Watts to about 140 Watts of applied power, with about 80% of such power being delivered to a target area of the sheet 14.

In some embodiments, the laser provides a pulsed or intermittent form of laser light. For example, the laser optionally provides pulses at from approximately 3,000 Hz to approximately 65,000 Hz. Preferably the output laser light pulses are relatively stable in the sense that there is relatively little variation in power from one pulse to the next.

In some embodiments, the laser has sufficient power to alter the metallic material of the continuous sheet 14. More specifically, the marker 24 includes any laser with sufficient power to visibly alter the continuous sheet 14 to form a mark 26. In some embodiment, the laser of the marker oxidizes the material of the continuous sheet. The laser may vaporize or ablate the material of the continuous sheet 14 sufficiently to produce a visible spot or mark indicia 28, such as a "dot," circle, or other mark. For example, the laser may partially melt the material of the sheet 14. Alternatively, the laser may vaporize or alter a coating on the sheet 14.

In some embodiments, the laser has sufficient power to form a mark 26 recessed into the continuous sheet 14 by a predetermined amount. Specifically, in some embodiments, the laser of the marker 24 can form a mark 26 with a depth of up to approximately 0.002 inches (0.00508 cm).

The control system 100 may store information about the mark 26 for each container body in a database. The information may include data about the location of each mark formed on the sheet 14. For example, the coordinates of each mark 26 formed on the sheet 14 can be stored by the control system 100 in a memory, such as in record 140 of a database 120, 124. Any suitable system for describing the location of the marks may be used. In some embodiments, the position of each mark may be described by a position along a length of the sheet (corresponding to an X-axis or X-dimension 70) and a width of the sheet (corresponding to a Y-axis or Y-dimension 72). In this manner, data about the uniformity of the sheet 14 along its length and across its width may be collected as container bodies are formed by the production line. This data may provide useful information about the supplier of the sheet, variations in the composition of the sheet, and variations in the thickness of the sheet 14. The record associated with the mark may also include a field to store a chemical makeup of the metallic material of a coil from which the container body was formed, a production date of the coil, and a location of the manufacturing facility that produced the coil.

Moreover, collecting the position of each mark formed on the sheet facilitates identifying which die set of the cupper made each cup. In this manner, the performance of each die set of the cupper can be monitored and compared to other die sets of the cupper.

Referring again to FIG. 2A, in some embodiments, after the marker 24 forms the marks 26 on the sheet 14 and the cupper 22 creates the cups, the cups are transported by a conveyor 32 to a bodymaker 36. The production line 10 may have two or more bodymakers 36. Some production lines have seven or more bodymakers Optionally, a sensor 34A is positioned at an infeed to each of the bodymakers 36. The infeed beneficially arranges the container bodies in a single file exposing the marks 26 to scanning by a sensor. Additionally, or alternatively, a sensor 34A may be positioned on an outfeed end of the bodymakers 36.

In some embodiments, a first sensor is positioned up line (or at an in-feed) of each piece of equipment that handles or performs an operation on the container body. Additionally, or alternatively, a second sensor may be positioned down line (or at an out-feed) of each piece of equipment. Optionally, some pieces of equipment may have a sensor positioned at both up line and down line of the equipment.

Each sensor 34 is operable to read the mark on each cup fed into a bodymaker 36. Any suitable sensor known to those of skill in the art may be used with the production line 10 of the present disclosure.

The production line 10 may have any number of sensors 34 to scan marks at any location of a container body. Moreover, the production line may have two or more types of sensors, or sensors with different capabilities.

For example, some sensors 34 may be positioned and configured to read a mark 26 on an exterior surface of a container body 2. Accordingly, in some embodiments sensors 34 positioned at an infeed or an out feed of a bodymaker 36, a basecoater 42, a decorator 46, an internal coater 50, a necking station 54, a flanger 56 and other locations where container bodies are transported in a single line may have a sensor adapted to read a mark on the exterior surface of the container bodies.

At least one sensor may be positioned and configured to read a mark on an interior surface of a container body. In this manner, container bodies transported on a mass conveyor may have their marks read by suitable sensor. For example, sensors operable to scan marks on interior surfaces of container bodies may be positioned to scan marks on container bodies transported into, through, or out of a dry-off oven 40, a basecoat oven 44 or an internal bake oven 52.

The sensor 34 may be an optical sensor. In some embodiments, the sensor 34 is a camera. Optionally, an emitter of electromatic waves (such as a light) may be associated with a sensor. In some embodiments, the sensor 34 includes a laser or projects a beam similar to a barcode reader.

In other embodiments, the sensor 34 is an infrared sensor which can detect the contrast in emissivity between the metal material of a container body and a mark 26. Specifically, the mark 26 will change the metal material of the sheet, and thus change the emissivity compared to the emissivity of the metal material without the mark such that an IR sensor can detect the contrast in emissivity. In this manner, the IR sensor 34 can read the mark 26 on the container body.

The sensor 34 is in communication with the control system 100 and can transmit the mark 26 of each cup fed into a bodymaker 36 to the control system. The sensor 34 may also transmit a timestamp associated with the scanning of each mark 26 detected by the sensor. In this manner, the progress of a cup through the production line 10 is recorded as well as the route of the cup (i.e., which bodymaker 36 or other piece of equipment in the production line performed an operation on the cup) through the production line is monitored. The information collected by the sensors 34 is useful to monitor the performance of each bodymaker. The timestamp may also be used to compare the performance of one branch of the conveyor 32 (or route of the production line) to another branch or route.

Optionally, a sensor 34 may be associated with a single-line conveyor 32 that transports container bodies in one row or lane. In some embodiments, container bodies are transported by the single-line conveyor with their closed ends facing away from the single-line conveyor. One example of a single-line conveyor is a pin-chain downstream from a decorator 46.

Additionally, or alternatively, a sensor 34 can be associated with a mass conveyor that transports container bodies in multiple rows or lanes. Some mass conveyors transport the container bodies with their closed ends facing away from the mass conveyor. Other mass conveyors transport the container bodies with their closed ends facing toward the mass conveyor. Examples of mass conveyors include the conveyors 32 that transport container bodies through a washer 38, through a dry-off oven 40, and through an internal bake oven 52. Forming a mark 26 on a portion of a sheet that will define an interior surface of a container body may be beneficial for scanning by a sensor when the container body is positioned on a mass conveyor.

In some embodiments, a sensor 34 is associated with each conveyor 32 that transports a container body between each piece of equipment and between each process of the production line 10.

Bodymakers 36 use a punch on a ram to push the cups formed by the cupper 22 through a series of tooling dies that redraw and iron the cups into container bodies. In some production lines, such as for the production of beverage containers and beverage bottles, the bodymakers 36 form a dome on the closed ends of the container bodies. In some embodiments, the bodymakers 36 do not form a dome, for example, when the container body will be formed into a tapered cup. Regardless, in some embodiments, the mark 26 will be positioned on an exterior surface of the closed end 4 and substantially centered on the closed end as generally illustrated in FIG. 4A.

The open ends of the container bodies are cut to a uniform height by trimmers. In some embodiments, a trimmer is associated with each bodymaker 36.

Container bodies from several bodymakers are then transported by a single conveyor 32 to a washer 38. A first oven 40, known as a "dry-off oven", then dries the container bodies.

Optionally, some container bodies are transported to a basecoater 42 which applies an exterior basecoat. The basecoat is sometimes required to provide a base color before subsequent decorations or coatings are applied.

Optionally, a sensor 34B is positioned at an infeed to the basecoater 42. Alternatively, the sensor may be positioned at an outfeed of the basecoater. The sensor is operable to read the mark on each cup fed into the basecoater 42 and record a timestamp for when each mark is read. The sensor 34 is the same as or similar to the sensor 34A proximate to the bodymaker.

The container bodies are then conveyed through a second oven 44 or "basecoat oven" where the basecoat is cured. The production line 10 may have two or more basecoat ovens. If so, a sensor 34 may be positioned upstream of each basecoat oven to read the marks 26 of the container bodies fed into each basecoat oven 44.

A sensor 34C is also positioned to scan the marks 26 of container bodies transported by a conveyor 32 past the basecoater 42.

The container bodies are then transported by one or more conveyors 32 to decorators 46. A metallic container production line may have two or more decorators 46. The exterior sidewalls of the container bodies are decorated with up to six colors of ink by the decorators.

The decorators may optionally include an overvarnish unit. The overvarnish unit can apply a film of lacquer over the entire decoration to protect it. In some embodiments, bottom coaters associated with the decorators 46 may optionally apply a coating of lacquer to the rim around the bottom of the container bodies.

In some embodiments, a sensor 34D is positioned upline of each decorator 46. Additionally, or alternatively, a sensor may be positioned at an outfeed of each decorator. In this manner, the identity of each container body (based on its mark 26) fed into the decorator 46 can be collected. The sensor 34D is the same as or similar to the sensor 34A proximate to the bodymaker.

The inks and lacquer coatings of the container bodies are cured by a third oven 48 known as a "deco oven". The deco oven 48 is also known as a "pin oven" because container bodies are typically transported through the oven on a chain with pins. The pins are placed into the open ends of the container bodies to transport them without touching the exterior surfaces of the container bodies.

Some production lines have one deco oven. Alternatively, a deco oven 48 is associated with each decorator 46. A sensor 34E of the present disclosure may be positioned at an infeed or an outfeed of each deco oven 48.

After the decoration and other exterior coatings are cured, the container bodies may return to a single conveyor 32. The container bodies are transported to one or more internal coaters 50 to receive an internal coating, such as a lacquer, to protect product integrity.

A sensor 34F may be associated with each internal coater 50. The sensor 34F may be the same as or similar to other sensors 34 described herein. Moreover, the sensors 34F may be positioned up-line or down-line of the internal coaters 50.

The internal coating is subsequently cured as the container bodies pass through a fourth oven 52 known as an "internal coater oven" or "internal bake oven" (IBO). The container bodies may be positioned on a single conveyor 32 for transport through the internal bake oven 52.

Optionally, a sensor 34G is positioned up-line of the internal bake oven 52 as generally illustrated in FIG. 2A. The sensor 34G may be the same as or similar to other sensors described herein and is operable to read the mark 26 of each container body on the conveyor 32.

In some embodiments, the open ends of the container bodies receive a thin coat of a lubricant from a waxer in preparation for necking. However, when the production line is producing tapered cups, no necking operation is performed on the container bodies.

When a neck will be formed on the container bodies, a series of die neckers 54 (or "necking stations") include tooling to sequentially reshape open ends of the container bodies and reduce the initial diameter down to a predetermined diameter. Although only one die necker 54 is illustrated in FIG. 2A, the production line may have six or more die neckers arranged in series that progressively reduce the diameter of necks of the container bodies. In some production lines, fourteen or more necking stations are used to form necks of beverage containers. Production lines for metallic bottle may include thirty or more necking stations 54.

The production line of the present disclosure may optionally include two or more sets of necking stations 54 arranged in parallel. Accordingly, a sensor 34H such as described herein may be associated with each of the two or more sets of necking stations 54 to read the mark of each container body processed by each set of neckers.

After necking, in some embodiments a conveyor 32 transports the container bodies to one or more flangers 56. The open ends of the container bodies are rolled back by the flanger 56 to form a lip or flange. The flange is used to attach an end closure after the container body is filled with a product. A sensor 34I may be associated with the flanger. The sensor 34I may be positioned upstream or downstream of the flanger. If the production line has more than one flanger 56 arranged in parallel, a sensor may be associated with each flanger.

The container bodies are tested and inspected at inspection stations 57 at one or more locations of the production line 10. Optionally, although only two inspection stations 57 are illustrated in FIG. 2A, the production line 10 may include an inspection station 57 up line or down line of each piece of equipment that handles or performs an operation on the container body. In some embodiments, an inspection station 57 is positioned at a location downstream from the flanger 56.

The inspection stations 57 check container bodies for defects, damage or contamination. A variety of sensors known to those of skill in the art may be associated with the inspection stations. The sensors may include optical or visual systems (such as a camera). The camera may be a high definition camera, such as a camera with a sensor with greater than 5 megapixels. In some embodiments, the visual system may include a high speed or high "frame-rate" camera. One or more lights may be associated with the sensor to provide contrast.

The inspection stations may also include equipment to test the container bodies for damage and holes. In some embodiments, the inspect station may include a light tester to identify holes in a container body. The inspection station may also apply a vacuum or pressure to the container body.

In some embodiments a sensor 34K to detect a mark 26 is associated with each inspection location. In this manner, the mark 26 for each container body that is found to be deficient and ejected from the production line 10 may be recorded by the sensor 34K. Information collected by the sensor 34K may be useful for determining the cause of a deficiency and for tracing the deficiency to a piece of equipment in the production line or a material deficiency of the sheet 14 from which the container body is formed.

The inspection station 57 may be in communication with the control system 100 and one or more databases 120/124. The inspection station 57 may retrieve information from a record 140 associated with a container body 2 stored in a database 120/124 after the sensor 34K reads the mark 26 on the container body.

The inspection station 57 may identify a container body for inspection based on information from the record 140. For example, the inspection station 57 may receive an instruction to identify a container body that was processed by a particular bodymaker (such as bodymaker 36C) during a predetermined period, such as once per hour (or during some other predefined interval). Accordingly, in this example, each hour the inspection station 57 may identify (and separate from the production line) a container body processed by the bodymaker 36C. Specifically, the inspection station 57 may scan marks 26 on container bodies, retrieve records 140 associated with the marks from a database 120/124, identify a record with a field indicating a container body was processed by bodymaker 36C, and then separate the container body from the production line. The container body may then be inspected to evaluate performance of the bodymaker 36C.

Similarly, in some embodiments, the inspection station 57 can identify container bodies processed by any piece of equipment 22, 32, 36, 38, 40, 42, 44, 46, 48, 50, 52, 54, or 56. Accordingly, an inspection station 57 may receive an instruction to identify a container body processed by a second internal coater 50B. However, as will be appreciated by one of skill in the art, downstream from the internal coaters 50A, 50B, 50C the container bodies are combined on a mass conveyor 32 and transported through an internal bake oven 52. Accordingly, the inspection station 57 may be positioned downline of the internal bake oven 52 and identify a container body processed by internal coater 50B after the container body exits the internal bake oven 52 based on the mark 26 formed on the container body. The inspection station may then separate a sample container body from the production line for a routine quality inspection of the operation of the internal coater 50B. In this manner, the inspection station 57 can identify and select a container body processed by any piece of equipment for routine or on-demand inspection to determine performance of the piece of equipment.

In some embodiments, a production line 10 may include a sorter 58A operable to direct container bodies to different routes or locations (such as onto one of two or more conveyors 32A, 32B). The sorter 58A may be located at any position of the production line. In some embodiments, the sorter 58A is positioned downstream of the cupper 22 and upstream of any other equipment of the production line. The production line may have two or more sorters. At least one sorter is optionally positioned upstream of a palletizer 59.

The sorter may direct container bodies to different routes 32A, 32B based on a quality parameter. For example, a container body that meets a manufacturing parameter could be directed to a first route or conveyor 32A. In contrast, a container body that does not meet a manufacturing parameter may be directed to a second route 32B. In some embodiments, the sorter 58A may be associated with an inspection system 57. In this embodiment, the second route may be to an ejector.

The sorter may include a sensor 34K to read marks on the container bodies. Accordingly, each container body processed by the sorter 58A may be identified when its mark 26 is scanned by the sensor 34K. In this manner, a route selected by the sorter 58A for each container body may be stored in a database 120/124 in a record 140 associated with the container body when its mark 26 is scanned.

In some embodiments, the sorter 58A may sort the container bodies based on information retrieved from the record 140 associated with the container body 2. For example, the sorter may direct a container body to a route based on equipment that processed the container body or performed an operation on it. Additionally, the sorter 58A could select a route for the container body based on a manufacturer of the sheet 14, a serial number or other identifier of the coil of the sheet, or a composition of the metallic material of the sheet.

The optional sorter 58A may also be used to separate container bodies decorated by a first decorator 46A of the production line from container bodies decorated by a second decorator 46B of the production line. In this manner, the first decorator may form a first decoration and the second decorator may form a second decoration different from the first decoration. Thereafter, the container bodies 2 with the first decoration may be separated from the container bodies with the second decoration based on information retrieved from records 140 associated with unique marks 26 formed on each container body 2.

Sorting container bodies 2 based on a decorator 46 that formed a decoration on a container body is beneficial because it facilitates producing small production runs of container bodies with unique decorations. As one of skill in the art will appreciate, in order to print a different image or decoration on a plurality of container bodies, a new set of printing plates must be installed on the plate cylinder of the decorator 46 resulting in downtime and decreased efficiency of a prior art production line. Because only one image can be printed without changing the printing plates, it is economically challenging to produce small batches of decorated container bodies with different images. However, by using a sorter 58A that can identify each container body 2 by scanning its mark 26, the sorter 58A may retrieve a record 140 for the container body 2 from a database to determine which decorator 46 handled the container body. The record may also identify which decoration is on the container body and a client that ordered the decoration.

The production line 10 may have a first decorator 46A that has a first set of printing plates to produce a first decoration on the container bodies. A second decorator 46B may be configured with a second set of printing plates to produce a second decoration on other container bodies. The second decorator may be running a small batch of container bodies for a particular distributor or filler.

With the tracking and tracing facilitated by the unique marks 26 of the present disclosure, both decorators 46A, 46B may be run simultaneously without stopping the production line 10. When a predetermined number of container bodies are decorated with the second decoration by the second decorator 46B, it can be stopped and a new set of printing plates installed on the second decorator 46B. The second decorator 46B may then be equipped with a first set of printing plates to decorate container bodies with the first decoration (or a third set of printing plates may be installed and the second decorator 46B can form a third decoration on container bodies). While the second decorator 46B is stopped, the first decorator 46A can continue decorating container bodies.

The container bodies with the first and second decorations may (and likely will) be mingled together on a mass conveyor (for example, for transport through the internal bake oven 52 or for transport to the necker stations 54). However, the sorter 58A can separate container bodies 2 with the first decoration from container bodies with the second decoration after scanning their marks 26 and retrieving information from records 140 in a database. Once separated, the container bodies may be sent to one of two or more conveyors 32A, 32B and to different palletizers 59A, 59B.

A conveyor 32A, 32B transports the container bodies to a palletizer 59A, 59B where they are placed in pallets. Another sensor 34J may be associated with the palletizer. Accordingly, the mark 26 on each container body loaded into a pallet can be read and associated with the pallet. Pallets of empty container bodies may then be placed in storage 60. The container bodies may subsequently be shipped to a filler 62.

Occasionally, container bodies 2 on a pallet may need to be resorted or inspected. For example, production equipment may be found to be malfunctioning after processing a plurality of container bodies. The container bodies that were handled by the faulty equipment may need to be identified, inspected, and/or discarded. In a prior art production line, container bodies already in pallets in storage 60 may only be sorted manually. As can be appreciated by one of skill in the art, this is a time consuming and expensive process.

The unique mark 26 formed on each container body 2 according to embodiments of the present disclosure facilitates a more efficient method of resorting container bodies. In some embodiments, the production line includes a de-palletizer 61 as generally illustrated in FIG. 2A. Pallets of container bodies 2 that includes the marks 26 described herein can be transported from storage 60 to the de-palletizer 61. Specifically, a pallet may have a container body 2 with a mark 26 that must be separated from other container bodies in the pallet. For example, a record 140 in a database that is associated with the mark 26 may have a field that indicates the container body 2 was processed by a piece of equipment (or received a coating) that was subsequently found to be deficient. Accordingly, the container body 2 must be found and inspected.

A pallet with the container body 2 may be located in storage and transported to a de-palletizer 61. After being removed from the pallet, the container bodies 2 can be transported back to the optional sorter 58A by a conveyor 32. The sorter 58A may then use a sensor 34K to scan a mark 26 on each container body 2 and retrieve a record 140 for each container body from a database 120/124 using the unique mark 26. The sorter 58A may then separate container bodies handled by a particular piece of equipment based on data within the record.

Figure 2B:
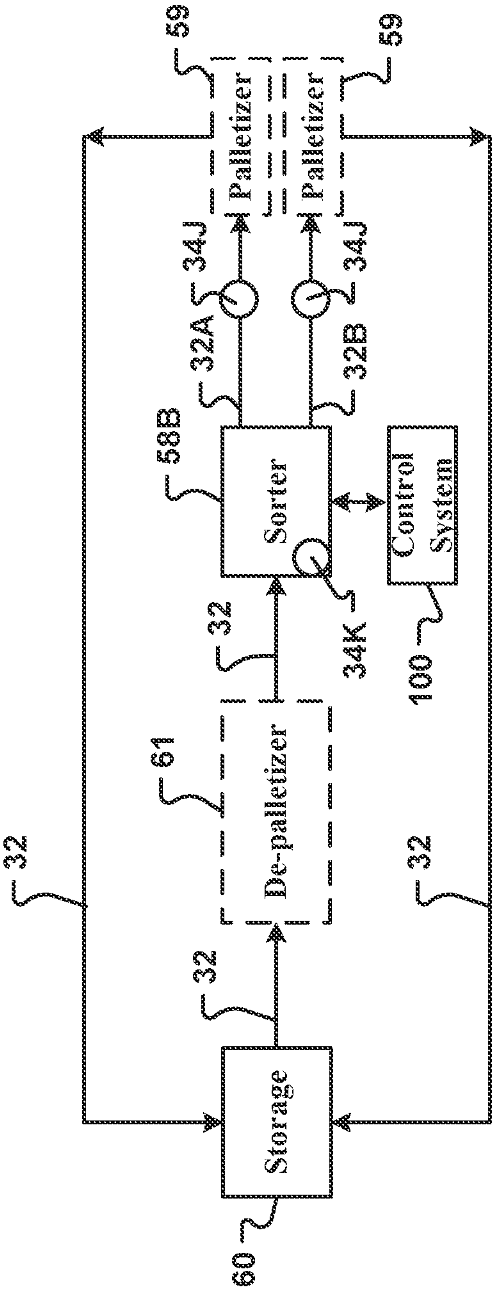
FIG. 2B is a schematic illustration of a sorting system according to the present disclosure.

Additionally, or alternatively, a production facility may include a stand-alone sorter 58B as generally illustrated in FIG. 2B. The sorter 58B may be located in the production facility but separate from the production line 10. In some embodiments, the sorter 58B is located at a storage site (or warehouse), a filler 62, a distributor, or some location separate from the production line. Regardless, the sorter 58B may have the same or similar features and capabilities as described in conjunction with sorter 58A illustrated in FIG. 2A.

More specifically, the sorter 58B may be positioned downstream from a de-palletizer 61. Accordingly, a pallet with container bodies 2 including marks 26 may be removed from storage 60 and transported to the de-palletizer. Thereafter, the container bodies 2 may be transported to the sorter 58B. In some embodiments, a conveyor 32 is positioned to transport the container bodies from the depalletizer to the sorter 58B.

The sorter optionally includes a sensor 34K operable to read marks on the container bodies. The sorter 58B may then retrieve information from a record 140 of a database by communicating with control system 100. In this manner, the sorter 58B can identify container bodies based on their unique marks 26 and separate them based on one or more fields in the record 140. Thereafter the sorter 58B can direct each container body to one or more routes to direct each container body to one of two or more palletizers 59. From the palletizers, pallets of the sorted container bodies may be returned to storage 60 or some other location.

Using sorters 58A and/or 58B, individual container bodies processed by specific pieces of equipment can be located. For example, an internal coater 50C may be producing faulty internal coatings. A sorter 58A/58B may receive container bodies from the de-palletizer 61 and identify those that received an internal coating from internal coater 50C. The sorter 58A/58B can then route those container bodies to an inspection station, to a holding area, or to a palletizer for salvage or reuse. Container bodies that were not processed by internal coater 50C (for example container bodies processed by internal coaters 50A, 50B) can also be identified by their marks 26 and routed to a conveyor 32A, 32B for transport back to a palletizer 59A, 59B.

Forming a mark 26 for each container body on the sheet 14 upline from the cupper 22 provides many benefits. By positioning sensors 34 at various points on the production line the progress of individual container bodies through the manufacturing process can be tracked. Information such as a manufacturer of a coil of the sheet 14 of metal material can then be tied to (or associated with) each container body produced. In this manner, failure or rejection of a container body due to a deficiency of the metal material can be tracked back to manufacturer of the coil.

In addition, the mark 26 facilitates the collection of data related to the production of each container body with greater detail, accuracy, and quality compared to the data generated by prior art marks produced by a bodymaker or other tools of a prior art production line. For example, the time it takes for each container body to progress through each stage and operation of the production line can be tracked and analyzed. Specifically, the mark 26 enables the identity of each piece of equipment that performed an operation on each container body and the time the operation was performed to be collected and stored in a record 140 of a data structure (such as a database 120, 124 of the control system 100). In this manner, information such as the wellness and spoilage associated with each piece of equipment in the production line 10 can be collected for analysis. The performance of individual pieces of equipment can be analyzed and compared to other similar equipment on the same production line (or on other production lines).

Marks 26 of the present disclosure may also be formed on metallic workpieces, such as container bodies, produced by an impact extrusion (IE) process. Impact extrusion is a process utilized to make container bodies and other articles with unique shapes. The container bodies produced by an IE process are typically made from a softened metal slug comprised of steel, magnesium, copper, aluminum, tin, and lead and other alloys. An extruded tube (which will be formed into a container body) is formed from a slug of metallic material. The slug is positioned in an extruder that has a confining die and a punch. The slug is contacted by the punch and the force from the punch deforms the metal slug around an outer diameter of the punch and the inner diameter of the confining die to form the extruded tube.

After the initial shape is formed, the extruded tube is removed from the punch with a counter-punch ejector, and other necking and shaping tools are used to form the extruded tube into a container body with preferred shape. The IE production line for container bodies includes equipment that performs many operations similar to those described in conjunction with FIG. 2A. For example, an IE production line may include ironing stations and a domer position downstream from the extruder. A washer and a dry-off oven may be downstream from the domer. The IE production line can include a basecoater and a basecoat oven. Interior coatings may be applied to the container body by internal coaters and the coating cured by an internal bake oven. One or more decorators may apply decorations to exterior surfaces of the container bodies which are cured by one or more deco-ovens. A neck can be formed on the container body by necking stations. The IE production line may also include embossing stations, a wall ironing station, trimers, a curler, and a mouth mill assembly. In some embodiments a thread forming station is included in the IE production line.

Inspection stations 57 may be positioned at a plurality of locations along the IE production line. The IE production line may also include a sorter 58 and a de-palletizer 61 as described herein. When the container body is finished, it may be positioned on a pallet by a palletizer 59.

A marker 24 of embodiments of the present disclosure may be positioned downstream from extruder to form a mark 26 on each container body produced by the IE production line. In some embodiments, the marker is positioned at or near an exit of the extruder.

In other embodiments, the marker 24 is positioned between the extruder and the next piece of equipment that will perform an operation on the container body of the IE production line. For example, the marker 24 may be positioned upstream from an ironer, a domer, or a washer.

The IE production line of the present disclosure also includes sensors 34 as described herein. The sensors 34 may be positioned at a plurality of locations on the IE production line. In some embodiments, a sensor 34 is associated with each piece of equipment of the IE production line that performs an operation on a container body. Accordingly, as described in conjunction with the production line 10, a container body 2 produced by the IE production line will include a mark 26 that may be scanned before or after each operation that is performed on the container body.

Marking a metallic workpiece in a variety of manufacturing processes and production lines is contemplated. For instance, marking a container body, a bottle, a shell/end, a tab, and/or a tapered cup is contemplated. The tables below summarize various manufacturing processes. A marker can be placed at different stations with attendant systems such as orientation and/or stabilization systems as described herein.

Further, a marker may be associated with equipment of each station, positioned upstream of each station, or positioned downstream of each station. An exemplary manufacturing process is found in "How Ball Makes Beverage Ends," https://www.scribd.com/document/516691496/How-Ball-Makes-Beverage-Ends [retrieved Aug. 10, 2022], which is incorporated herein in its entirety by reference. Another exemplary manufacturing process is found in "Inside a Ball Beverage Can Plant," https://igora.ch/files/ball-metalbeverageprocess.pdf [retrieved Aug. 10, 2022], which is incorporated herein in its entirety by reference.

TABLE 1

| A list of actions and/or stations for producing a container body at a manufacturer location. |
|---|
| Potential coil preprint |
| Receive coil |
| Uncoil |
| Lube |
| Cupper |
| Bodymaker/Draw/Iron/Iron/Iron/Dome Forming |
| Trim |
| Washer |
| Washer Dry Off |
| Decorator infeed |
| Decorate |
| Overvarnish |
| Bottom Coat |
| Pin Oven / Coating Cure |
| Inside Spray Infeed |
| Inside Spray |
| Inside Spray Outfeed |
| Inside Spray Curing |
| Necking |
| Flanging |
| Light Tester |
| Palletizer |

TABLE 2

| A list of actions and/or stations for producing a container at a filler location |
|---|
| Depalletize |
| Rinse (ionized air or DI water) |
| Date Code |
| Fill |
| Double Seam |
| Fill Level Detection (X or Gamma Ray) |
| Invert to promote defect leaking |
| Thermal Process |
| Warmer (dew point), or |
| Cooling Tunnel (Hotfill), or |
| Pasteurizer, or |
| Retort |
| Reinvert can (upright) |
| Pressure Check |
| Fill Level Detection (X or Gamma Ray) |
| Dryer |
| Secondary Pack: |
| Carton, or |
| Hi-cone, or |
| Shrink wrap, or |
| Tray w/ Shrink Wrap, or |
| Case |
| Additional Pack: |
| Case, or |
| Tray |
| Palletize |

TABLE 3

| A list of actions and/or stations for producing a bottle at a manufacturer location |
|---|
| Potential coil preprint |
| Receive coil |
| Uncoil |
| Lube |
| Cupper |
| Bodymaker/Draw/Iron/Iron/Iron/Dome Forming |
| Trim |
| Washer |
| Washer Dry Off |
| Decorator infeed |
| Decorate |
| Overvarnish |
| Bottom Coat |
| Pin Oven / Coating Cure |
| Inside Spray Infeed |
| Inside Spray |
| Inside Spray Outfeed |
| Inside Spray Curing |
| Neck |
| Trim |
| Thread |
| Throttle |
| Curl |
| Inspect/Light Tester |
| Palletizer |

TABLE 4

| A list of actions and/or stations for producing a bottle at a filler location |
|---|
| Depalletize |
| Date Code |
| Rinse (ionized air or DI water) |
| Fill |
| Cap |
| Thread Camera Inspection |
| Fill Level Detection (X or Gamma Ray) |
| Thermal Process |
| Warmer (dew point), or |
| Cooling Tunnel (Hotfill), or |
| Pasteurizer, or |
| Retort (Batch Process) |
| Pressure Check |
| Fill Level Detection (X or Gamma Ray) |
| Dryer |
| Secondary Pack: |
| Carton, or |
| Hi-cone, or |
| Shrink wrap, or |
| Tray w/ Shrink Wrap, or |
| Case |
| Additional Pack: |
| Case, or |
| Tray |
| Palletize |

TABLE 5

| A list of actions and/or stations for producing an end closure at a manufacturer location. |
|---|
| Potential coil preprint before coil coating |
| Coil Coating with option to print codes integral to that process |
| Potential coil preprint after coil coating |
| Receive coil |
| Uncoil |
| Shell Press |
| Curl |
| Compound liner |
| Accumulation (Balancer) |
| Conversion press infeed |
| Conversion press |
| Conversion press outfeed |
| Inspection |
| Bagging |
| Palletizing |

TABLE 6

| A list of actions and/or stations for producing an end closure at a filler location |
|---|
| Manual Depalletize |
| Remove paper sleeve |
| Manual (Common) |
| Automatic (Rare) |
| Load end stacks to rod cage conveyance |
| Manual into angled V-Trough |
| Manual into automatic carousel feed (feeder) |
| Automatic (Rare) |
| Downstacker separation into seamer |
| Double Seam and continue with container process |

TABLE 7

| A list of actions and/or stations for producing a tab at a manufacturer location |
|---|
| Potential coil preprint before coil coating |
| Coil Coating with option to print codes integral to that process |
| Potential coil preprint after coil coating |
| Receive coil |
| Uncoil |
| Conversion Press Infeed |
| Conversion Press |

Figure 5:
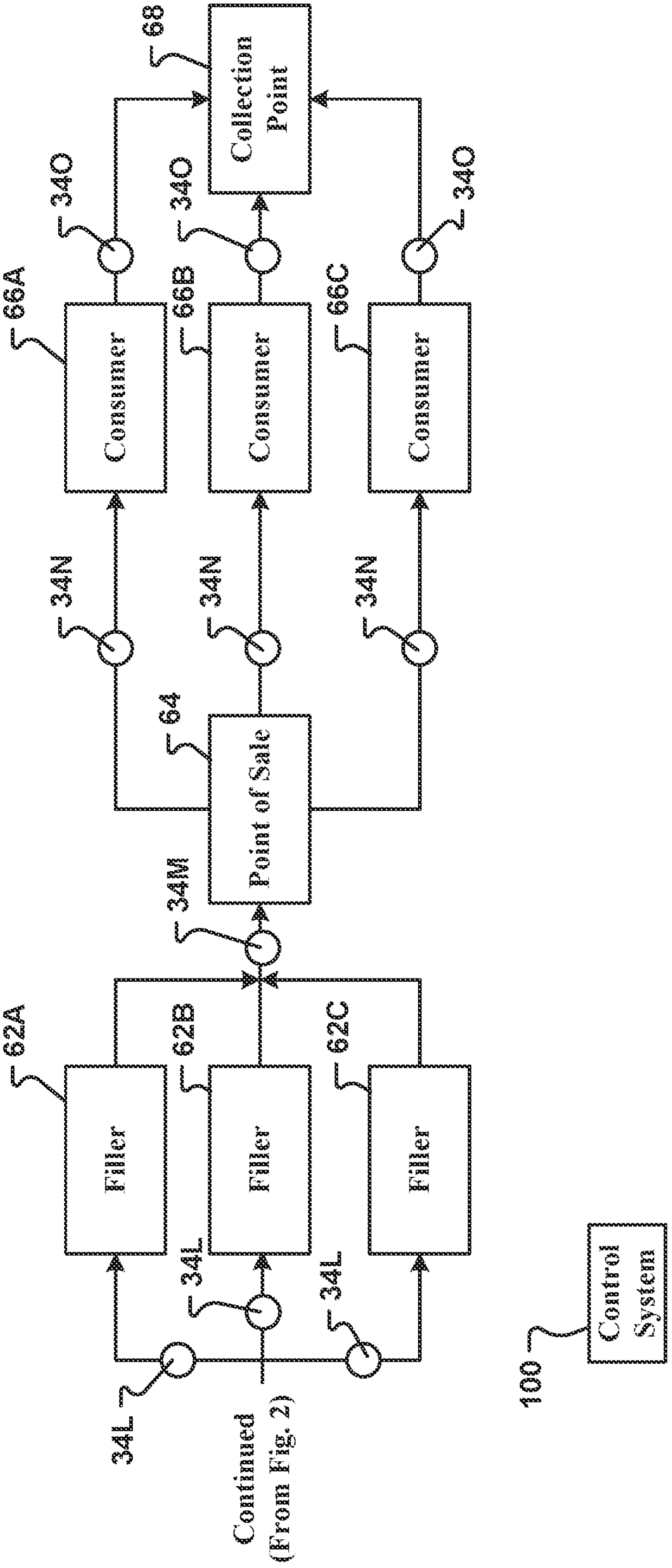
FIG. 5 is a schematic illustration of a system to track and trace a container body.

Referring now to FIG. 5, the mark 26 on each container body 2 also facilitates tracking each container body to a filler 62, point of sale 64, consumer 66, and to a collection point 68 at the end of life of the container body. For example, when a pallet of container bodies is delivered to the filler 62, the unique mark 26 of each container body 2 on the pallet may be associated with the filler.

A record 140 for the mark stored in a database 120/124 may be updated with information about the filler. Moreover, when the container body is filled with a product, a timestamp may be added to the record 140 of the mark 26 in the database. In addition, information about the product in the container body (such as a type of product, an expiration date, and other data) may be added to the record.

When the filled container body is shipped to a point of sale 64, additional entries can be added to the record 140 for the mark. For example, an identifier for the point of sale, a date of delivery, and the like can be added to the record.

Thereafter, the record 140 for the mark can be supplemented when the filled container body is purchased by a consumer 66. In some embodiments, a sensor 34M at the point of sale will scan the mark 26. The sensor may be a barcode reader associated with a checkout system at the point of sale.

Information about the date and time of the sale may be added to the record 140 in the database. In some embodiments, an identifier for the consumer 66 (such as a name, a customer number, a loyalty number, or the like) may also be added to the record. The record 140 may also be updated to include an amount of a deposit paid by the consumer for the container body.

In some embodiments, the consumer 66 may update the record 140 for the container body associated with the mark 26 by scanning the mark 26 with a device such as a smart phone. In this manner, the consumer 66 can be associated with the record for the mark in the database record for purposes of a deposit return program where containers are returned at designated locations for recycling.

The mark 26 beneficially provides a way to track the complete life and movement of a container body 2, from the uncoiler 12 to a collection point 68 at end of life. The ability to track and trace individual container bodies through their life cycle will provide useful information and insight into the manufacturing process, distribution, sale, consumption, and end of life collection.

The collection point 68 may be in communication with the control system 100. For example, the collection point 68 may communicate with the control system over a network 122, such as the internet. Thus, data collected by a sensor 340 associated with the collection point 68 can be added to a record 140 for a mark 26 on a container body stored in a database 120/124 described herein in conjunction with the control system. In this way, a database 120/124 can receive information regarding scanning of a mark 26, such as: which device (or sensor 34) conducted the scan at what time, information about the container body itself, where the container body is located, etc. The database can also distribute data as necessary to fulfill functions of the system such as signaling a mobile device or other computer system that a particular container body has been received at the collection point 68.

Figure 6:
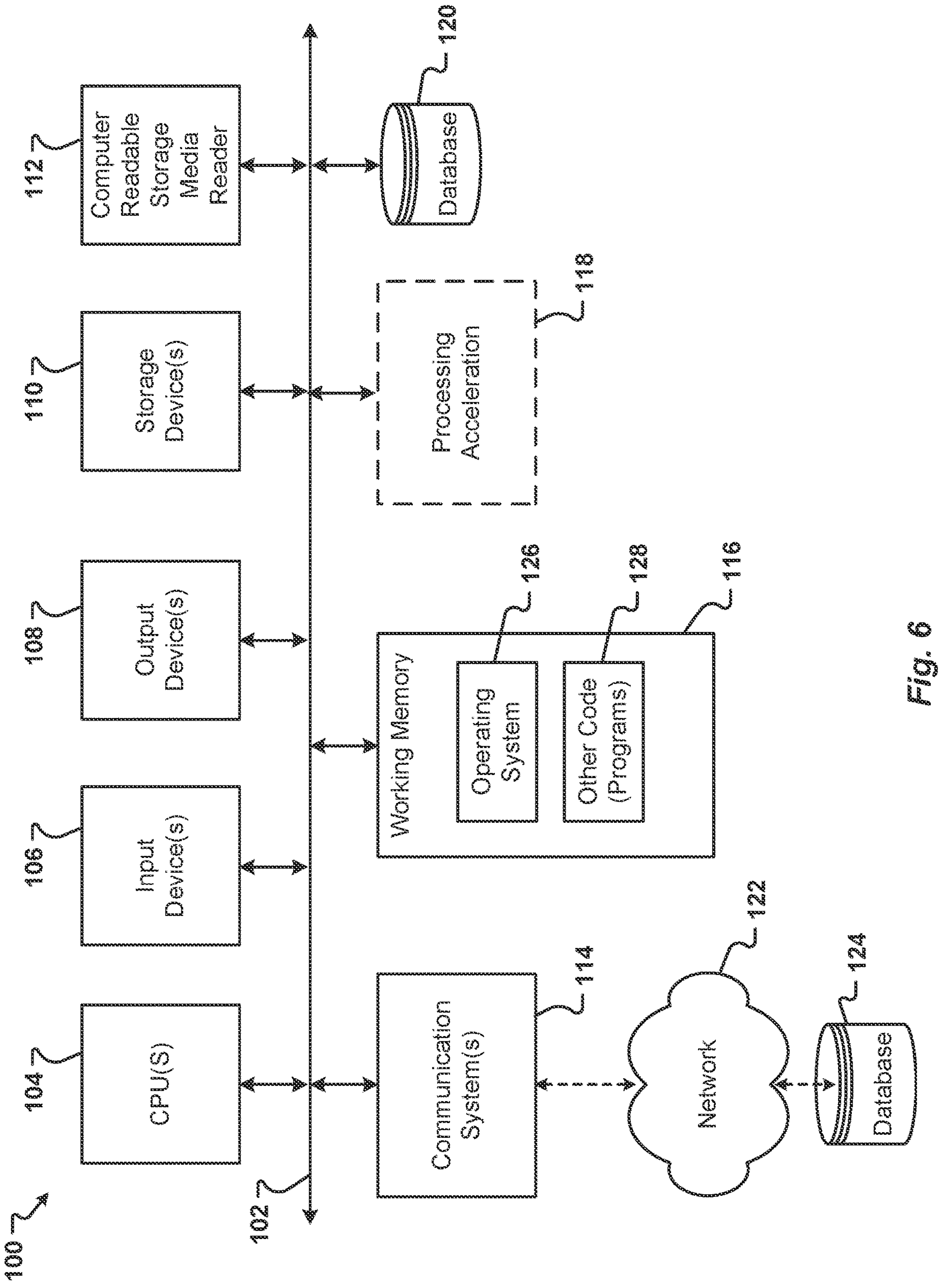
FIG. 6 is a block diagram of a control system according to embodiments of the present disclosure.

Referring now to FIG. 6, a control system 100 according to embodiments of the present disclosure is generally illustrated. More specifically, FIG. 6 illustrates embodiments of a control system 100 of the present disclosure operable to create unique marks 26 for a plurality of container bodies in accordance with embodiments of the present disclosure. The control system 100 is generally illustrated with hardware elements that may be electrically coupled via a bus 102. The hardware elements may include one or more central processing units (CPUs) 104; one or more input devices 106 (e.g., a mouse, a keyboard, etc.); and one or more output devices 108 (e.g., a display device, a printer, etc.). The control system 100 may also include one or more storage devices 110. In embodiments, the storage device(s) 110 may be disk drives, optical storage devices, solid-state storage device such as a random access memory ("RAM") and/or a read-only memory ("ROM"), which can be programmable, flash-updateable and/or the like.

The control system 100 may additionally include one or more of a computer-readable storage media reader 112; a communications system 114 (e.g., a modem, a network card (wireless or wired), an infra-red communication device, etc.); and working memory 116, which may include RAM and ROM devices as described above. In some embodiments, the control system 100 may also include a processing acceleration unit 118, which can include a DSP, a special-purpose processor and/or the like. Optionally, the control system 100 may also include a database 120.

The computer-readable storage media reader 112 can further be connected to a computer-readable storage medium, together (and, optionally, in combination with storage device(s) 110) comprehensively representing remote, local, fixed, and/or removable storage devices plus storage media for temporarily and/or more permanently containing computer-readable information. The communication system 114 may permit data to be exchanged with a network 122 and/or any other data-processing. Optionally, the control system 100 may access data stored in a remote storage device, such as database 124 by connection to the network 122. In some embodiments, the database 124 may be known as cloud storage. In embodiments, the network 122 may be the internet.

The control system 100 may also comprise software elements, shown as being currently located within the working memory 116. The software elements may include an operating system 126 and/or other code 128, such as program code implementing one or more methods and aspects of the present invention.

One of skill in the art will appreciate that alternate embodiments of the control system 100 may have numerous variations from that described above. For example, customized hardware might also be used and/or particular elements might be implemented in hardware, software (including portable software, such as applets), or both. Further, connection to other computing devices such as network input/output devices may be employed.

In embodiments, the control system 100 is a personal computer, such as, but not limited to, a personal computer running the MS Windows operating system. Optionally, the control system 100 can be a smart phone, a tablet computer, a laptop computer, and similar computing devices. In embodiments, the control system 100 is a data processing system which includes one or more of, but is not limited to: at least one input device (e.g. a keyboard, a mouse, or a touch-screen); an output device (e.g. a display, a speaker); a graphics card; a communication device (e.g. an Ethernet card or wireless communication device); permanent memory (such as a hard drive); temporary memory (for example, random access memory); computer instructions stored in the permanent memory and/or the temporary memory; and a processor.

The control system 100 may be any programmable logic controller (PLC). One example of a suitable PLC is a Controllogix PLC produced by Rockwell Automation, Inc., although other PLCs are contemplated for use with embodiments of the present invention.

Optionally, the control system 100 can send instructions to the marker 24 to adjust operation of its laser, printer, inkjet print head, or other means of forming the mark 26. Additionally, or alternatively, the control system 100 can adjust a duty cycle of the marker.

In embodiments, the control system 100 is in communication with one or more of the sensors 34 of the present disclosure. The control system can create a record 140 in a database 120/124 for each mark 26 of each container body 2. The control system 100 may then update the record 140 with additional data as the mark 26 is scanned when the container body travels through the production line 10, is transported to a filler, shipped to a point of sale, purchased by a consumer 66, and returned to a collection point 68.

Figure 7:
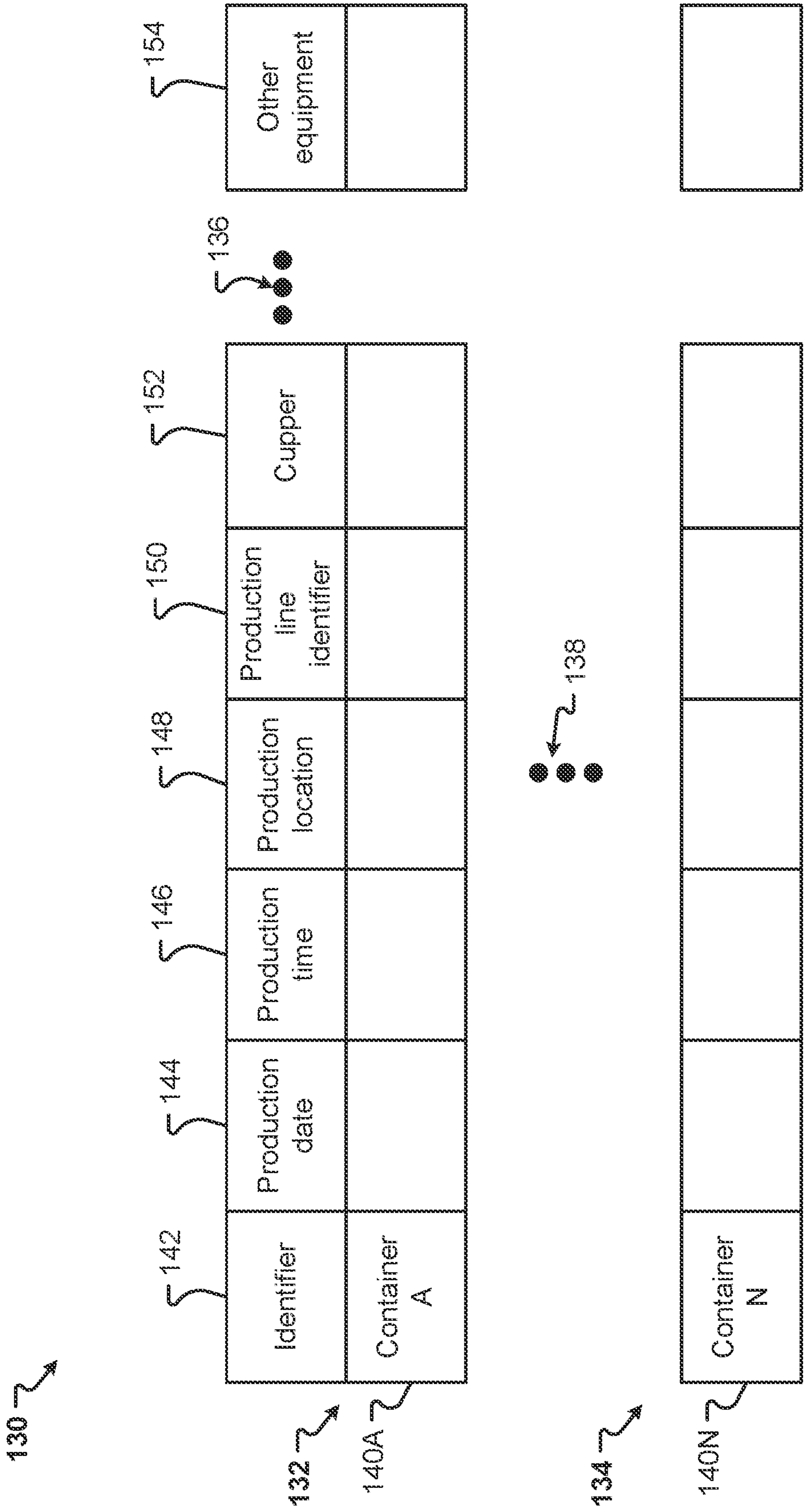
FIG. 7 is a block diagram of an embodiment of a data structure for storing data about a container body.

Referring now to FIG. 7, one embodiment of a data structure 130, such as a database, is generally illustrated. In at least one embodiment, the data structure 130 is stored in a memory of the control system 100, such as a database 120. Additionally, or alternatively, the data structure 130 may be accessed by the control system 100 using network 122. Accordingly, in one embodiment, the data structure 130 is stored in a remote location, such as database 124 or cloud storage.

The data structure may include one or more of data files or data objects 132, 134. Thus, the data structure 130 may represent different types of databases or data storage, for example, object-oriented data bases, flat file data structures, relational database, or other types of data storage arrangements.

Embodiments of the data structure 130 disclosed herein may be separate, combined, and/or distributed. As indicated in FIG. 7, there may be more or fewer columns or portions in the data structure 130, as represented by ellipses 136. Further, there may be more or fewer row (files) or records 140 in the data structure 130, as represented by ellipses 138.

A first data object 132 includes data related to a plurality of container bodies 2 organized into individual records 140. In some embodiments, the first data object 132 may include records of container bodies 2 produced by a first production line 10, by an impact extrusion production line, by a first manufacturer, produced for a distributor, produced for a specific client, or produced during a certain period of time (such as a day, a week, a month, or a year).

The first data object 132 has several portions or fields 142-154 representing different types of data. Each of these types of data may be associated with an individual container body 2 by its unique mark 26. As a container body 2 (such as "container A" in record 140A) moves through a production line and its mark 26 is scanned by sensors 34, fields within record 140A may be populated with data from the sensor(s). There may be one or more records 140 and associated data stored within the first data object 132.

In one embodiment, each record 140 includes a field for an identifier 142. The identifier 142 may be the unique mark 26 (such as an alphanumerical code) associated with each container body 2. Other fields include different data collected by sensors 34 of the production line, fillers 62, points of sale 64, consumers 66, collection points 68 and other sensors 34 that scan marks on the container bodies.

The fields may include, but are not limited to, field 144 for a production date, field 146 for a production time, field 148 for a production location, field 150 for a production line identifier, field 152 for an identifier for a cupper 22 that cut a cup formed into the container body, and field 154 for another piece of equipment that handled the container body or that performed an operation on the container body.

The first data object may include more or fewer fields. Optionally, the fields 142-154 may be arranged in a different order. Moreover, the fields may be added or removed based on the type of production line that produced the container body. More specifically, a data object with records 140 for container bodies produced by a draw and iron production line 10 may have different fields than a data object with records for container bodies 2 produced by an impact extrusion process.

Other fields may be added to the first data object 132 as indicated by ellipses 136. For example, each record 140 may include fields for one or more of: a batch number; a shift identifier; material specifications of the metallic material of a continuous sheet; an identifier for a manufacturer of a coil of metallic material; an identifier for a material of a slug used to produce an impact extruded container body; an identifier or serial number of the coil; a position of a mark on the continuous sheet; an identifier for a bodymaker that formed the metallic container; an identifier for a washer that handled the container body; information about a fluid used to wash the container body; an identifier for a dry-off oven the processed the container body; information about operation conditions of the dry-off oven; an identifier for a basecoater that formed a basecoat on the container body; information about the basecoat material; an identifier of a basecoat oven that cured the basecoat; an identifier of a decorator that formed a decoration on the sidewall; information about the decoration formed by the decorator; information about the decorator material used to form the decoration; an identifier for a deco oven that cured the decoration; information about operation conditions of the deco oven (such as a temperature within the oven); an identifier for an internal coater that sprayed a coating into a hollow interior of the container body; information about the internal coating material used by the internal coater; an identifier for internal bake oven that cured the internal coating; information about operation conditions of the internal bake oven; an identifier for a necker (or necking station) that formed a neck on the container body; an identifier for a flanger that formed a flange on the container body; information about a sorter 58 that processed the container body; an identifier for a palletizer that placed the container body into a first pallet; an identifier for the pallet; information about a storage location in which the pallet was stored (such as a temperature within the storage location); an identifier for a shipper that transported the container body to a filler; an identifier for a filler that filled and sealed the container body; information about a product stored in the container body (such as type, brand, quantity, expiration date, and the like); an identifier for a second pallet used to transport the filled container body; an identifier for a distributor that received the second pallet; an identifier for a point of sale that received the container body; an identifier for a consumer who purchased the container body; information about a deposit collected upon sale of the container body; an identifier for a collection point that received the container body; and information about redemption of the deposit when the container body was received at the collection point. In some embodiments, each field includes a timestamp. Optionally the time stamp will indicate at least a date and a time the mark of the container body was scanned.

In some embodiments, a record 140 for a container body 2 may be updated with information received from other databases or control systems without scanning the mark 6 by a sensor 34. A record 140 for a container body 2 may be modified with information about operation of equipment of the production line 10 after the container body has been manufactured. For example, the record 140 may include information about fluids used to wash the container body and/or coatings and decorations applied to the container body.

If a fluid, coating, or a decorating material is subsequently identified for recall or due to a health concern, records 140 for all container bodies 2 which had contact with the fluid, coating or decorating material could be modified by a computer system, such as control system 100. Similarly, if a piece of equipment of the production line 10 is found to be malfunctioning after processing the container body, a record 140 for the container body and associated with its unique mark 26 may be modified.

The record 140 of a container body 2 may be updated automatically by the control system 100 each time a mark 26 on the container body is scanned. Optionally, the record 140 may also be manually revised by a user of the control system. A user may use an input device 106 of the control system to add, alter, or delete a record 100 in a database that is associated with a container body. In this manner, a user (such as a worker on a production line) may enter information such as a shift identifier, a serial number for a coil, an identifier for a manufacturer of a coil, a date and a time that a coil was loaded into an uncoiler, information about a coating used by an internal coater, a weight or quantity of one or more coatings applied to a container body, an identifier for a decoration applied to a container body, and other production data.

Optionally, data structure 130 may include second data object 134. Second data object 134 may include the same or similar fields 142-154 as first data object 132. In one embodiment, the control system 100 may store data for container bodies 2 produced by a second production line (such as an impact extrusion production line) in data object 134.

The tracking and tracing facilitated by the mark 26 is also beneficial for encouraging recycling. Tracking and tracing are important for improving the performance of deposit return programs, which can be accomplished in a number of ways. For instance, a consumer 66 can be incentivized to return a container body to a collection point 68 by receiving a credit to a mobile device, a loyalty or rewards account, or to a financial account. The credit may be a monetary credit, a credit or message on a social network or application on the mobile device, or a credit in a loyalty account.

In addition, data from one or more databases 120/124 and records 140 can be harvested to determine broader trends such as the recycle rate for a particular production batch, shift, or production facility, the recycle rate for container bodies sold at a particular point of sale 64 or a particular time, recycle rates for container bodies filled by a particular filler 62, recycle rates associated with various collection points 68, recycle rates of specific consumers 66, etc.

In some embodiments, the consumer 66 may be encouraged to scan the mark 26 and permit a record 140 of the container body stored in a database 120/124 to include information about the consumer. The consumer 66 may also provide feedback on the performance of the container body 2 which may be added to the record 140 associated with the mark 26. For example, the consumer may be encouraged to provide feedback on a failure of the container body. Similarly, the consumer could provide a review of a product stored in the container body.

A consumer 66 may receive benefits when the consumer stores consumer data in the record 140 for the container body. In this manner, the control system 100, a database 120/124, and/or an application on a mobile device or other computer system associated with the consumer can push notifications or messages to the consumer regarding recalls for the container body or contents within the container body. The consumer 66 may also receive a reminder or alert about an expiration date or recall of the contents within the container body. In addition, the mark 26 can serve a safety function for the consumer 66 where the consumer can scan the mark and determine that the container body is not counterfeit and that the container is genuine.

Similarly, a customer such as a brand owner can identify products outside of typical distribution channels. For instance, if a finished container with a mark is found in an unexpected location or in an unexpected store, the mark can be scanned to precisely determine the origin of the container and where the container has traveled to arrive in the unexpected place. Then, a brand owner can determine if the distribution process for the particular container comports with, for instance, any contractual obligations, etc. Similarly, when a finished container has a mark with a unique code, then any finished container itself can be easily identified as legitimate or counterfeit.

Data received by the control system 100 when a mark 26 on a container body is scanned by a sensor 34 can cause any number of actions. The control system 100 can update a record 140 in a database 120/124 each time the mark is scanned with information collected by the sensor 34. For example, the record 140 can be updated to change a status of the particular container (e.g., location, recycled or not recycled, date and time of the scan, etc.). The information collected by scans of marks 26 may be used to keep track of the total number of container bodies produced, their status, and how many container bodies have been recycled within a time period, etc.

Scanning marks 26 on container bodies during the manufacturing process and storing information about each scan in a record 140 of a database provides many benefits to manufacturers of container bodies. For example, the data collected by the scans allows a manufacturer to track minute details of the manufacturing process. With this information, the manufacturer may identify deficiencies in the manufacturing process, such as equipment failures, equipment inefficiencies, or other deficiencies.

The information may also help to identify successes or best practices. For example, the data may indicate that one facility (or one production line) is performing better than anther facility or production line. Analyzing the data from the different production lines or facilities may identify differences that can be used to improve performance of one or more other production lines or facilities.

Moreover, scanning marks 26 on container bodies after they leave a production facility will also provide many benefits to the manufacturer. For example, the manufacturer may receive data from the filler when a container body is filled. This information can be used for inventory control and may trigger a replacement order.

By tracking and tracing the distribution and sale of container bodies, manufacturers, distributors, and recycling centers can identify regions, or demographics, that are purchasing particular container bodies. By reviewing information in records 140 associated with the marks 26 on the container bodies 2, sales of container bodies can be tracked to consumers based on a shape or style of container, a product in a container body, as well as decorations and advertisements on container bodies.

Data from a scan of a mark 26 by a sensor 340 at a collection point 68 or by a consumer 66 may be used to provide a credit or some other benefit to the consumer 66 to encourage recycling. In some embodiments, the consumer 66 can redeem a credit for currency, receive points or rewards through a loyalty program, buy a product, etc.

Once a specific container body 2 identified by a mark 26 is received at a collection point 68, a signal associated with the collection event can cause a message or post on a social network indicating that the consumer 66 has recycled. Thus, the control system 100 can incentivize the consumer 66 to recycle with financial incentives, social incentives, loyalty rewards, etc. In addition, sensors and scanners 34 at other locations such as a recycling plant can also read marks 26 on container bodies and transmit information over a network to a database 120/124.

The database 120/124 and data structure 130 can take any number of forms, and the present disclosure encompasses many embodiments of the system for tracking and tracing. For example, a database can be remotely located from any of the other locations and devices of the tracking and tracing system. Alternatively, the database can be part of the mobile device, part of the collection device, part of a control system 100, etc. Moreover, the database and/or the actions or functions associated with the database can be separated among multiple electronic devices in one or more locations.

In addition to incentivizing an individual consumer, the data received throughout the lifecycle of a container body can be used for other purposes. Data from a plurality of containers can indicate recycling rates for containers sold at a geographic location, recycling rates at a collection device for different times of the day, of the week, of the year, etc. A substandard recycling rate can be identified and then, for instance, an advertisement campaign can be targeted at this location.

Similarly, success rates for a deposit return program used with an application on a mobile device can be tracked using the marks 26 of the present disclosure. Incentives can be changed or increased within a geographic area, for a particular brand, or for a product based on recycling rates. For example, incentives may be increased within the geographic area if recycling rates are low. However, when recycling rates are acceptable, the incentives may be maintained at their current levels or decreased. Similarly, incentives may be adjusted based on recycling rates for a brand, a product. Data provided by consumers 66 and stored in a record 140 for a container body may be used to target advertising to promote sales and/or encourage recycling based on consumer demographics.

The marks 26 on container bodies and the tracking and tracing of container bodies facilitated by the present disclosure is expected to increase recycling over the current state of the art. The increased recycling rates divert container bodies from landfills and oceans to recycling plants and reduce the consumption of raw resources used to construct the containers.

While various embodiments of the system and method have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as additional items. Further, it is to be understood that the claims are not necessarily limited to the specific features or steps described herein. Rather, the specific features and steps are disclosed as embodiments of implementing the claimed systems and methods.

The term "automatic" and variations thereof, as used herein, refer to any process or operation done without material human input when the process or operation is performed. However, a process or operation can be automatic, even though performance of the process or operation uses material or immaterial human input, if the input is received before the performance of the process or operation. Human input is deemed to be material if such input influences how the process or operation will be performed. Human input that consents to the performance of the process or operation is not deemed to be "material."

The term "bus" and variations thereof, as used herein, can refer to a subsystem that transfers information and/or data between various components. A bus generally refers to the collection communication hardware interface, interconnects, bus architecture, standard, and/or protocol defining the communication scheme for a communication system and/or communication network. A bus may also refer to a part of a communication hardware that interfaces the communication hardware with other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

A "communication modality" can refer to any protocol or standard defined or specific communication session or interaction, such as Voice-Over-Internet-Protocol ("VoIP), cellular communications (e.g., IS-95, 1G, 2G, 3G, 3.5G, 4G, 4G/IMT-Advanced standards, 3GPP, WIMAX™, GSM, CDMA, CDMA2000, EDGE, 1×EVDO, iDEN, GPRS, HSPDA, TDMA, UMA, UMTS, ITU-R, and 5G), Bluetooth™, text or instant messaging (e.g., AIM, Blauk, eBuddy, Gadu-Gadu, IBM Lotus Sametime, ICQ, iMessage, IMVU, Lync, MXit, Paltalk, Skype, Tencent QQ, Windows Live Messenger™ or Microsoft Network (MSN) Messenger™, Wireclub, Xfire, and Yahoo! Messenger™), email, Twitter (e.g., tweeting), Digital Service Protocol (DSP), and the like.

The term "communication system" or "communication network" and variations thereof, as used herein, can refer to a collection of communication components capable of one or more of transmission, relay, interconnect, control, or otherwise manipulate information or data from at least one transmitter to at least one receiver. As such, the communication may include a range of systems supporting point-to-point or broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send and/or receive a signal within the communication system. Interconnect refers to some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium," as used herein refers to any tangible storage and/or transmission medium that participates in providing instructions to a processor for execution. Such a medium may take many forms, including but not limited to, non-volatile media, volatile media, and transmission media. Non-volatile media includes, for example, non-volatile random access memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, read only memory (ROM), a compact disc read only memory (CD-ROM), any other optical medium, punch cards, paper tape, any other physical medium with patterns of holes, a random access memory (RAM), a programmable read only memory (PROM), and erasable programmable read only memory EPROM, a FLASH-EPROM, a solid state medium like a memory card, any other memory chip or cartridge, a carrier wave as described hereinafter, or any other medium from which a computer can read. A digital file attachment to an e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. It should be noted that any computer readable medium that is not a signal transmission may be considered non-transitory.

The terms display and variations thereof, as used herein, may be used interchangeably and can be any panel and/or area of an output device that can display information to an operator or use. Displays may include, but are not limited to, one or more control panel(s), instrument housing(s), indicator(s), gauge(s), meter(s), light(s), computer(s), screen(s), display(s), heads-up display HUD unit(s), and graphical user interface(s).

The term "module" as used herein refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation, or technique.

While the exemplary aspects, embodiments, options, and/or configurations illustrated herein show the various components of the system collocated, certain components of the system can be located remotely, at distant portions of a distributed network, such as a local area network (LAN) and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a private branch exchange (PBX) and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In embodiments, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or very-large-scale-integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or computer-generated imagery (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

To provide additional background, context, and to further satisfy the written description requirements of 35 U.S.C. § 112, the following references are incorporated by reference herein in their entireties: British Pat. Pub. No. 2154775A, European Pat. App. No. 1467306A2, Japanese Pat. No. 3,971,064, Japanese Pat. No. 4532259, PCT Pub. No. WO2005/104005, PCT Pub. No. WO2013/135899A1, PCT Pub. No. WO2013/138595A2, PCT Pub. No. WO2014/063837A1, PCT Pub. No. WO2014/150647A1, PCT Pub. No. WO2014/152858A1, PCT Pub. No. WO2014/187474A1, PCT Pub. No. WO2016/183452A1, PCT Pub. No. WO2018/033627A1, PCT Pub. No. WO2019/049454A1, U.S. Pat. Nos. 4,879,457, 5,632,916, 6,872,913, 10,073,443, 10,421,111, 10,583,668, 10,726,288, U.S. Pat. Pub. No. 2015/0027327, U.S. Pat. Pub. No. 2016/0306347, U.S. Pat. Pub. No. 2017/0197241, Pub. No. 2019/0018396, U.S. Pat. Pub. No. 2018/0046114, U.S. Pat. Pub. No. 2018/0164719, U.S. Pat. Pub. No. 2020/0070494A1, U.S. Pat. Pub. No. 2021/0362537A1 and U.S. Pat. Pub. No. 2022/0143754A1.

What is claimed is:

1. A method of marking a continuous sheet of a metallic material for tracking and tracing metallic workpieces during a manufacturing process and during the subsequent distribution of metallic containers, comprising:
- moving the continuous sheet proximate to a marker;
- forming, by the marker, a plurality of marks at blank locations of the continuous sheet, wherein each mark of the plurality of marks includes a unique identifier;
- forming the metallic workpieces from the blank locations such that each metallic workpiece has a mark of the plurality of marks, wherein each of the metallic workpieces is a tab;
- scanning, by a sensor, a mark on a tab to generate a scan event associated with a unique identifier of the mark;
- transmitting, via a network, the scan event to a database where the scan event is used to track and trace the tab;
- joining the tab to an end shell to form an end closure;
- transporting the end closure to a filler;
- joining the end closure to a container body to form a metallic container at the filler, wherein the metallic container is filled with a product;
- scanning, by a second sensor at the filler, the mark to generate a second scan event; and
- transmitting, via a network, the second scan event to the database.

2. The method of claim 1, wherein the plurality of marks are formed at the blank locations at:
- (i) an infeed of a press during a dwell period of the continuous sheet;
- (ii) the infeed of the press between dwell periods of the continuous sheet; or
- (iii) a location upstream of the infeed of the press where a continuous feed of the continuous sheet is separated from the dwell period by a slack portion of the continuous sheet.

3. The method of claim 1, further comprising revising a record of the database associated with the unique identifier of the mark with an identity of the product in the metallic container.

4. The method of claim 1, further comprising:
- scanning, by a third sensor, a second mark on a second tab to generate a scan event associated with a unique identifier of the second mark;
- transmitting, via the network, the scan event to the database;
- determining that the second tab is defective;
- rejecting the defective second tab from the manufacturing process;
- inspecting the defective second tab with an additional sensor; and
- identifying a cause of a deficiency in the manufacturing process based on scan events related to the defective second tab.

5. The method of claim 1, further comprising revising a record of the database associated with the unique identifier to include information about the continuous sheet.

6. The method of claim 1, wherein the marker comprises at least one of a laser and a printer.

7. The method of claim 5, wherein the information about the continuous sheet in the record comprises one or more of a manufacturer of the continuous sheet, a serial number of a coil of the continuous sheet, and material specifications of the metallic material of the continuous sheet.

8. The method of claim 1, further comprising:
- forming, by a conversion press, the tab from the continuous sheet such that the mark from the plurality of marks is located on a public side of the tab, wherein the continuous sheet is a tab stock, and wherein a record of the database associated with the unique number is revised to include information about the conversion press.

9. The method of claim 8, wherein the marker forms the plurality of marks during a dwell period of the conversion press.

10. The method of claim 1, wherein the mark is a two-dimensional code less than 2 mm in size.

11. The method of claim 1, wherein the mark is located on a panel of the tab proximate to a tail end of the tab.

12. The method of claim 1, further comprising:
- forming, by a laser, the plurality of marks by ablating part of a material of the continuous sheet.

13. The method of claim 12, wherein the mark has a depth into the continuous sheet up to approximately 0.002 inches.

14. The method of claim 1, wherein the scan event is used to determine a deficiency in the manufacturing process.

15. The method of claim 1, further comprising scanning, by a sensor of a mobile device, the mark on the tab to generate a mobile scan event to associate the mobile device with the mark and the related tab.

16. The method of claim 1, further comprising scanning, by a sensor of a recycling plant, the mark to generate a recycle scan event to associate the mark and the tab with a completed recycling action.

17. A method of marking a continuous sheet of a metallic material for tracking and tracing end closures during a manufacturing process and during the subsequent distribution of metallic containers, comprising:

moving the continuous sheet proximate to a marker;

forming, by the marker, a plurality of marks at blank locations of the continuous sheet, wherein each mark of the plurality of marks includes a unique identifier;

forming a metallic workpiece from the continuous sheet such that the metallic workpiece has a mark of the plurality of marks, wherein the metallic workpiece is one of an end shell and a tab for the end shell;

joining the tab to the end shell to form an end closure;

scanning, by a first sensor, the mark on the metallic workpiece to generate a first scan event associated with the unique identifier of the mark;

transmitting, via a network, the first scan event to a database where the first scan event is used to track and trace the end closure;

transporting the end closure to a filler;

joining the end closure to a container body to form a metallic container at the filler, wherein the metallic container is filled with a product;

scanning, by a second sensor at the filler, the mark on the metallic workpiece to generate a second scan event; and transmitting, via a network, the second scan event to the database.

18. The method of claim 17, wherein the marker comprises a laser.

19. The method of claim 17, wherein the continuous sheet is a tab stock, and each metallic workpiece is a tab.

20. The method of claim 19, wherein the mark is located on a panel of the tab proximate to a tail end of the tab.

21. The method of claim 19, further comprising revising a record of the database associated with the unique identifier of the mark is revised to include information about the tab stock.

22. The method of claim 21, wherein the record is revised to include one or more of a manufacturer of the tab stock, a serial number of the tab stock, and material specifications of the tab stock.

23. The method of claim 17, further comprising revising a record of the database associated with the unique identifier of the mark to include an identity of the product in the metallic container.

* * * * *